(12) United States Patent
Sharifi-Mehr et al.

(10) Patent No.: US 12,533,207 B2
(45) Date of Patent: Jan. 27, 2026

(54) MOUNT ASSEMBLIES FOR USE WITH NAVIGATED SURGICAL SYSTEMS

(71) Applicant: Mobius Imaging, LLC, Shirley, MA (US)

(72) Inventors: Amir A. Sharifi-Mehr, Bloomingdale, NJ (US); Oliver Buchert, Franklin Lakes, NJ (US)

(73) Assignee: Mobius Imaging, LLC, Shirley, MA (US)

( * ) Notice: Subject to any disclaimer, the term of this patent is extended or adjusted under 35 U.S.C. 154(b) by 358 days.

(21) Appl. No.: 18/027,420

(22) PCT Filed: Sep. 22, 2021

(86) PCT No.: PCT/US2021/051472
§ 371 (c)(1),
(2) Date: Mar. 21, 2023

(87) PCT Pub. No.: WO2022/066710
PCT Pub. Date: Mar. 31, 2022

(65) Prior Publication Data
US 2023/0329833 A1 Oct. 19, 2023

Related U.S. Application Data

(60) Provisional application No. 63/081,604, filed on Sep. 22, 2020.

(51) Int. Cl.
*A61B 5/346* (2021.01)
*A61B 17/00* (2006.01)
*A61B 90/00* (2016.01)

(52) U.S. Cl.
CPC .............. *A61B 90/39* (2016.02); *A61B 17/00* (2013.01); *A61B 2017/00477* (2013.01); *A61B 2090/3916* (2016.02); *A61B 2090/3983* (2016.02)

(58) Field of Classification Search
CPC ................................ A61B 90/39; A61B 17/00
(Continued)

(56) References Cited

U.S. PATENT DOCUMENTS 5,803,642 A 9/1998 Sassmannshausen
7,107,091 B2 9/2006 Jutras et al.
(Continued)

FOREIGN PATENT DOCUMENTS

WO 2010062736 A1 6/2010
WO 2016134168 A1 8/2016
WO 2021211650 A1 10/2021

OTHER PUBLICATIONS

International Search Report for Application No. PCT/US2021/051472 dated Jan. 11, 2022, 3 pages.

*Primary Examiner* — Nicole F Johnson
(74) *Attorney, Agent, or Firm* — Howard & Howard Attorneys PLLC

(57) ABSTRACT

A mount assembly for use with a navigable tracker. The mount assembly includes a frame defining a seat, a coupler operatively attached to the frame for releasably securing the navigable tracker, and a guide defining a bore and arranged in the seat for selective pivoting movement about a pivot point disposed within the bore. An anchor having a shank is arranged for selective sliding engagement with the bore. A guide lock is coupled to the frame and is selectively operable between: a locked configuration to restrict movement of both the anchor and the guide relative to the frame, and a released configuration to simultaneously permit pivoting movement of the anchor relative to the frame about the pivot point and translational movement of the anchor relative to the guide through the bore.

20 Claims, 40 Drawing Sheets

(58) Field of Classification Search
USPC .......................................................... 606/1
See application file for complete search history.

(56) References Cited

U.S. PATENT DOCUMENTS

| | | |
|---|---|---|
| 7,237,556 B2 | 7/2007 | Smothers et al. |
| 7,725,162 B2 | 5/2010 | Malackowski et al. |
| 7,835,784 B2 | 11/2010 | Mire et al. |
| 7,862,568 B2 | 1/2011 | Vilsmeier et al. |
| 8,118,488 B2 | 2/2012 | Gregerson |
| 8,147,496 B2 | 4/2012 | Couture et al. |
| 8,845,655 B2 | 9/2014 | Henderson et al. |
| 8,942,788 B2 | 1/2015 | Roger |
| 8,945,132 B2 | 2/2015 | Plaby et al. |
| 9,008,757 B2 | 4/2015 | Wu |
| 9,111,379 B2 | 8/2015 | Gregerson et al. |
| 9,119,655 B2 | 9/2015 | Bowling et al. |
| 9,801,592 B2 | 10/2017 | Stanton et al. |
| 9,962,132 B2 | 5/2018 | Gregerson |
| 9,987,148 B2 | 6/2018 | Li et al. |
| 10,028,774 B2 | 7/2018 | Meyer |
| 10,034,713 B2 | 7/2018 | Yang et al. |
| 10,136,954 B2 * | 11/2018 | Johnson ................. B25J 13/065 |
| 10,151,810 B2 | 12/2018 | Gregerson et al. |
| 10,363,149 B2 | 7/2019 | van der Walt et al. |
| 10,456,207 B2 | 10/2019 | Flatt |
| 10,537,395 B2 | 1/2020 | Perez |
| 11,071,596 B2 | 7/2021 | Ryan et al. |
| 2004/0039396 A1 | 2/2004 | Couture et al. |
| 2006/0015018 A1 | 1/2006 | Jutras et al. |
| 2014/0200621 A1 | 7/2014 | Malackowski et al. |
| 2014/0275953 A1 | 9/2014 | Gregerson et al. |
| 2015/0209119 A1 | 7/2015 | Theodore et al. |
| 2015/0257851 A1 | 9/2015 | Plassky et al. |
| 2015/0265769 A1 | 9/2015 | Bratbak et al. |
| 2015/0282735 A1 | 10/2015 | Rossner |
| 2016/0302871 A1 | 10/2016 | Gregerson et al. |
| 2018/0092667 A1 | 4/2018 | Heigl et al. |
| 2018/0147021 A2 | 5/2018 | Fleig et al. |
| 2018/0263670 A1 * | 9/2018 | Moctezuma De La Barrera ........ A61B 17/8061 |
| 2019/0231447 A1 | 8/2019 | Ebbitt et al. |
| 2020/0078097 A1 | 3/2020 | Gregerson et al. |
| 2020/0146589 A1 | 5/2020 | Reddy et al. |
| 2020/0170751 A1 * | 6/2020 | Pack ...................... A61B 90/39 |
| 2020/0188034 A1 | 6/2020 | Lequette et al. |
| 2021/0093333 A1 | 4/2021 | Chappuis et al. |
| 2023/0149185 A1 | 5/2023 | Nielsen et al. |

* cited by examiner

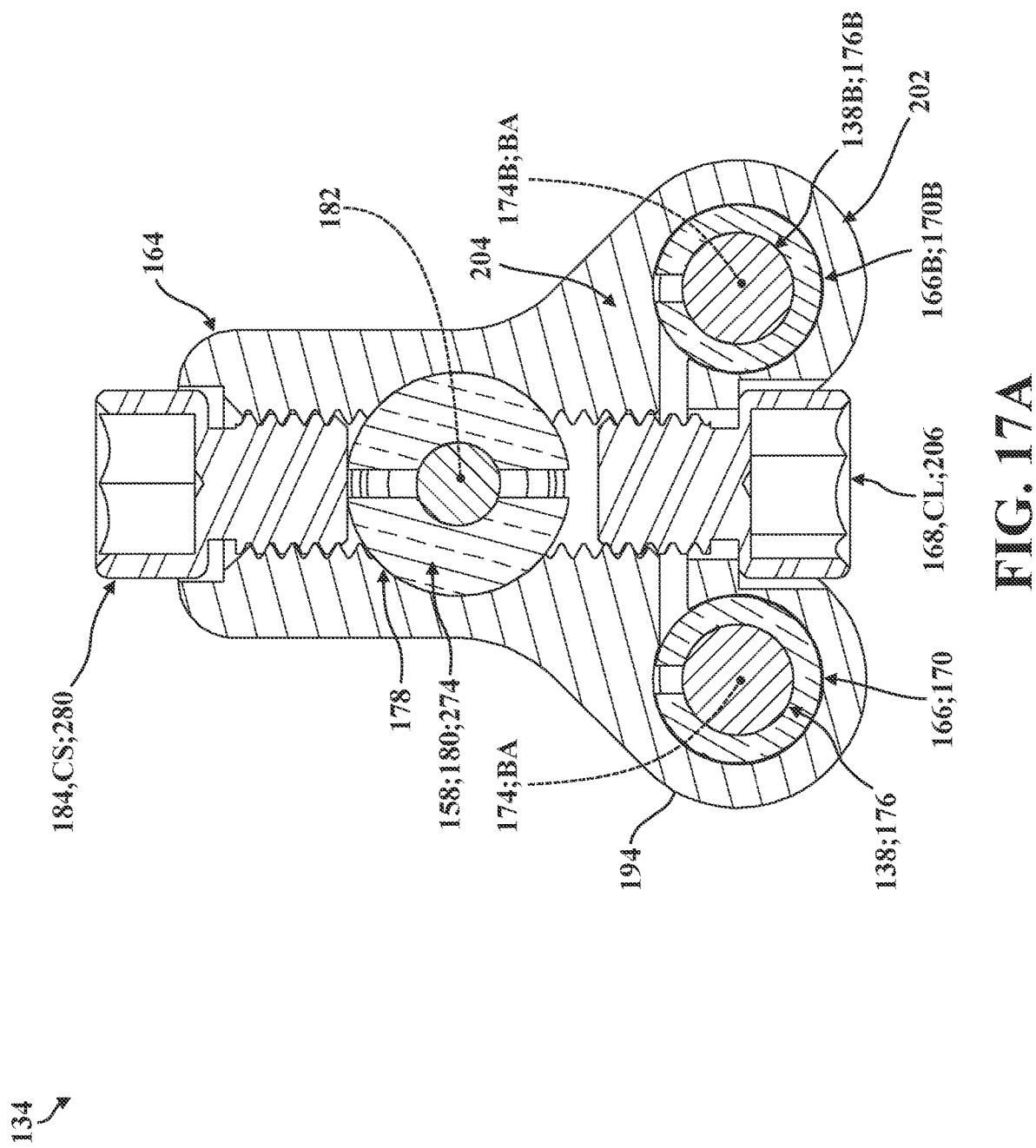

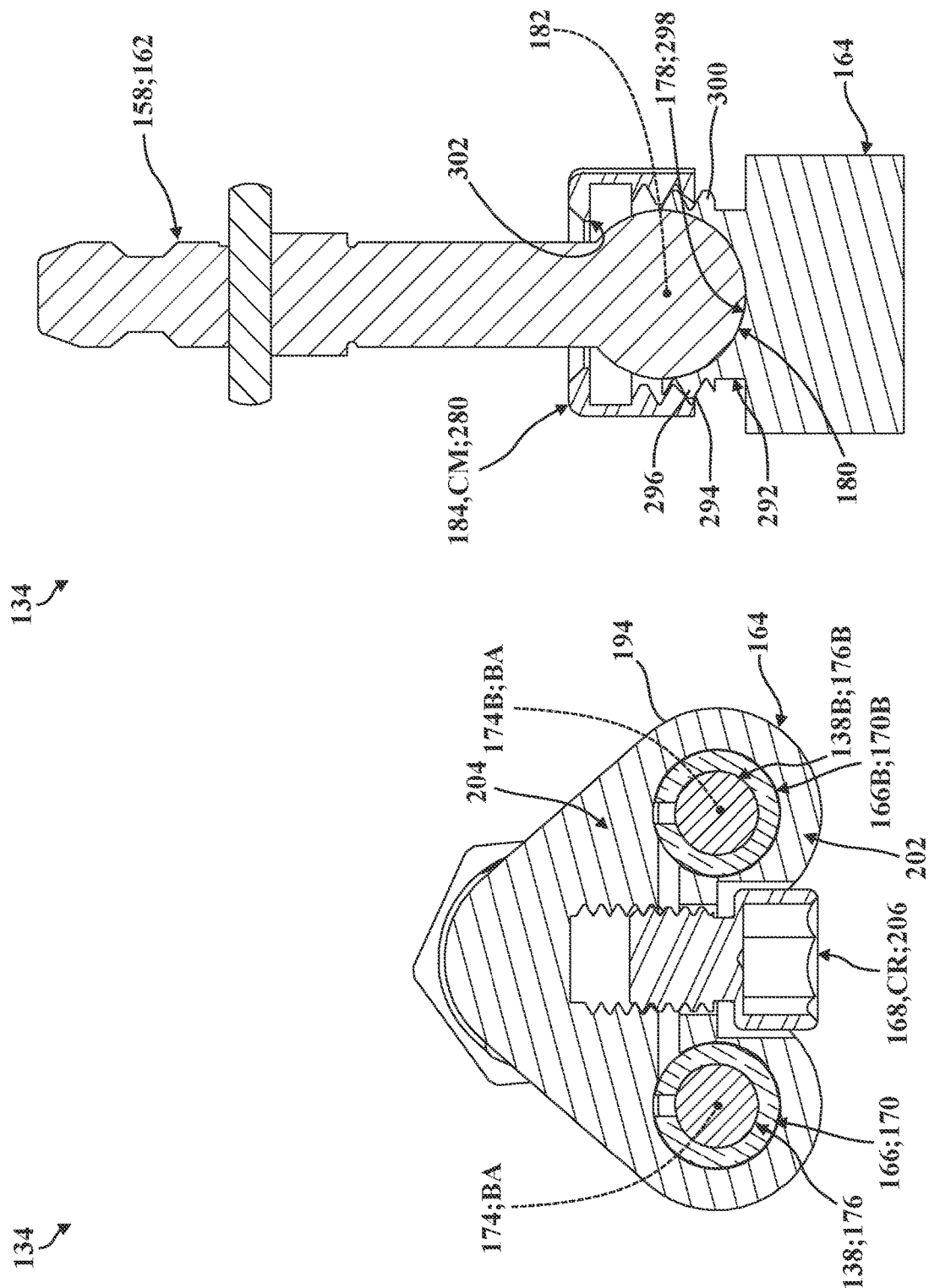

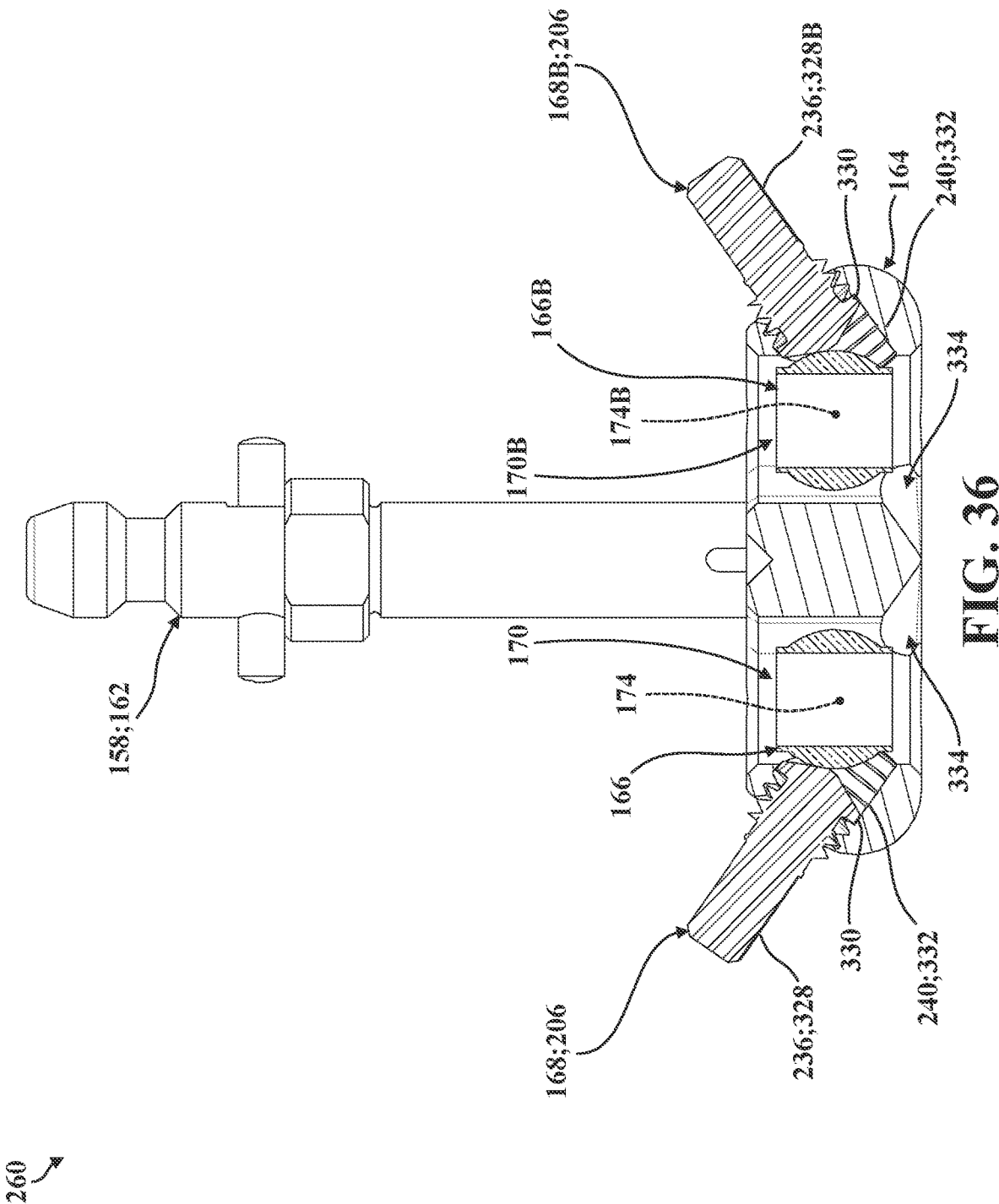

MOUNT ASSEMBLIES FOR USE WITH NAVIGATED SURGICAL SYSTEMS

CROSS-REFERENCE TO RELATED APPLICATION

The subject patent application claims priority to and all the benefits of U.S. Provisional Patent Application No. 63/081,604, filed on Sep. 22, 2020, the entire contents and disclosure of which is hereby incorporated by reference in its entirety.

BACKGROUND

Navigation systems are frequently utilized to assist medical professionals in carrying out various types of surgical procedures, including neurosurgical and orthopedic procedures. To this end, a surgeon may utilize a navigation system to track, monitor, or otherwise locate one or more tools, surgical instruments, and/or portions of a patient's anatomy within a common reference frame. Typically, tools and/or surgical instruments are tracked together with the anatomy, and their relative movement is depicted on a display.

Conventional navigation systems may employ light signals, sound waves, magnetic fields, radio frequency signals, and the like, in order to track the position and/or orientation of objects. Often, trackers are attached or otherwise integrated into the object being tracked. A localizer cooperates with tracking elements (e.g., fiducials, markers, and the like) coupled to the tracker to monitor the tracker, and ultimately to determine a position and/or orientation of the object being tracked.

For certain procedures, patient-specific imaging data may be acquired intraoperatively using one or more types of imaging systems to help assist the surgeon in visualizing, navigating relative to, and/or treating the anatomy. To this end, navigation systems may cooperate with imaging systems and/or other parts of surgical systems (e.g., surgical tools, instruments, surgical robots, and the like) to track objects relative to a target site of the anatomy.

In certain surgical procedures, such as orthopedic procedures involving the correction, stabilization, resection, or replacement of one or more parts of a patient's body, such as to help improve patient mobility, reduce pain, mitigate the risk of subsequent injury or damage, and the like, trackers may be secured to various portions of the anatomy.

Depending on the type of surgical procedure being performed, the location and arrangement of the target site, and/or the specific configuration of the navigation system, it may be advantageous to secure trackers to tissue at or otherwise adjacent to the target site prior to acquiring patient-specific imaging data via the imaging system (e.g., to facilitate registration of the imaging data with the navigation system). In such circumstances, when securing the tracker to the anatomy, the surgeon generally considers the visibility of the tracker to the navigation system, the arrangement of the tracker relative to the target site, and/or the arrangement of the tracker relative to the intended position(s) of the imaging system.

While certain types of trackers generally remain fixed relative to tissue when anchored, other types of trackers may be adjustably positioned or articulated relative to the tissue after attachment. However, conventional adjustable trackers may employ relatively large adjustable linkages, which may employ joints that are individually articulable relative to each other to help facilitate adjustable positioning of the tracker in multiple degrees of freedom. However, it will be appreciated that each of these joints needs to remain secure in order to ensure that the tracker can be accurately monitored. Furthermore, it will be appreciated that these types of linkages tend to result in the tracker being relatively bulky, and may present an increased risk of inadvertently obscuring or limiting access to the target site from certain approaches, and/or an increased risk of "bumping" or jostling the tracker (e.g., with a tool, with a portion of the imaging device, and the like) and leading to tracking inaccuracies.

Accordingly, while trackers and navigation systems have generally worked well for their intended purpose, there remains a need in the art to overcome one or more of the deficiencies described above.

SUMMARY

The present disclosure provides a mount assembly for use with a navigable tracker. The mount assembly includes a frame defining a seat, a coupler operatively attached to the frame for releasably securing to the navigable tracker, and a guide defining a bore and arranged in the seat for selective pivoting movement about a pivot point disposed within the bore. An anchor having a shank is arranged for selective sliding engagement with the bore. A guide lock is coupled to the frame and is selectively operable between: a locked configuration to restrict movement of both the anchor and the guide relative to the frame, and a released configuration to simultaneously permit pivoting movement of the anchor relative to the frame about the pivot point and translational movement of the anchor relative to the guide through the bore.

The present disclosure also provides a mount assembly for use with a navigable tracker, including a frame defining a seat and a coupler seat spaced from the seat, and a coupler having a tracker interface for releasably securing to the navigable tracker. The coupler has a perch arranged in the coupler seat for selective movement relative to the frame about a coupler point. A coupler lock is operatively attached to the frame and is selectively operable between: a secured configuration to restrict movement of the coupler relative to the frame, and a movable configuration to permit limited movement of the coupler relative to the frame about the coupler point. A guide defining a bore is arranged in the seat for selective pivoting movement about a pivot point spaced from the coupler point. An anchor having a shank is arranged for selective sliding engagement with the bore. A guide lock is coupled to the frame and is selectively operable between: a locked configuration to restrict movement of both the anchor and the guide relative to the frame, and a released configuration to simultaneously permit pivoting movement of the anchor relative to the frame about the pivot point and translational movement of the anchor relative to the guide through the bore.

The present disclosure also provides a mount assembly for use with a navigable tracker, including a frame defining first and second seats, and a coupler operatively attached to the frame for releasably securing to the navigable tracker. A first guide defining a first bore is arranged in the first seat for selective pivoting movement about a first pivot point, and a second guide defining a second bore is arranged in the second seat for selective pivoting movement about a second pivot point. A first anchor having a first shank is arranged for selective sliding engagement with the first bore, and a second anchor having a second shank is arranged for selective sliding engagement with the second bore. A first guide lock is coupled to the frame and is selectively operable between: a first locked configuration to restrict movement of both the first anchor and the first guide relative to the frame, and a first released configuration to simultaneously permit pivoting movement of the first anchor relative to the frame about the first pivot point and translational movement of the first anchor relative to the first guide through the first bore. A second guide lock is coupled to the frame and is selectively operable between: a second locked configuration to restrict movement of both the second anchor and the second guide relative to the frame, and a second released configuration to simultaneously permit pivoting movement of the second anchor relative to the frame about the second pivot point and translational movement of the second anchor relative to the second guide through the second bore.

Other features and advantages of the versions of the present disclosure will be readily appreciated, as the same becomes better understood, after reading the subsequent description taken in conjunction with the accompanying drawings.

BRIEF DESCRIPTION OF THE DRAWINGS

FIG. 17A is a section view of the mount assembly taken along line 17-17 in FIG. 16, shown with the guide lock arranged in a locked configuration to restrict movement of the guides and the anchors relative to the frame, and shown with the coupler lock arranged in a secured configuration to restrict movement of the coupler relative to the frame.

FIG. 21B is another section view of the mount assembly of FIG. 21A, shown with the guide lock arranged in a released configuration to simultaneously permit pivoting and translational movement of the anchors relative to the frame.

FIG. 22B is another section view of the mount assembly of FIG. 22A, shown with the coupler lock arranged in a movable configuration to permit limited movement of the coupler relative to the frame.

FIG. 36 is a section view of the frame subassembly taken along line 36-36 in FIG. 35.

It will be appreciated that one or more of the versions depicted throughout the drawings may have certain components, structural features, and/or assemblies removed, depicted schematically, and/or shown in phantom for illustrative purposes.

DETAILED DESCRIPTION

Figure 1:
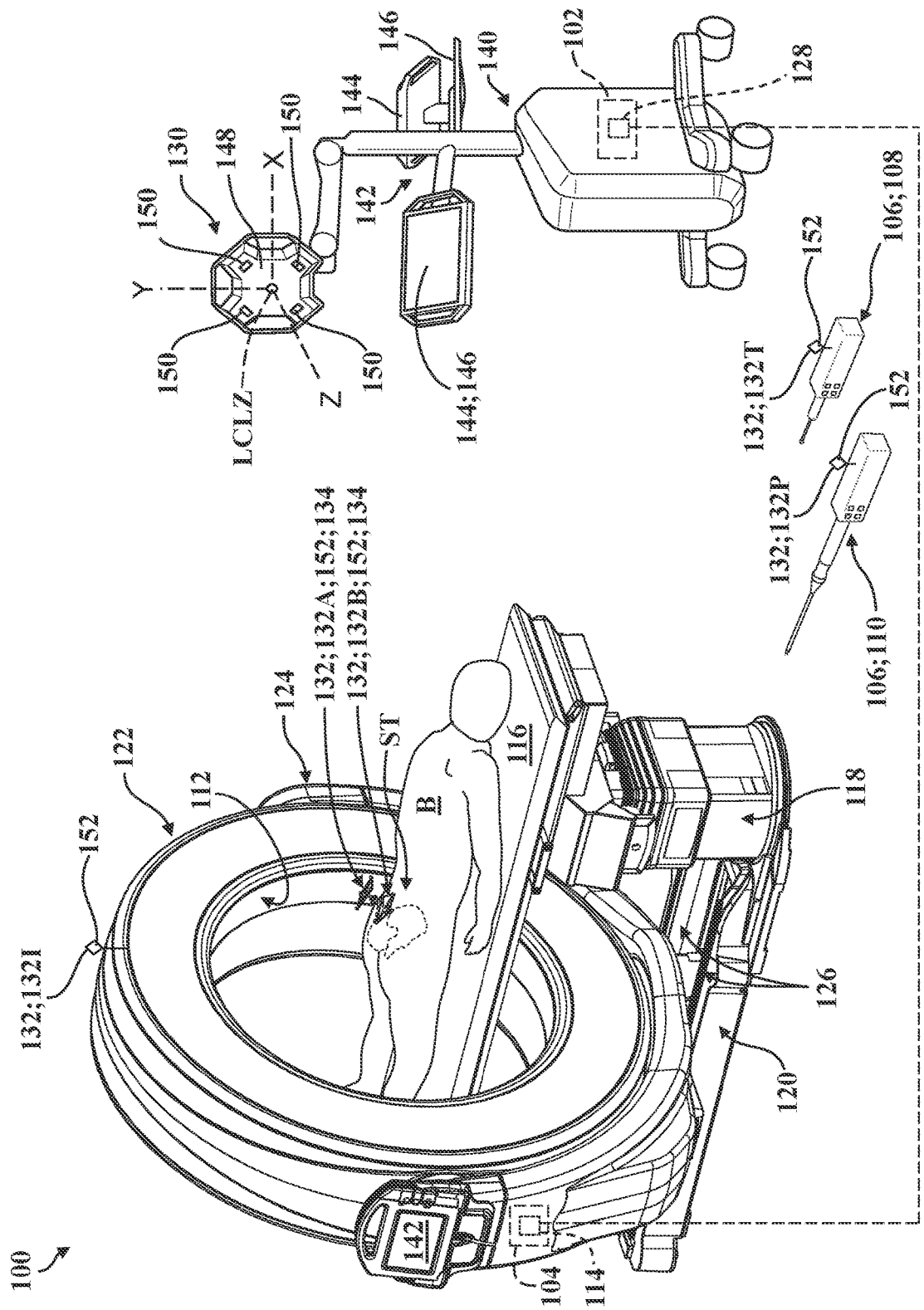
FIG. 1 is a perspective view of a surgical system shown comprising a navigation system and an imaging system supporting a patient with tracker assemblies secured adjacent to a target site according to versions of the present disclosure.

Referring now to the drawings, wherein like numerals indicate like or corresponding parts throughout the several views, a surgical system 100 is shown in FIG. 1 for treating a patient P. To this end, the illustrated surgical system 100 generally includes a navigation system 102, an imaging system 104, and one or more types of surgical instruments 106. As will be appreciated from the subsequent description below, the surgical system 100 is configured to, among other things, allow the surgeon to visualize, approach, and treat or otherwise manipulate anatomy of a patient P at a target site ST with a high level of control. To this end, imaging data ID of the target site ST may be acquired via the imaging system 104, and can be used to assist the surgeon in visualizing the patient's P anatomy at or otherwise adjacent to the target site ST. Here, the imaging data ID may also be utilized by the navigation system 102 to, among other things, facilitate navigation of surgical instruments 106 relative to the target site ST. Each of the components of the surgical system 100 introduced above will be described in greater detail below.

In FIG. 1, an operating room is shown with a patient P undergoing an exemplary surgical procedure performed using the surgical system 100. In this illustrative example, a minimally-invasive spinal surgical procedure, such as a posterior interbody spinal fusion, is being performed. It will be appreciated that the this example is illustrative, and that other types of surgical procedures are contemplated. During the surgical procedure, one or more hand-held surgical instruments 106, such as a rotary tool 108 and/or a pointer tool 110, may be used by the surgeon. As noted above and as is described in greater detail below, the navigation system 102 may be configured to track states of one or more of the surgical instruments 106 relative to the target site ST. In this exemplary surgical procedure, the rotary tool 108 may be employed as a cutting or drilling tool to remove tissue, form pilot holes (e.g., in the ilium, in vertebrae, and the like), or otherwise approach the target site ST. The rotary tool 108 may also be used to drive or otherwise install implantable components (e.g., pedicle screws, anchors, and the like).

For illustrative purposes, generically-depicted surgical instruments 106 configured for hand-held use are shown in FIG. 1. However, as will be appreciated from the subsequent description below, aspects of the surgical system 100 may be used with any suitable type of surgical instrument 106 without departing from the scope of the present disclosure. Furthermore, in addition to hand-held surgical instruments 106 of various types and configurations, aspects of the surgical system 100 may also be employed in connection with robotically-controlled surgical instruments 106 (not shown). Certain types of robotically-controlled surgical instruments 106 are disclosed in U.S. Pat. No. 9,119,655, entitled "Surgical Robotic arm Capable of Controlling a Surgical Instrument in Multiple Modes;" U.S. Pat. No. 10,456,207, entitled "Systems and Tools for use with Surgical Robotic Manipulators;" U.S. Patent Application Publication No. 2019/0231447, entitled "End Effectors And Methods For Driving Tools Guided By Surgical Robotic Systems;" U.S. Patent Application Publication No. 2016/0302871, entitled "Integrated Medical Imaging and Surgical Robotic System;" and U.S. Patent Application Publication No. 2020/0078097, entitled "Methods and Systems for Robot-Assisted Surgery," the disclosures of each of which are hereby incorporated by reference in their entirety.

As noted above, the imaging system 104 may be used to obtain imaging tata ID of the patient, which may be a human or animal patient. In the representative version illustrated in FIG. 1, the imaging system 104 is realized as an x-ray computed tomography (CT) imaging device. Here, the patient P may be positioned within a central bore 112 of the imaging system 104 and an x-ray source and detector may be rotated around the central bore 112 to obtain raw x-ray imaging data ID of the patient P. The imaging data ID may be processed using an imaging system controller 114, or another suitable controller, in order to construct three-dimensional imaging data ID, two-dimensional imaging data ID, and the like, which may be transmitted to or otherwise utilized by the navigation system 102 or other components of the surgical system 100.

In some versions, imaging data ID may be obtained preoperatively (e.g., prior to performing a surgical procedure) or intraoperatively (e.g., during a surgical procedure) by positioning the patient P within the central bore 112 of the imaging system 104. In order to obtain imaging data ID, a portion of the imaging system 104 may be moved relative to a patient support 116 (e.g., a surgical table) on which the patient P is disposed while the patient P remains stationary. Here, the patient support 116 is secured to the imaging system 104, such as via a column 118 which is mounted to a base 120 of the imaging system 104. A portion of the imaging system 104 (e.g., an O-shaped imaging gantry 122) which includes at least one imaging component may be supported by an articulable support 124 that can translate along the length of the base 120 on rails 126 to perform an imaging scan of the patient P, and may translate away from the patient P to an out-of-the-way position for performing a surgical procedure on the patient P.

An example imaging system 104 that may be used in various versions is the AIRO® intra-operative CT system manufactured by Mobius Imaging, LLC. Examples of x-ray CT imaging devices that may be used according to various versions of the present disclosure are described in U.S. Pat. No. 10,151,810, entitled "Pivoting Multi-directional X-ray Imaging System with a Pair of Diametrically Opposite Vertical Support Columns Tandemly Movable Along a Stationary Base Support;" U.S. Pat. No. 9,962,132, entitled "Multi-directional X-ray Imaging System with Single Support Column;" U.S. Pat. No. 9,801,592, entitled "Caster System for Mobile Apparatus;" U.S. Pat. No. 9,111,379, entitled "Method and System for X-ray CT Imaging;" U.S. Pat. No. 8,118,488, entitled "Mobile Medical Imaging System and Methods;" and U.S. Patent Application Publication No. 2014/0275953, entitled "Mobile X-ray Imaging System," the disclosures of each of which are hereby incorporated by reference in their entirety.

While the illustrated imaging system 104 is realized as an x-ray CT imaging device as noted above, in other versions, the imaging system 104 may comprise one or more of an x-ray fluoroscopic imaging device, a magnetic resonance (MR) imaging device, a positron emission tomography (PET) imaging device, a single-photon emission computed tomography (SPECT), or an ultrasound imaging device. Other configurations are contemplated. In some versions, the imaging system 104 may be a mobile CT device that is not attached to the patient support 116 and may be wheeled or otherwise moved over the patient P and the support 116 to perform a scan. Examples of mobile CT devices include the BodyTom® CT scanner from Samsung Electronics Co., Ltd. and the O-arm® surgical imaging system form Medtronic, plc. The imaging system 104 may also be a C-arm x-ray fluoroscopy device. In other versions, the imaging system 104 may be a fixed-bore imaging device, and the patient P may be moved into the bore of the device, either on a patient support 116 or on a separate patient table that is configured to slide in and out of the central bore 112. Further, although the imaging system 104 shown in FIG. 1 is located close to the patient P within the operating room, the imaging system 104 may be located remotely, such as in another room or building (e.g., in a hospital radiology department).

The surgical system 100 employs the navigation system 102 to, among other things, track movement of various objects, such as the surgical instruments 106 and parts of the patient's P anatomy (e.g., tissue at the surgical site ST), as well as portions of the imaging system 104 in some versions. To this end, the navigation system 102 comprises a navigation controller 128 coupled to a localizer 130 that is configured to sense the position and/or orientation of trackers 132 within a localizer coordinate system LCLZ. As is described in greater detail below, the trackers 132 (also referred to herein as "navigable trackers") are fixed, secured, or otherwise attached to specific objects, and are configured to be monitored by the localizer 130.

The navigation controller 128 is disposed in communication with the localizer 130 and gathers position and/or orientation data for each tracker 132 sensed by the localizer 130 in the localizer coordinate system LCLZ. The navigation controller 128 may be disposed in communication with the imaging system controller 114 (e.g., to receive imaging data ID) and/or in communication with other components of the surgical system 100 (e.g., robotic arm controllers, tool controllers, and the like; not shown). However, other configurations are contemplated. The controllers 114, 128 may be realized as computers, processors, control units, and the like, and may be discrete components, may be integrated, and/or may otherwise share hardware.

It will be appreciated that the localizer 130 can sense the position and/or orientation of multiple trackers 132 to track correspondingly multiple objects within the localizer coordinate system LCLZ. By way of example, and as is depicted in FIG. 1, trackers 132 may comprise a tool tracker 132T, a pointer tracker 132P, an imaging system tracker 132I, a first patient tracker 132A, and/or a second patient tracker 132B, as well as additional patient trackers, trackers for additional medical and/or surgical tools, and the like.

In FIG. 1, the tool tracker 132T, the pointer tracker 132P, and the imaging system tracker 132I are each depicted generically and are shown firmly fixed to (or otherwise integrated with) the rotary tool 108, the pointer tool 110, and the gantry 122 of the imaging system 104, respectively. The patient trackers 132A, 132B, on the other hand, are removably coupled to mount assemblies 134 to define tracker assemblies 136 which facilitate selective movement of the trackers 132A, 132B relative to their mount assemblies 134 according to versions of the present disclosure, as described in greater detail below. Here, the tracker assemblies 136 are firmly fixed to different portions of the patient's P anatomy (e.g., to opposing lateral sides of the ilium) via anchors 138 which are configured to releasably engage tissue (e.g., bone). It will be appreciated that trackers 132 may be firmly affixed to different types of tracked objects (e.g., discrete bones, tools, pointers, and the like) in a number of different ways.

The position of the patient trackers 132A, 132B relative to the anatomy of the patient P to which they are attached can be determined by known registration techniques, such as point-based registration in which pointer tool 110 (to which the pointer tracker 132P is fixed) is used to touch off on bony landmarks on bone, or to touch off on several points across the bone for surface-based registration. Conventional registration techniques can be employed to correlate the pose of the patient trackers 132A, 132B to the patient's anatomy. Other types of registration are also possible.

Position and/or orientation data may be gathered, determined, or otherwise handled by the navigation controller 128 using conventional registration/navigation techniques to determine coordinates of each tracker 132 within the localizer coordinate system LCLZ. These coordinates may be utilized by various components of the surgical system 100 (e.g., to facilitate control of the surgical instruments 106, to facilitate navigation based on imaging data ID, and the like).

In the representative version illustrated in FIG. 1, the navigation controller 128 and the localizer 130 are supported on a mobile cart 140 which is movable relative to the base 120 of the imaging system 104. The mobile cart 140 also supports a user interface, generally indicated at 142, to facilitate operation of the navigation system 102 by displaying information to, and/or by receiving information from, the surgeon or another user. The user interface 142 may be disposed in communication with other components of the surgical system 100 (e.g., with the imaging system 104), and may comprise one or more output devices 144 (e.g., monitors, indicators, display screens, and the like) to present information to the surgeon (e.g., images, video, data, a graphics, navigable menus, and the like), and one or more input devices 146 (e.g., buttons, touch screens, keyboards, mice, gesture or voice-based input devices, and the like).

In some versions, the surgical system 100 is capable of displaying a virtual representation of the relative positions and orientations of tracked objects to the surgeon or other users of the surgical system 100, such as with images and/or graphical representations of the anatomy of the patient P and the surgical instrument 106 presented on one or more output devices 144 (e.g., a display screen). The navigation controller 128 may also utilize the user interface 142 to display instructions or request information from the surgeon or other users of the surgical system 100. Other configurations are contemplated. One type of mobile cart 140 and user interface 142 of this type of navigation system 102 is described in U.S. Pat. No. 7,725,162, entitled "Surgery System," the disclosure of which is hereby incorporated by reference in its entirety.

Because the mobile cart 140 and the gantry 122 of the imaging system 104 can be positioned relative to each other and also relative to the patient P in the representative version illustrated in FIG. 1, the navigation system 102 can transform the coordinates of each tracker 132 from the localizer coordinate system LCLZ into other coordinate systems (e.g., defined by different trackers 132, localizers 130, and the like), or vice versa, so that navigation relative to the target site ST (or control of surgical instruments 106) can be based at least partially on the relative positions and orientations of multiple trackers 132 within a common coordinate system (e.g., the localizer coordinate system LCLZ). Coordinates can be transformed using a number of different conventional coordinate system transformation techniques. It will be appreciated that the localizer 130 or other components of the navigation system 102 could be arranged, supported, or otherwise configured in other ways without departing from the scope of the present disclosure. By way of non-limiting example, the localizer 130 could be coupled to the imaging system 104 in some versions (e.g., to the gantry 122). Other configurations are contemplated.

In the illustrated version, the localizer 130 is an optical localizer and includes a camera unit 148 with one or more optical position sensors 150. The navigation system 102 employs the optical position sensors 150 of the camera unit 148 to sense the position and/or orientation of the trackers 132 within the localizer coordinate system LCLZ. To this end, the trackers 132 each employ one or more markers 152 (also referred to as "fiducials" in some versions) that are supported on an array 154 in a predetermined arrangement. However, as will be appreciated from the subsequent description below, trackers 132 may have different configurations, such as with different quantities of markers 152 that can be secured to or otherwise formed in other structures besides the arrays 154 illustrated throughout the drawings (e.g., various types of housings, frames, surfaces, and the like). Other configurations are contemplated.

In the representative version illustrated herein, the trackers 132 each employ "passive" markers 152 (e.g., reflective markers such as spheres, cones, and the like) which reflect emitted light that is sensed by the optical position sensors 150 of the camera unit 148. In some versions, trackers 132 could employ "active" markers 152 (e.g., light emitting diodes "LEDs"), which emit light that is sensed by the optical position sensors 150 of the camera unit 148. Examples of navigation systems 102 of these types are described in U.S. Pat. No. 9,008,757, entitled "Navigation System Including Optical and Non-Optical Sensors," the disclosure of which is hereby incorporated by reference in its entirety.

Although one version of the mobile cart 140 and localizer 130 of the navigation system 102 is illustrated in FIG. 1, it will be appreciated that the navigation system 102 may have any other suitable configuration for monitoring trackers 132 which, as will be appreciated from the subsequent description below, may be of various types and configurations and could employ various types of markers 152. Thus, for the purposes of clarity and consistency, the term "marker 152" is used herein to refer to a portion of a tracker 132 (e.g., a passive marker 152 mounted to an array 154) that can be monitored by a localizer 130 to track (e.g., states, motion, position, orientation, and the like) of the object to which the tracker 132 is secured, irrespective of the specific type or configuration of the localizer 130 and/or tracker 132.

In some versions, the navigation system 102 and/or the localizer 130 could be radio frequency (RF) based. For example, the navigation system 102 may comprise an RF transceiver coupled to the navigation controller 128. Here, the trackers 132 may comprise markers 152 realized as RF emitters or transponders, which may be passive or may be actively energized. The RF transceiver transmits an RF tracking signal, and the RF emitters respond with RF signals such that tracked states are communicated to (or interpreted by) the navigation controller 128. The RF signals may be of any suitable frequency. The RF transceiver may be positioned at any suitable location to track the objects using RF signals effectively. Furthermore, it will be appreciated that versions of RF-based navigation systems may have structural configurations that are different than the navigation system 102 illustrated throughout the drawings.

In some versions, the navigation system 102 and/or localizer 130 may be electromagnetically (EM) based. For example, the navigation system 102 may comprise an EM transceiver coupled to the navigation controller 128. Here, the trackers 132 may comprise markers 152 realized as EM components (e.g., various types of magnetic trackers, electromagnetic trackers, inductive trackers, and the like), which may be passive or may be actively energized. The EM transceiver generates an EM field, and the EM components respond with EM signals such that tracked states are communicated to (or interpreted by) the navigation controller 128. The navigation controller 128 may analyze the received EM signals to associate relative states thereto. Here too, it will be appreciated that versions of EM-based navigation systems may have structural configurations that are different than the navigation system 102 illustrated throughout the drawings.

Those having ordinary skill in the art will appreciate that the navigation system 102 and/or localizer 130 may have any other suitable components or structure not specifically recited herein. Furthermore, any of the techniques, methods, and/or components described above with respect to the camera-based navigation system 102 shown throughout the drawings may be implemented or provided for any of the other versions of the navigation system 102 described herein. For example, the navigation system 102 may also be based on one or more of inertial tracking, ultrasonic tracking, image-based optical tracking (e.g., with markers 152 are defined by patterns, shapes, edges, and the like that can be monitored with a camera), or any combination of tracking techniques. Other configurations are contemplated.

Figure 2:
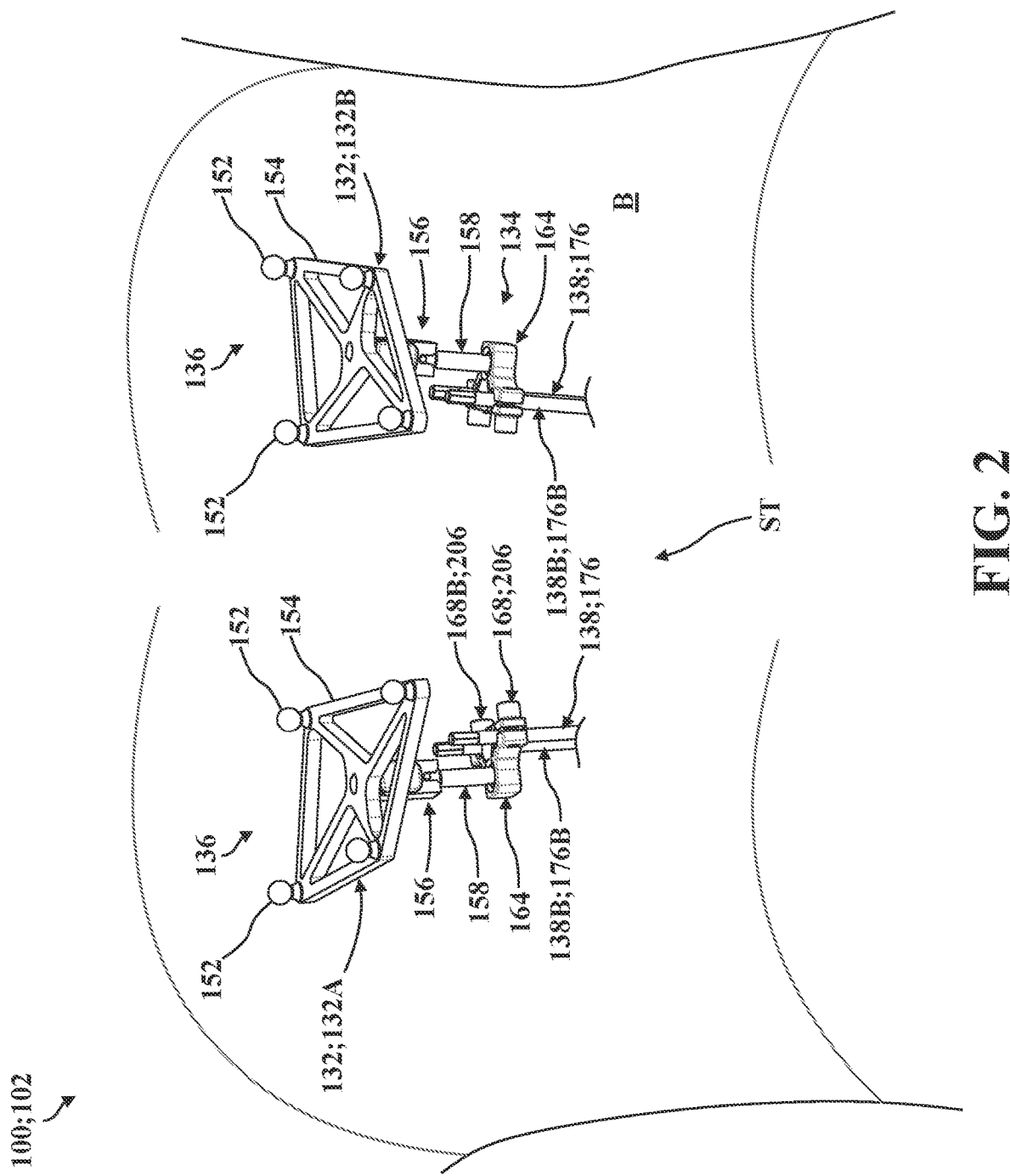
FIG. 2 is a partial perspective view of the tracker assemblies of FIG. 1 secured adjacent to the target site of the patient, the tracker assemblies each shown having a navigable tracker secured to a respective mount assembly.

Referring now to FIGS. 1-2, as noted above, the patient trackers 132A, 132B are supported on respective mount assemblies 134 according to versions of the present disclosure which, in turn, are secured to different portions of the patient's P anatomy (e.g., on opposing lateral sides of the ilium). In the representative versions of the patient trackers 132A, 132B illustrated throughout the drawings, each of the patient trackers 132A, 132B comprises a respective array 154 to which four markers 152 are secured. As noted above, the markers 152 in this illustrative versions are realized as "passive" reflective spheres that can be removably secured to the array 154. However, those having ordinary skill in the art will appreciate that other configurations are contemplated, and the patient trackers 132A, 132B could be of various styles, types, and/or configurations, and could employ any suitable quantity, type, and/or arrangement of markers 152 without departing from the scope of the present disclosure.

Figure 5:
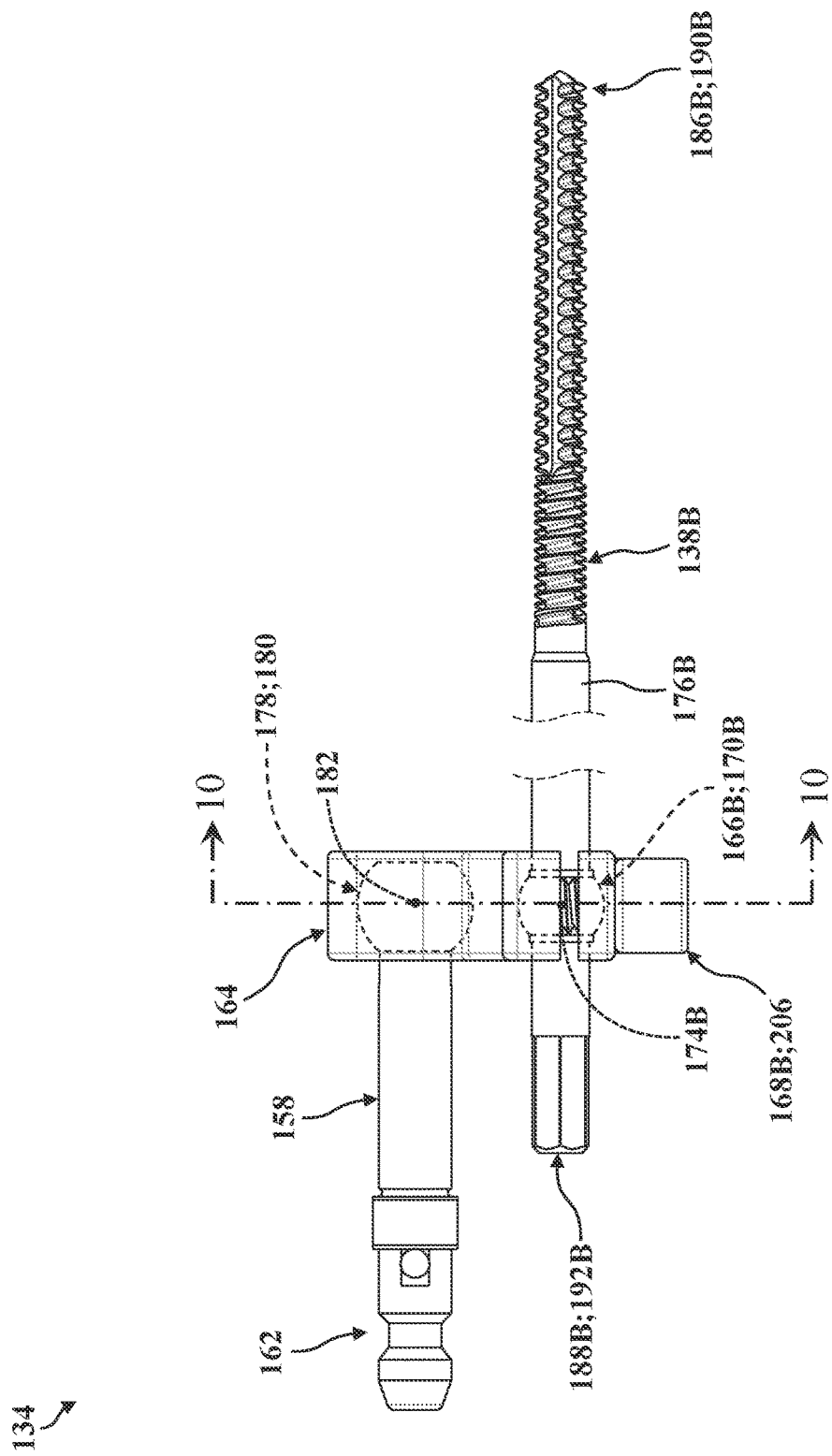
FIG. 5 is a broken, right-side plan view of the mount assembly of FIGS. 2-4.

The illustrated patient trackers 132A, 132B also each comprise a dock, generally indicated at 156, that is operatively attached to the array 154 and is configured to releasably attach to a coupler 158 of the mount assembly 134 which, as is described in greater detail below, is configured to be adjustably positionable relative to the anchors 138 (and, thus, to the patient's P anatomy). As is best shown in FIG. 5, the dock 156 defines a keyed socket 160 that is shaped to receive a tracker interface 162 of the coupler 158 to effect a rigid kinematic link between the coupler 158 and the tracker 132. A portion of the dock 156 (e.g., a button, lever, and the like) may be arranged for engagement by a user (e.g., the surgeon) to effect releasing the patient tracker 132A, 132B from the coupler 158 of the mount assembly 134. While not described in detail herein, this type of dock 156 is employed in connection with "active marker" trackers described in U.S. Pat. No. 7,725,162, entitled "Surgery System," the disclosure of which is incorporated by reference in its entirety. However, it will be appreciated that releasable attachment to the patient trackers 132A, 132B may be effected in other ways sufficient to effect a rigid kinematic link with the mount assembly 134. Moreover, it is contemplated that, in some versions, the patient tracker 132A, 132B may be fixed or otherwise secured to the coupler 158 of the mount assembly 134. Other configurations are contemplated.

Figure 3A:
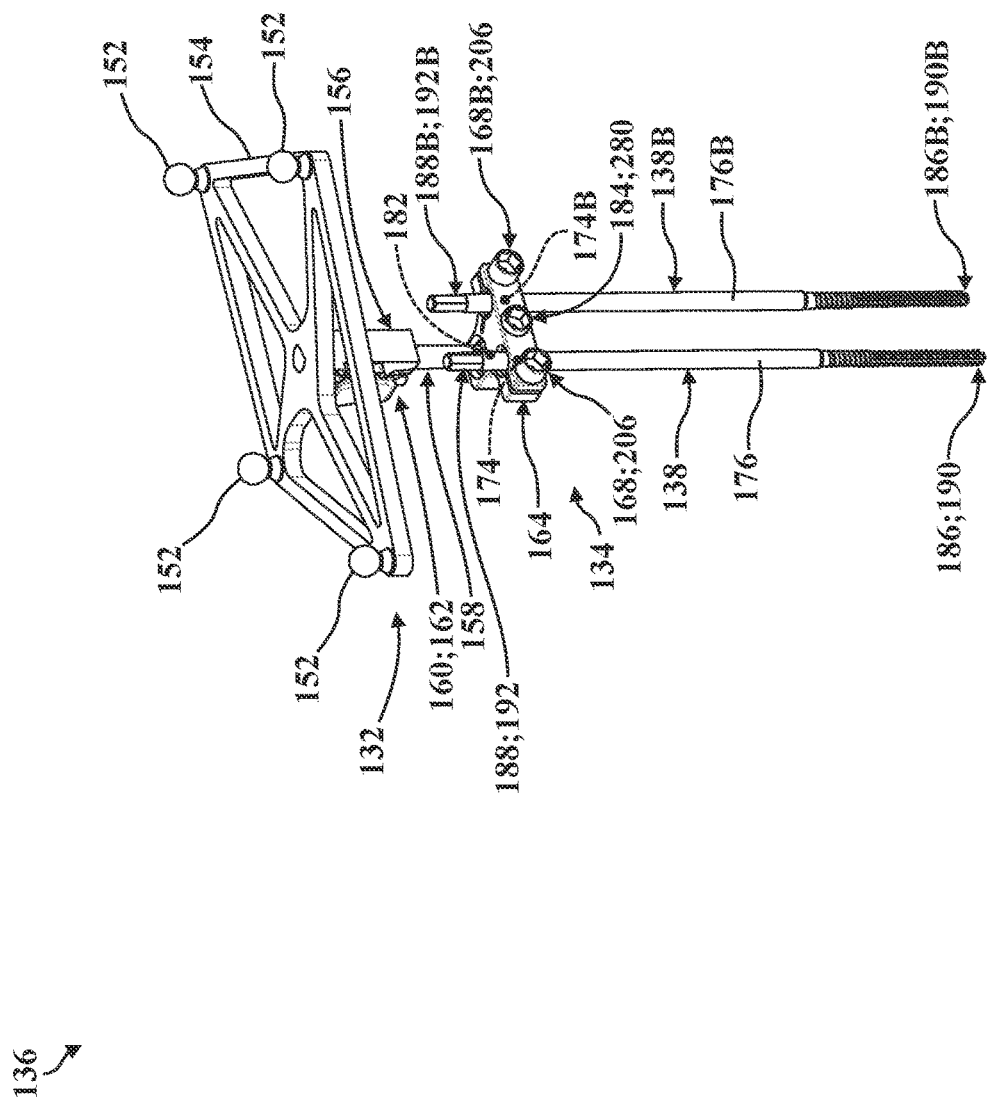
FIG. 3A is a perspective view of one of tracker assemblies of FIGS. 1-2, the mount assembly shown having a frame subassembly with a coupler supporting the navigable tracker in a first exemplary tracker arrangement relative to a frame via a coupler lock, and anchors disposed in guides supported by the frame and locked in first exemplary anchor arrangements relative to the frame via guide locks.
Figure 3B:
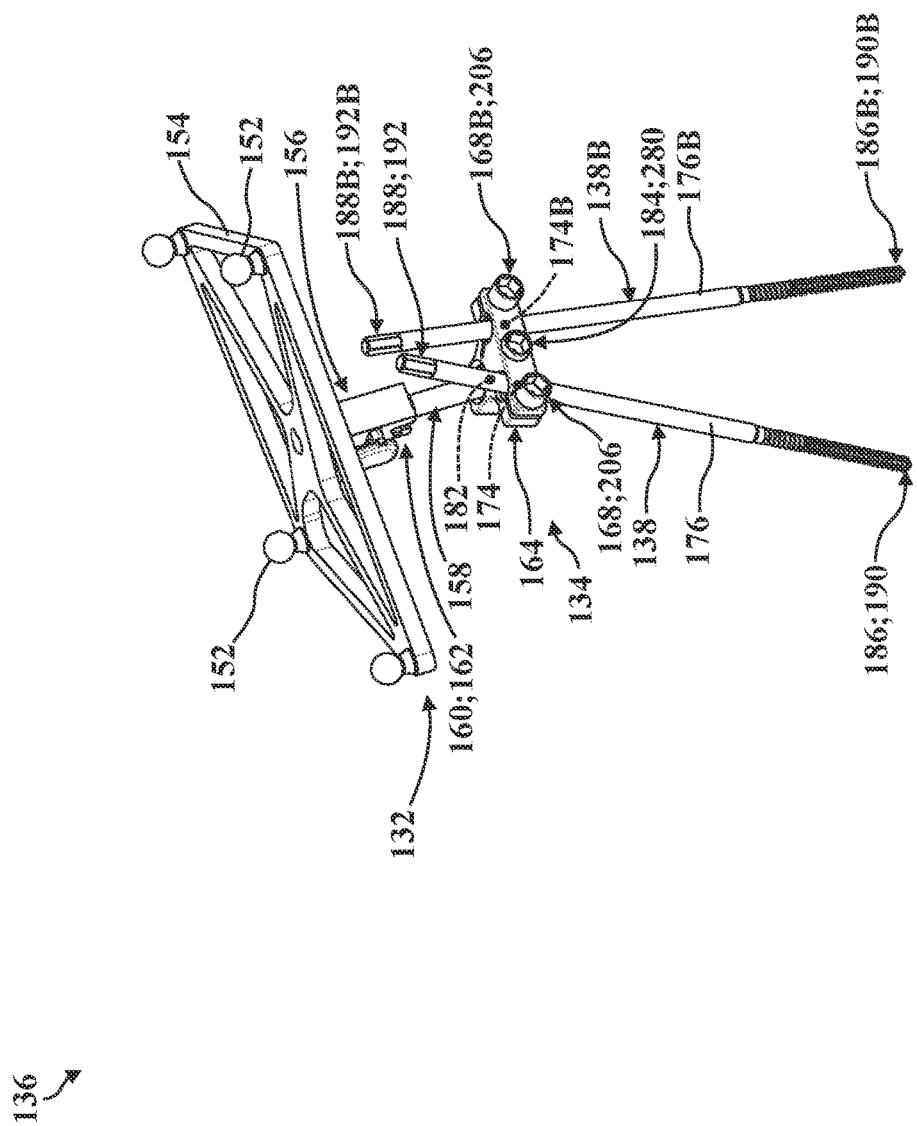
FIG. 3B is another perspective view of the tracker assembly of FIG. 3B, shown with the coupler of the mount assembly supporting the navigable tracker in a second exemplary tracker arrangement relative to the frame, and with the anchors locked in second exemplary anchor arrangements relative to the frame.
Figure 4:
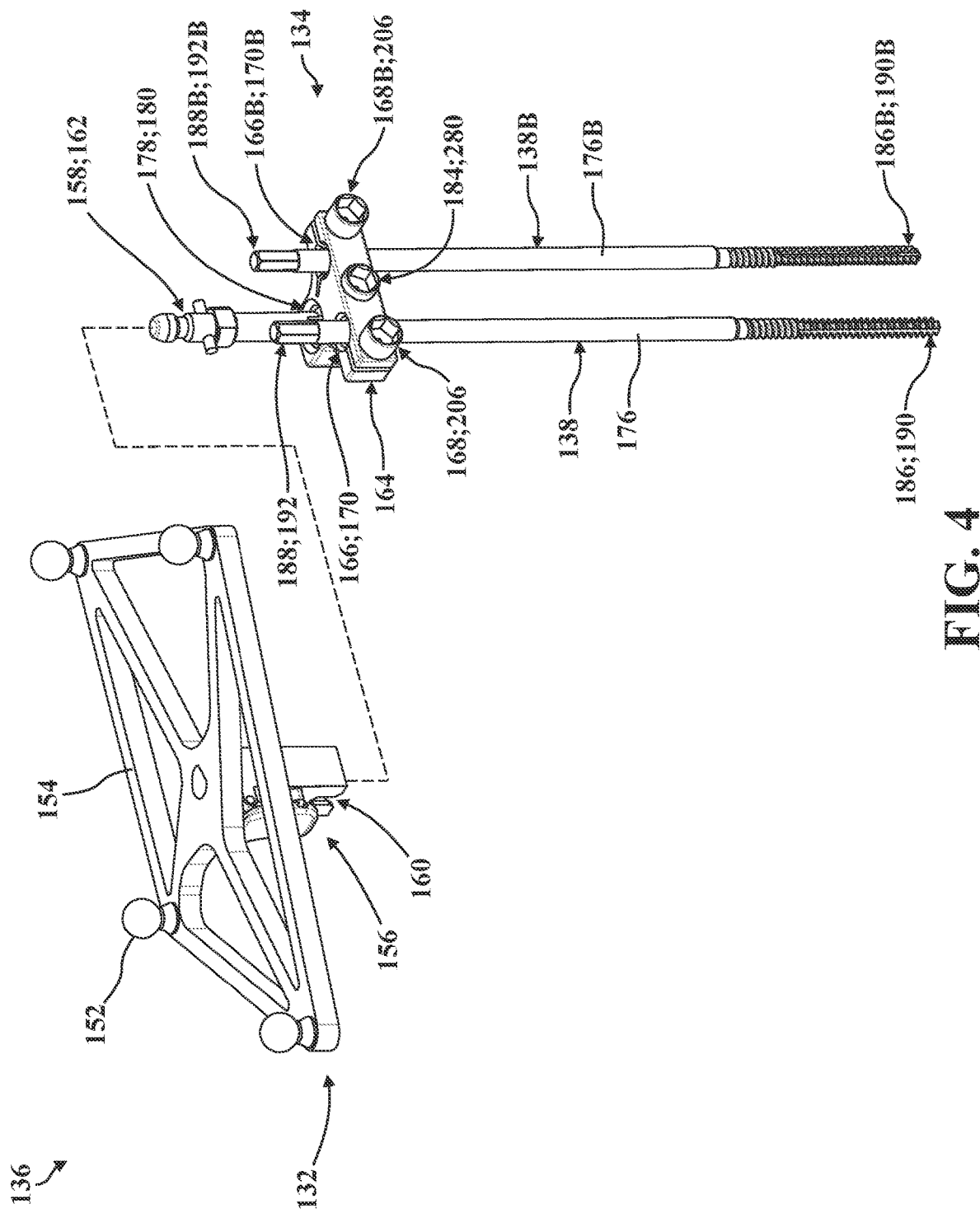
FIG. 4 is an exploded perspective view of the tracker assembly of FIGS. 2-3B, shown with the navigable tracker spaced from the coupler of the mount assembly.

For the purposes of clarity and consistency, subsequent use herein of the term "tracker 132" refers to one of the patient trackers 132A, 132B described above, unless otherwise indicated. Referring now to FIGS. 3A-4, one of the tracker assemblies 136 is shown generally comprising the tracker 132 and the mount assembly 134 according to versions of the present disclosure. As noted above, the mount assembly 134 employs one or more anchors 138 to facilitate releasable attachment to tissue (e.g., bone) of the patient's P anatomy while, at the same time, affording a high level of selectively adjustable positioning of the tracker 132 relative to the tissue.

To this end, in versions of the present disclosure, the mount assembly 134 generally comprises the anchor 138, the coupler 158, a frame 164, a guide 166 (see FIGS. 4 and 6), and a guide lock 168. The frame 164 defines a seat 170 (see FIGS. 7-9), and the coupler 158 is operatively attached to the frame 164 in spaced relation from the seat 170, as described in greater detail below. The coupler 158 supports the tracker 132 relative to the frame 164, such as by releasably securing the tracker 132 to the mount assembly 134 via releasable attachment of the tracker interface 162 to the dock 156. The guide 166 defines a bore 172 (see FIGS. 6-8) and is arranged in the seat 170 for selective pivoting movement about a pivot point 174 disposed within the bore 172. The anchor 138 has a shank 176 arranged for selective sliding engagement with the bore 172 of the guide 166. The guide lock 168 is coupled to the frame 164 and is selectively operable between: a locked configuration CL (see FIG. 10A) to restrict movement of both the anchor 138 and the guide 166 relative to the frame 164; and a released configuration CR (see FIG. 10B) to simultaneously permit pivoting movement of the anchor 138 and the guide 166 relative to the frame 164 about the pivot point 174, and translational movement of the anchor 138 relative to the guide 166 (and, thus, relative to the frame 164) through the bore 172. Each of the components of the mount assembly 134 introduced above in connection with the guide lock 168 will be described in greater detail below.

As will be appreciated from the subsequent description below, the guide lock 168 introduced above allows the user to position the frame 164 in various arrangements relative to the anchor 138 (and, thus, relative to the patient P) while in the released configuration CR, and ensures that the frame 164 (and, thus, the tracker 132) remains stationary relative to the anchor 138 while in the locked configuration CL. Moreover, the simultaneous pivoting and translation of the anchor 138 effected via the guide 166 in the seat 170 (when the guide lock 168 operates in the released configuration CR) affords a significant amount of adjustability between the anchor 138 and the frame 164 in multiple degrees of freedom (compare FIGS. 3A-3B) while, at the same time, providing a compact overall profile that promotes consistent and reliable attachment of the tracker 132 to the patient's P anatomy.

In the representative version of the mount assembly 134 illustrated in FIGS. 3A-4 (and also in FIGS. 5-13), the coupler 158 is operatively attached to the frame 164 for releasably securing the tracker 132, as noted above, and is also configured to permit selective movement of the coupler 158 in order to allow the user to arrange the tracker 132 in different orientations relative to the frame 164. To this end, in versions of the present disclosure, the frame 164 defines a coupler seat 178 that is disposed in spaced relation from the seat 170 (see FIG. 9). Here, the coupler 158 has a perch 180 that is operatively attached to and spaced from the tracker interface 162, and is arranged in the coupler seat 178 for selective movement relative to the frame 164 about a coupler point 182. A coupler lock 184 operatively attached to the frame 164 is selectively operable between: a secured configuration CS (see FIG. 10A) to restrict movement of the coupler 158 relative to the frame 164 about the coupler point 182; and movable configuration CM (see FIG. 10B) to permit limited movement of the coupler 158 relative to the frame 164 about the coupler point 182. Each of the components of the mount assembly 134 introduced above in connection with the coupler lock 184 will be described in greater detail below.

As will be appreciated from the subsequent description below, the coupler lock 184 introduced above allows the user to position the tracker 132 in various arrangements relative to the frame 164 (and, thus, relative to the anchor 138 and the patient P) while in the movable configuration CM, and ensures that the tracker 132 remains stationary relative to the frame 164 (and, thus, relative to the anchor 138 and the patient P) while in the secured configuration CS. Here too, the pivoting of the coupler 158 effected via the perch 180 in the coupler seat 178 (when the coupler lock 184 operates in the movable configuration CM) affords a significant amount of adjustability between the tracker 132 and the frame 164 in multiple degrees of freedom (compare FIGS. 3A-3B) while, at the same time, providing a compact overall profile that promotes consistent and reliable attachment of the tracker 132 to the patient's P anatomy. As will be appreciated from the subsequent description below, versions of the present disclosure may utilize other types of coupler locks 184 (e.g., as depicted in FIGS. 18-22B and/or FIGS. 23-32). Furthermore, as noted above, it is contemplated that mount assemblies 134 could be configured without a coupler lock 184 in certain versions, such as where the tracker 132 is rigidly coupled to the frame 164 (not shown).

Referring now to FIGS. 3A-13, in the illustrated version of the mount assembly 134, a second guide 166B defining a second bore 172B is arranged in a second seat 170B defined by the frame 164 for selective pivoting movement about a second pivot point 174B disposed within the second bore 172B. Here, a second anchor 138B is provided with a second shank 176B arranged for selective sliding engagement with the second bore 172B. In this representative version, a second guide lock 168B is coupled to the frame 164 and is selectively operable between: a second locked configuration CL2 to restrict movement of both the second anchor 138B and the second guide 166B relative to the frame 164; and a second released configuration CR2 to simultaneously permit pivoting movement of the second anchor 138B relative to the frame 164 about the second pivot point 174B, and translational movement of the second anchor 138B relative to the second guide 166 though the second bore 172B.

It will be appreciated that this configuration affords significant stability between the frame 164 and the patient's P anatomy in that two separately articulable anchors 138, 138B can be employed to engage tissue at different locations from a variety of different angles, heights, and the like, while still affording a low profile and reliable retention of the tracker 132. Those having ordinary skill in the art will appreciate that two anchors 138, 138B may be utilized to engage tissue from different trajectories (e.g., non-parallel), which can afford opportunities for mounting trackers 132 in orientations that would otherwise be difficult to implement or potentially unstable based such as on the patient's P body position or type, the surgeon's preferred approach or method, the types of surgical instruments 106 being utilized, the type of imaging system 104 being used (e.g., clearance relative to the central bore 112), and the like. However, versions of the present disclosure also contemplate mount assemblies 134 where only a single anchor 138 is utilized for certain applications, but two anchors 138, 138B can also be utilized. Here too, it is contemplated that the mount assembly 134 could be configured to utilize a single anchor 138, or more than two anchors 138, 138B.

As will be appreciated from the subsequent description below, versions of the mount assembly 134 which utilize two guide locks 168, 168B allow the user to independently (e.g., successively) install and then secure the anchors 138, 138B, and/or to adjust the frame 164 arrangement relative to each anchor 138, 138B separately. However, in some versions, such as the versions described in greater detail below in connection with FIGS. 14-22B, the mount assembly 134 may be configured such that a single guide lock 168 can be used to simultaneously lock both anchors 138, 138B and both guides 166, 166B relative to the frame 164.

Figure 6:
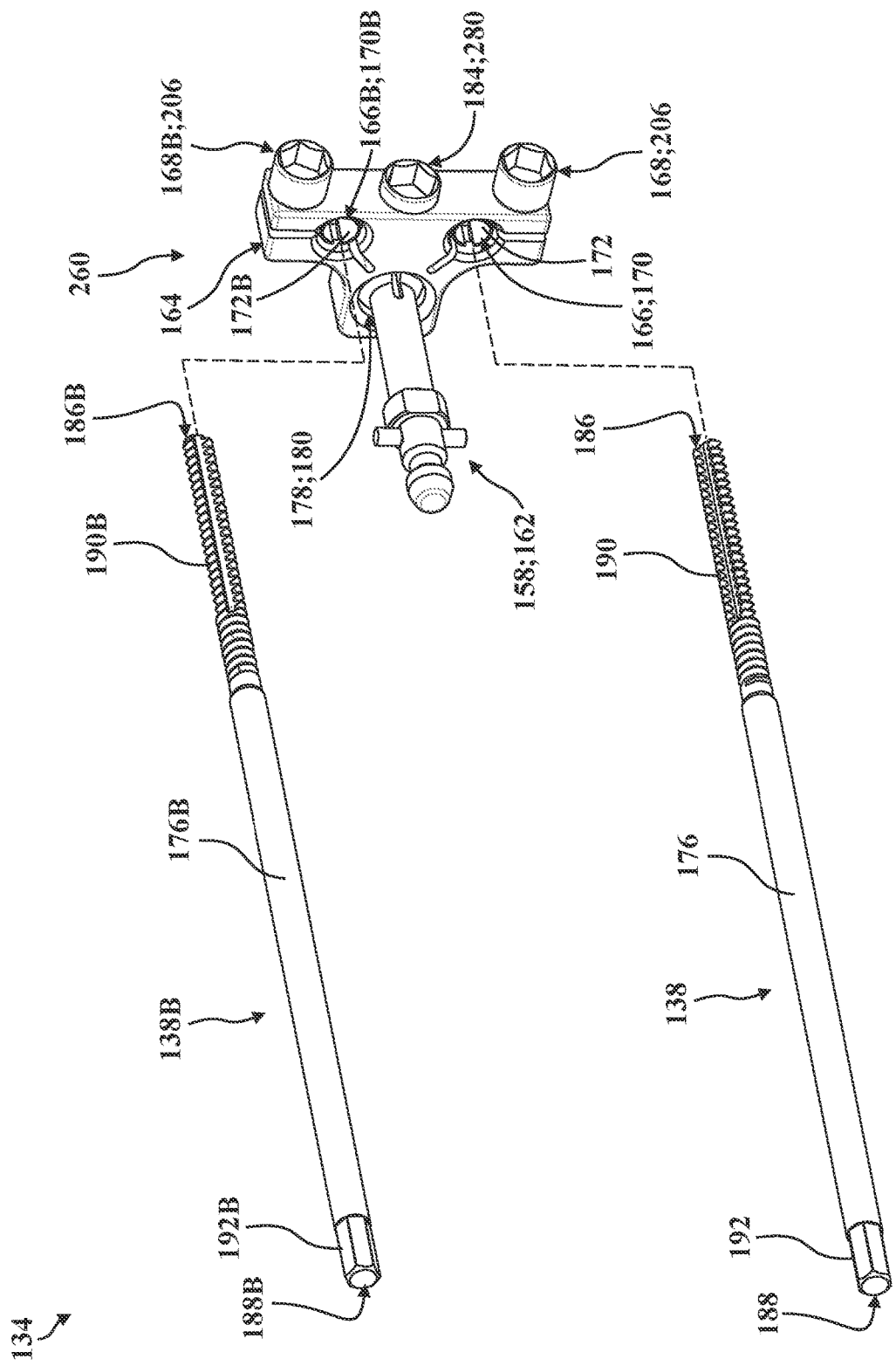
FIG. 6 is a partially-exploded perspective view of the mount assembly of FIGS. 2-5, shown with the anchors spaced from a frame subassembly.

In the representative versions illustrated throughout the drawings, and as is best depicted in FIG. 6, the anchors 138, 138B are substantially similar to each other and have respective distal ends 186, 186B and proximal ends 188, 188B with the shanks 176, 176B extending therebetween. The distal ends 186, 186B of the anchors 138, 138B have respective threads 190, 190B configured to engage tissue (e.g., bones of the patient's P anatomy), and the proximal ends 188, 188B define rotational interfaces 192, 192B for receiving rotational torque (e.g., via a rotary tool 108, a screwdriver, and the like) to facilitate advancing (or retracting) the threads 190, 190B into tissue of the patient P. In some versions, the proximal ends 188 are shaped to enter into and pass through the respective bores 172, 172B of the guides 166, 166B to bring the shanks 176, 176B into sliding engagement with the respective bores 172, 172B when the guide locks 168, 168B (or guide lock 168) operate in the released configurations CR, CR2. The shanks 176, 176B have substantially cylindrical profiles configured for sliding engagement with the respective bores 172, 17B of the guides 166, 166B such that rotational torque applied to the rotational interfaces 192, 192B effects rotation of the shanks 176, 176B relative to the frame 164 when the guide locks 168, 168B (or guide lock 168) operate in the released configurations CR, CR2. Thus, with this configuration, the user can install one anchor 138, with or without placing the shank 176 into the bore 172 of the guide 166, before subsequently installing the second anchor 138B. Here, in versions where two guide locks 168, 168B are utilized, the frame 164 can be secured to the anchor 138 with the guide lock 168 in the locked configuration CL while the user installs the second anchor 138B, with the second anchor 138B positioned within the second bore 172 while the second guide lock 168B operates in the second released configuration CR2. Put differently, the user can advance or retract the second anchor 138B through the second bore 172B while the frame 164 is locked to the anchor 138 in order to help facilitate optimized installation of the second anchor 138B. However, it will be appreciated that various workflows are contemplated by the present disclosure.

While the two anchors 138, 138B illustrated throughout the drawings have similar lengths and employ similar threads 190, 190B, rotational interfaces 192, 192B, and shanks 176, 176B, it will be appreciated that the anchors 138, 138B could be of different styles, types, and/or configurations (e.g., as is depicted in connection with the version of the mount assembly 134 of FIGS. 23-32), and could be the same as or different from each other in some versions. Other configurations are contemplated. Furthermore, the second seat 170B, the second guide 166B, the second bore 172B, and the second guide lock 168B operable between the second locked and released configurations CL2, CR2 are, respectively, substantially similar the seat 170, the guide 166, the bore 172, and the guide lock 168 operable between the locked and released configurations CL, CR. Here, for the purposes of clarity, consistency, and brevity, throughout the subsequent description of the versions of the mount assemblies 134, reference made to the seat 170, the guide 166, the bore 172, and the guide lock 168 operable between the locked and released configurations CL, CR, or components and/or structural features thereof, also generally applies to the second seat 170B, the second guide 166B, the second bore 172B, and the second guide lock 168B operable between the second locked and released configurations CL2, CR2, unless otherwise indicated.

Figure 7:
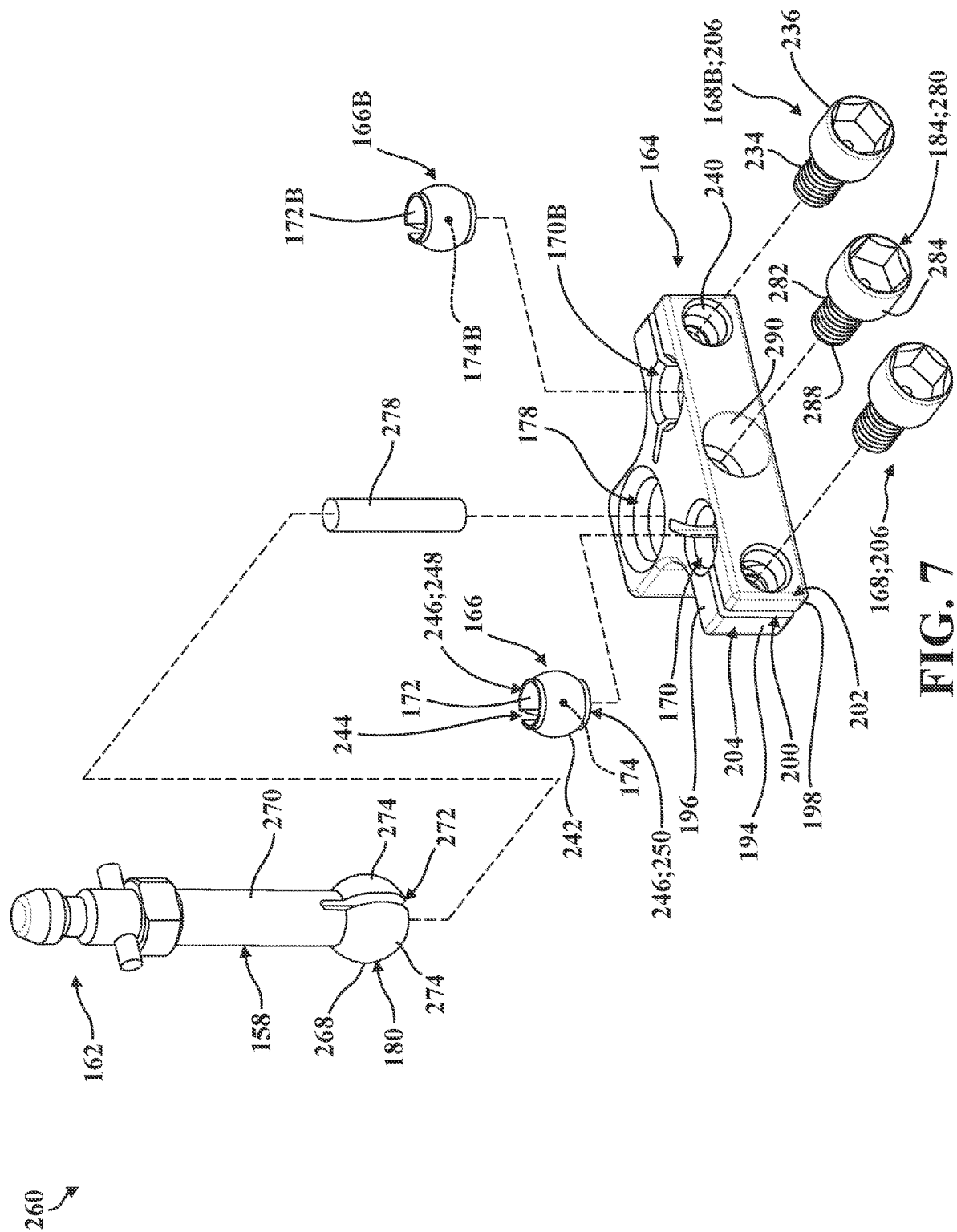
FIG. 7 is an exploded perspective view of the frame subassembly of the mount assembly of FIGS. 2-6.
Figure 8:
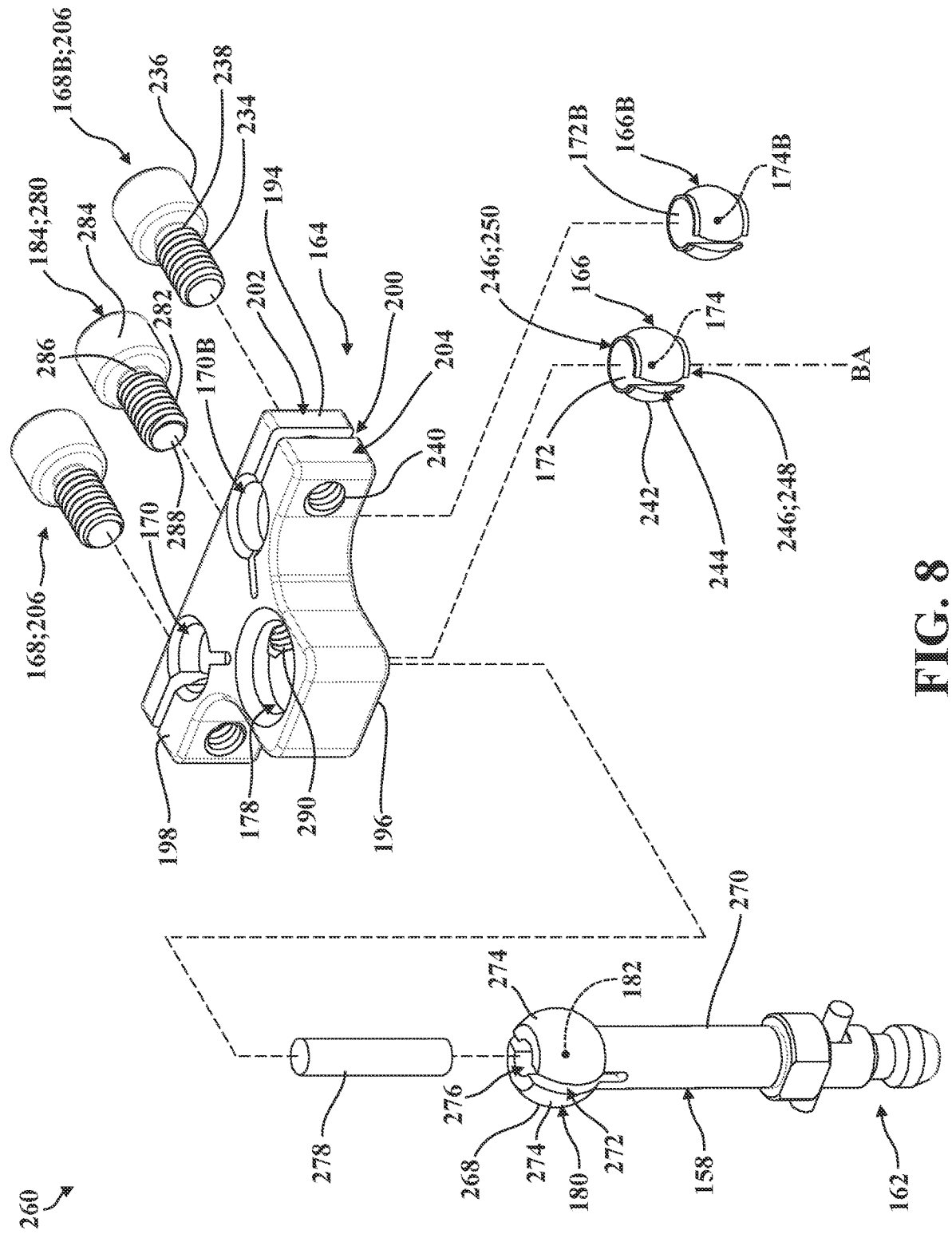
FIG. 8 is another exploded perspective view of the frame subassembly of the mount assembly of FIGS. 2-6.
Figure 9:
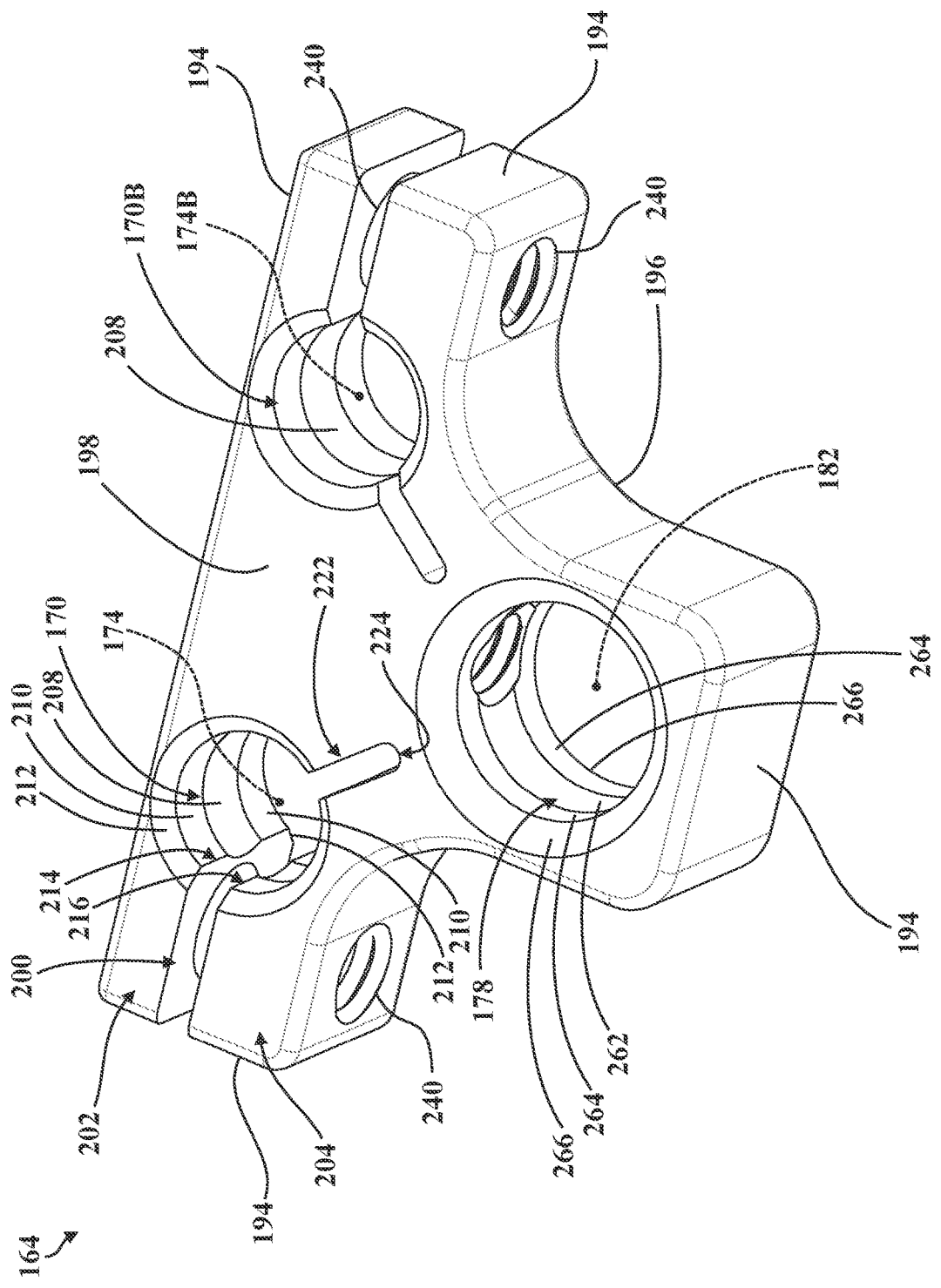
FIG. 9 is a perspective view of the frame of the mount assembly of FIGS. 2-6.
Figure 10A:
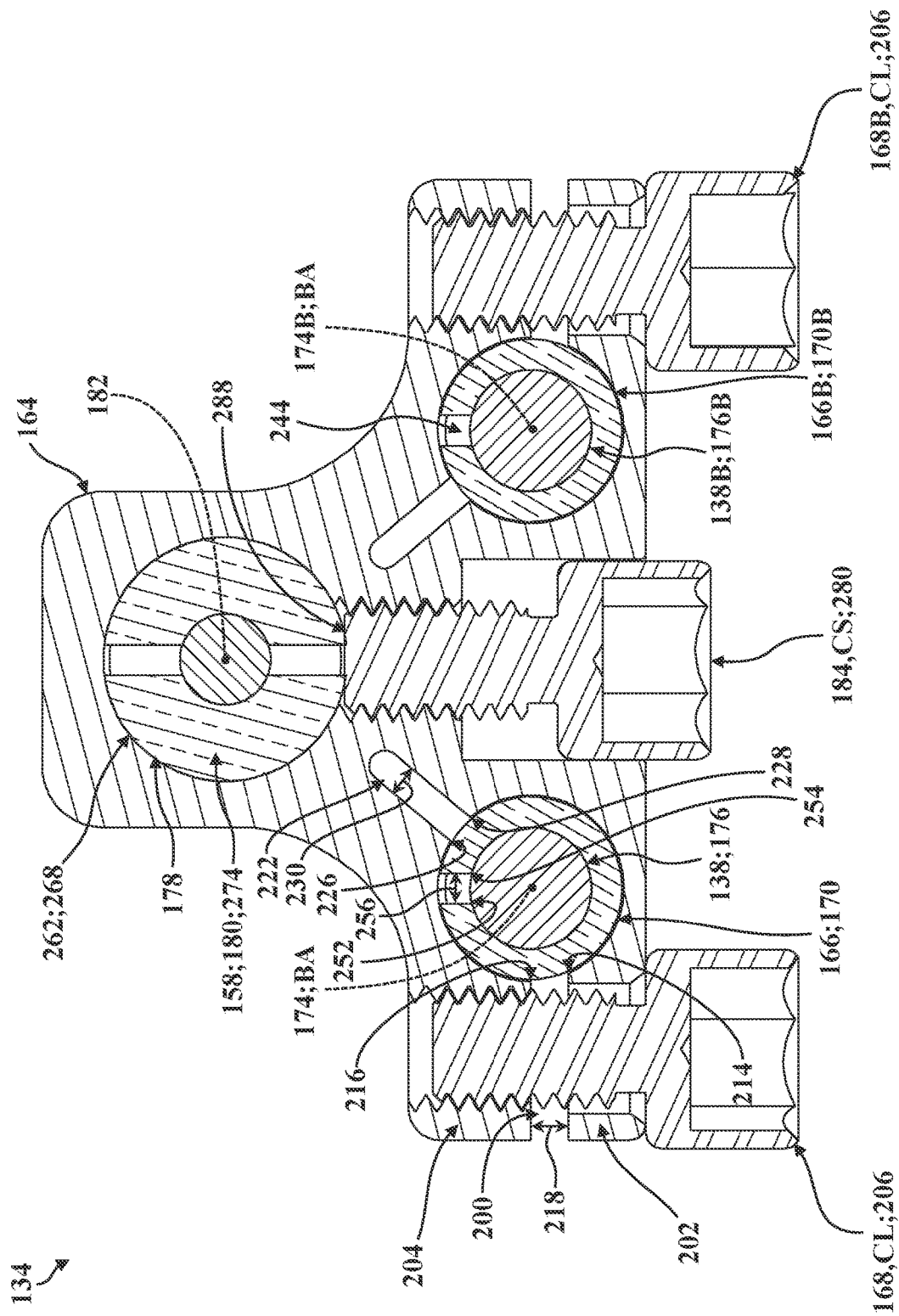
FIG. 10A is a section view of the mount assembly taken along line 10-10 in FIG. 5, shown with the guide locks arranged in locked configurations to restrict movement of the guides and the anchors relative to the frame, and shown with the coupler lock arranged in a secured configuration to restrict movement of the coupler relative to the frame.

Referring now to FIGS. 7-9, as noted above, the frame 164 of the mount assembly 134 defines the seat 170 and the coupler seat 178. In the illustrated version, the frame 164 has an outer frame surface 194, an upper frame surface 196, and a lower frame surface 198. The outer frame surface 194 is arranged generally vertically between the upper frame surface 196 and the lower frame surface 198. In the illustrated versions, the pivot point 174 is arranged vertically between the upper and lower frame surfaces 196, 198 (see FIG. 12).

A frame slot, generally indicated at 200, is formed extending through the upper and lower frame surfaces 196, 198 and extends into the seat 170 to define first and second flexure portions 202, 204 which facilitate operation of the guide lock 168 between the locked and released configurations CL, CR in the illustrated version. To this end, the representative version of the guide lock 168 includes a guide retainer 206 operatively attached to the frame 164 to urge the first and second flexure portions 202, 204 towards each other in response to changing operation from the released configuration CR to the locked configuration CL (compare FIGS. 10A-10B; movement of flexure portions 202, 204 not shown in detail). Here, the first and second flexure portions 202, 204 of the frame 164 are arranged or otherwise configured to resiliently move away from each other in response to changing operation from the locked configuration CL to the released configuration CR (compare FIGS. 10A-10B).

The frame slot 200 extends into the seat 170 to define the first and second flexure portions 202, 204, as noted above. As is best shown in FIG. 9, the seat 170 has a curved region 208, transition regions 210 extending from the curved region 208, and tapered regions 212 extending from the transition regions 210 to the upper and lower frame surfaces 196, 198. Here, the curved region 208 has a generally spherical profile to facilitate pivoting movement of the guide 166 about the pivot point 174. The transition regions 210 have a generally cylindrical profile that is sized and arranged to facilitate retention of the guide 166 within the seat 170. The tapered regions 212 have a generally frustoconical profile that are shaped and arranged to facilitate pivoting of the guide 166 together with the anchor 138 about the pivot point 174.

Figure 10B:
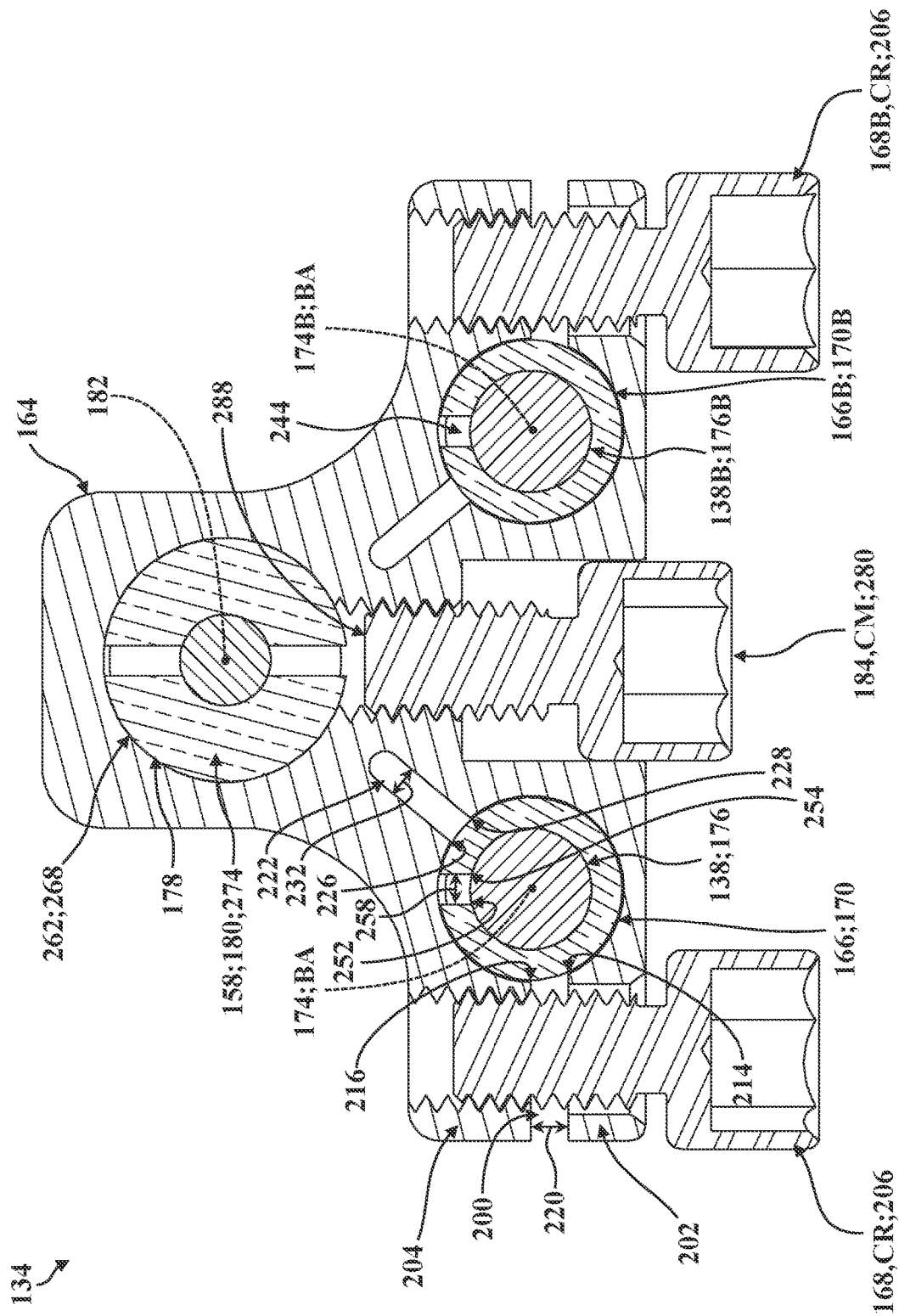
FIG. 10B is another section view of the mount assembly of FIG. 10A, shown with the guide locks arranged in a released configuration to simultaneously permit pivoting and translational movement of the anchors relative to the frame, and shown with the coupler lock arranged in a movable configuration to permit limited movement of the coupler relative to the frame.
Figure 11:
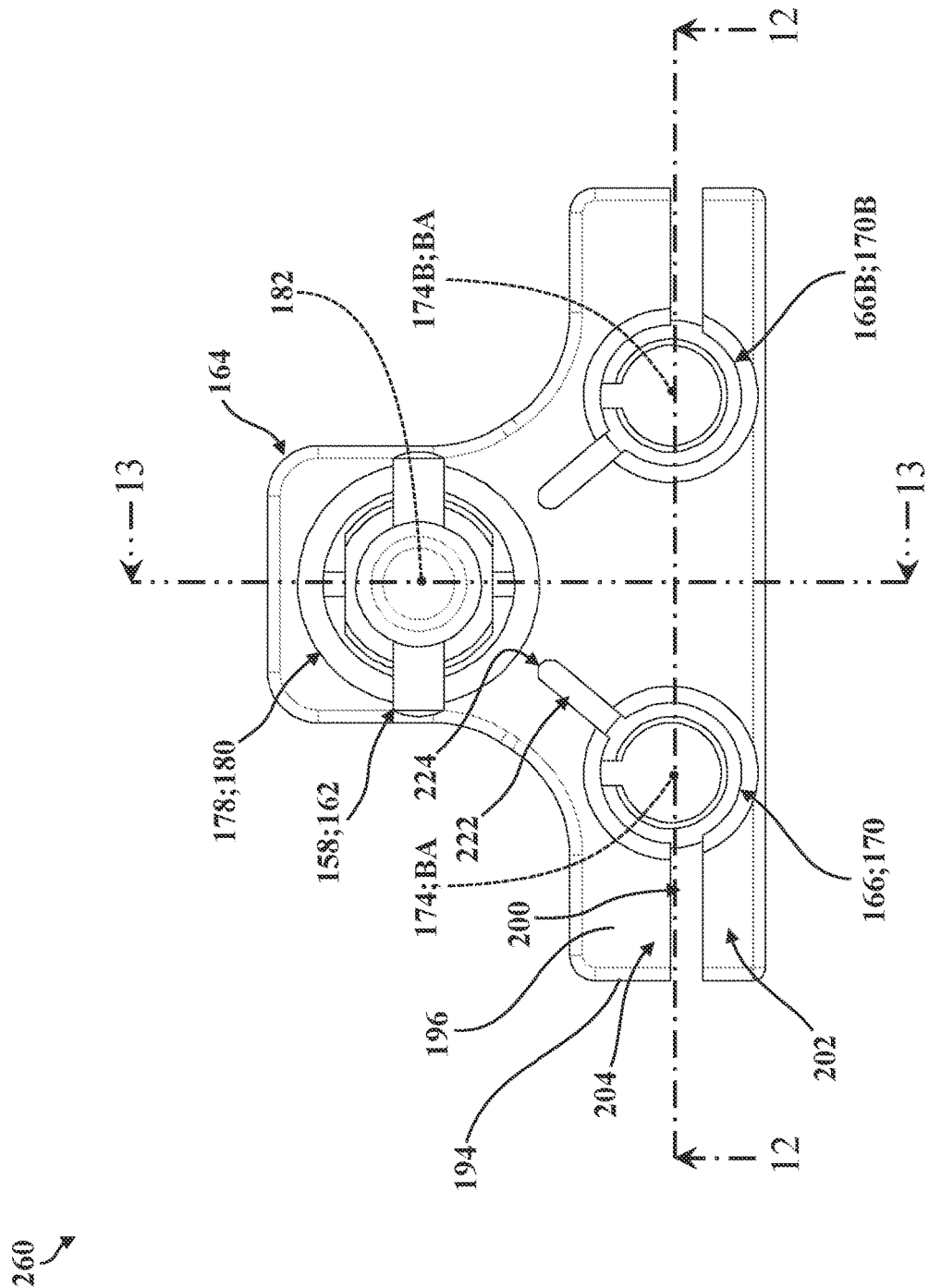
FIG. 11 is a top-side plan view of the frame subassembly of FIGS. 7-8 employed by the mount assembly of FIGS. 2-6 and 9-10B.
Figure 12:
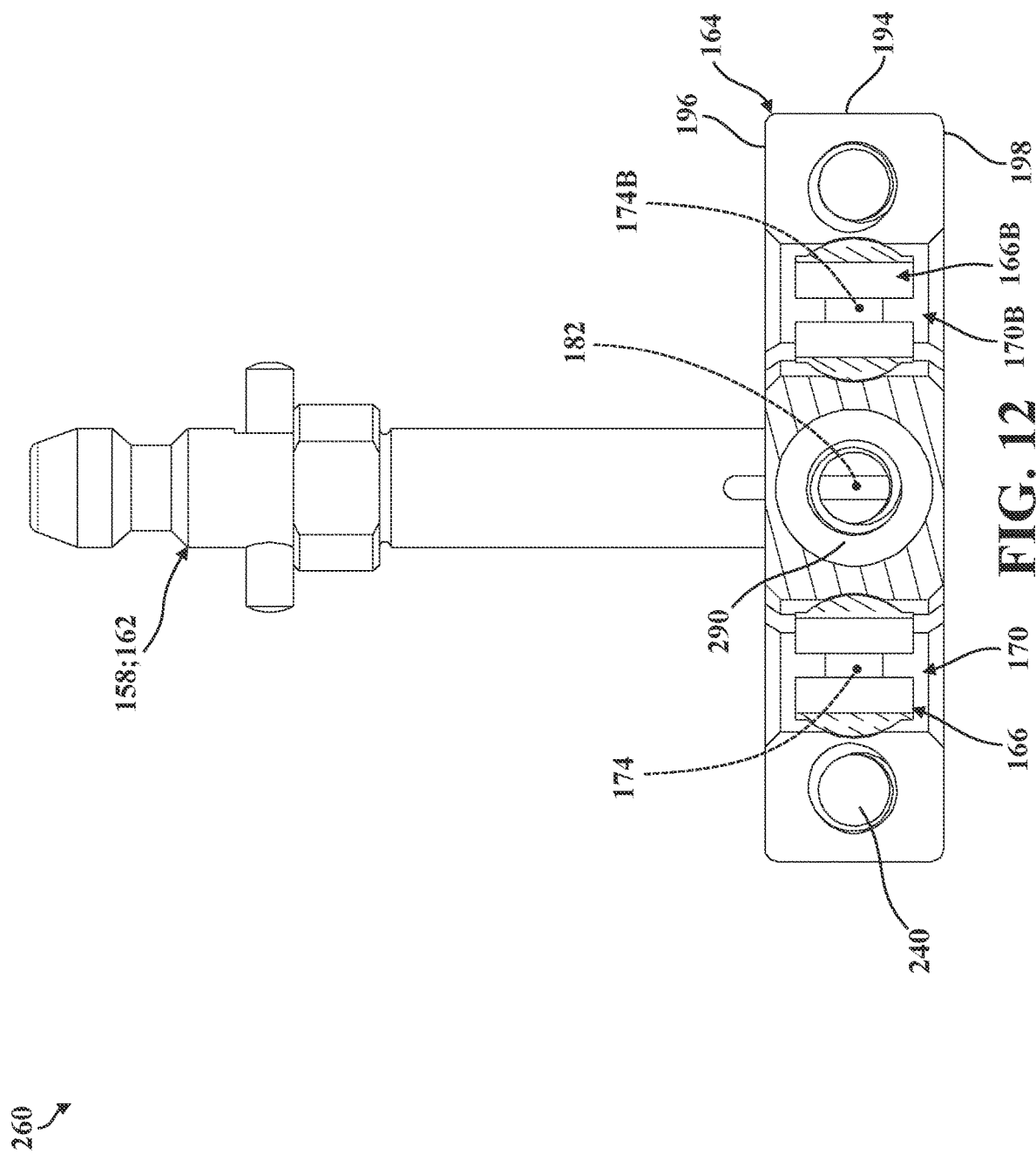
FIG. 12 is a section view of the frame subassembly taken along line 12-12 in FIG. 11.
Figure 13:
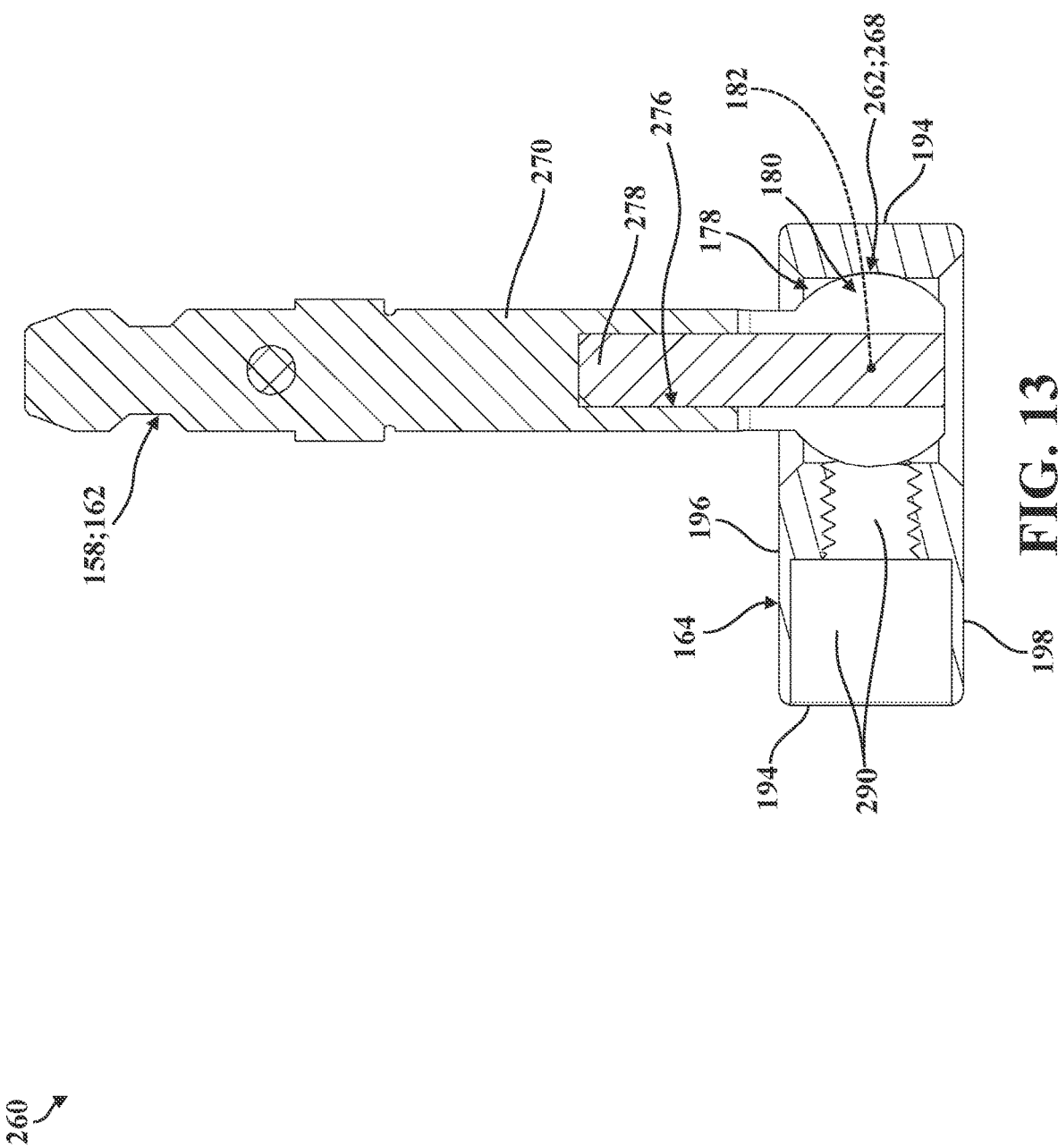
FIG. 13 is a section view of the frame subassembly taken along line 13-13 in FIG. 11.
Figure 14:
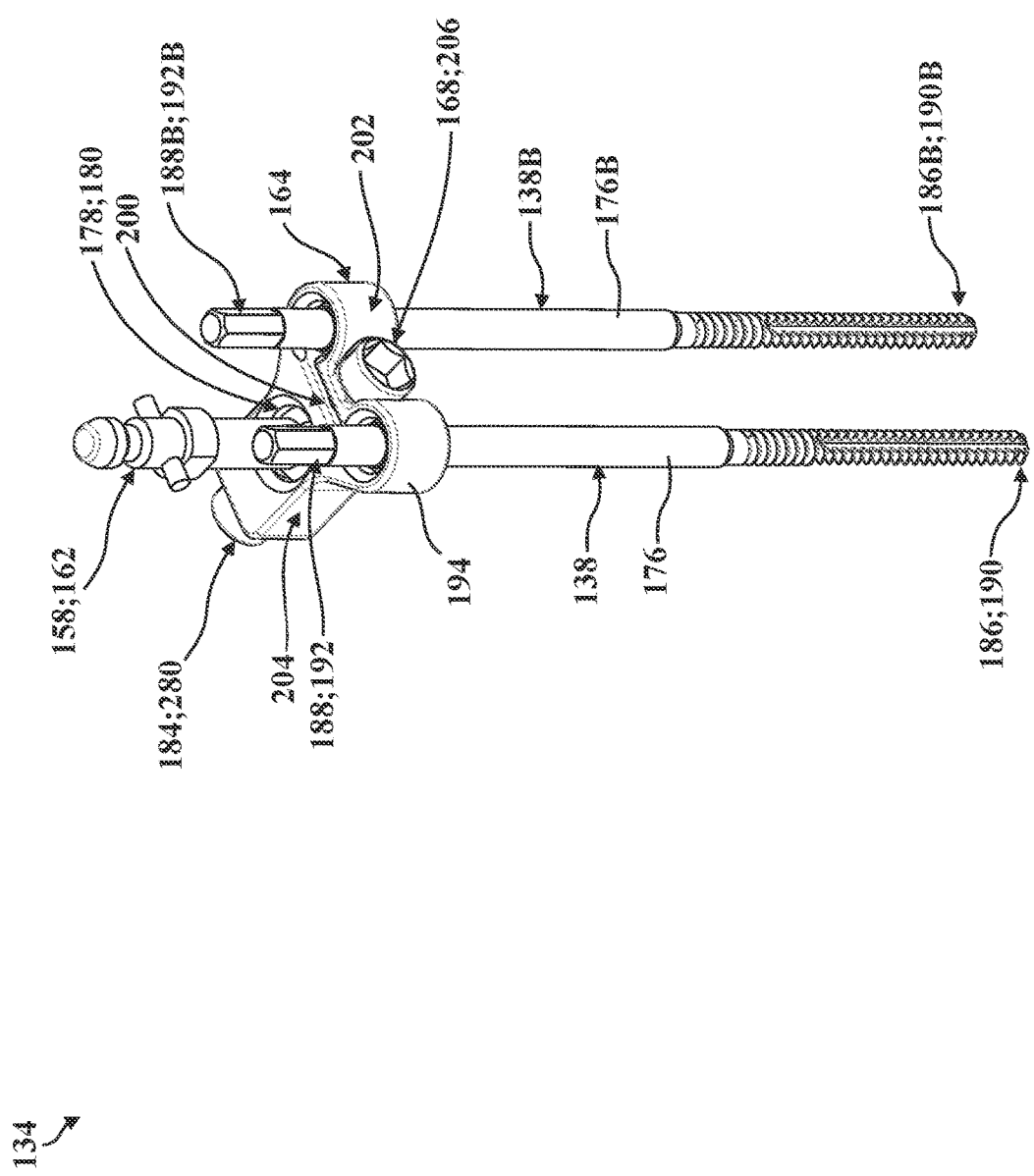
FIG. 14 is a perspective view of another version of a mount assembly according to the present disclosure, shown having a frame subassembly with a coupler for supporting a navigable tracker relative to a frame via a coupler lock, and anchors disposed in guides supported by the frame and locked in exemplary anchor arrangements relative to the frame via a guide lock.
Figure 15:
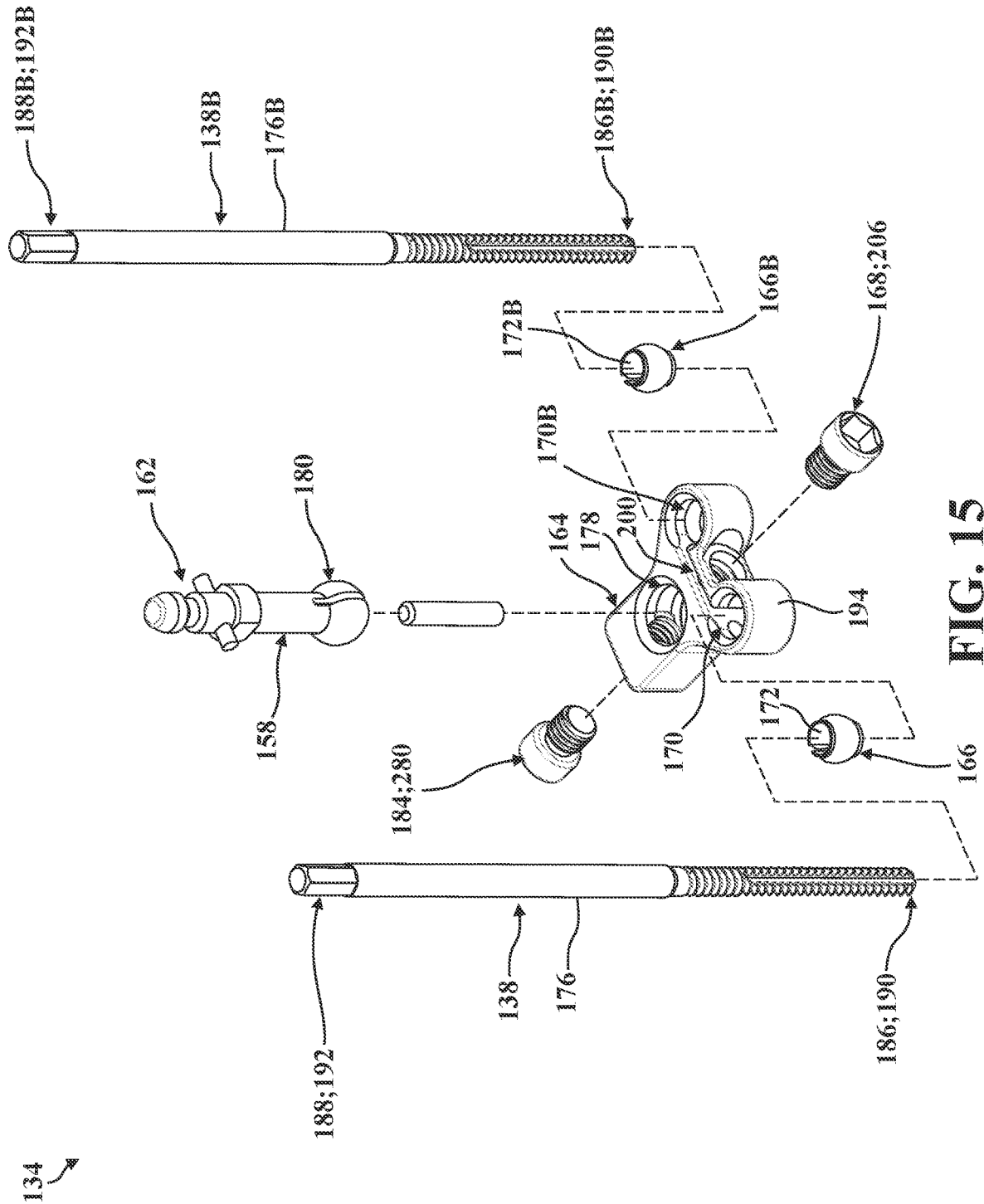
FIG. 15 is an exploded perspective view of the mount assembly of FIG. 14.
Figure 16:
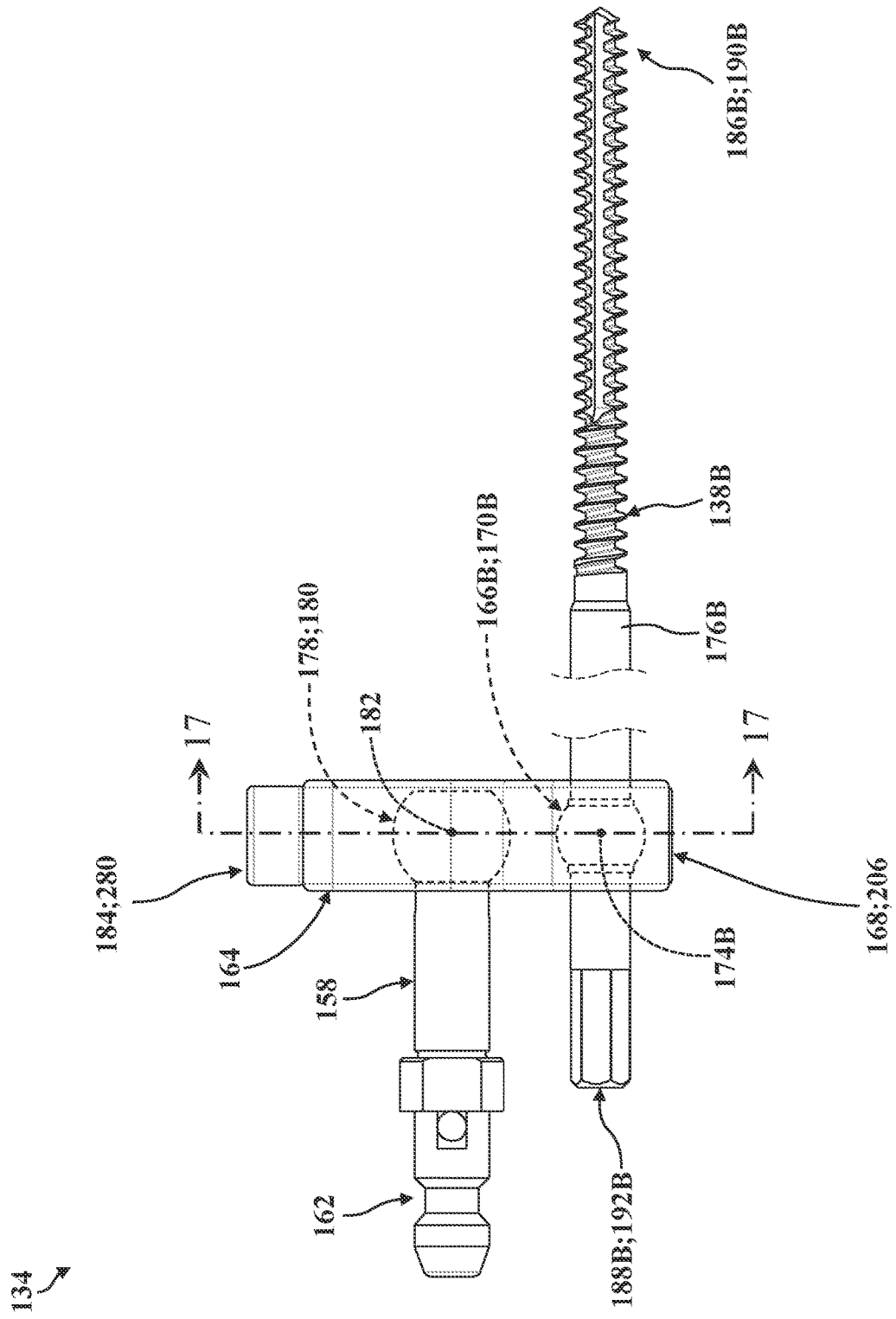
FIG. 16 is a broken, right-side plan view of the mount assembly of FIGS. 14-15.
Figure 17B:
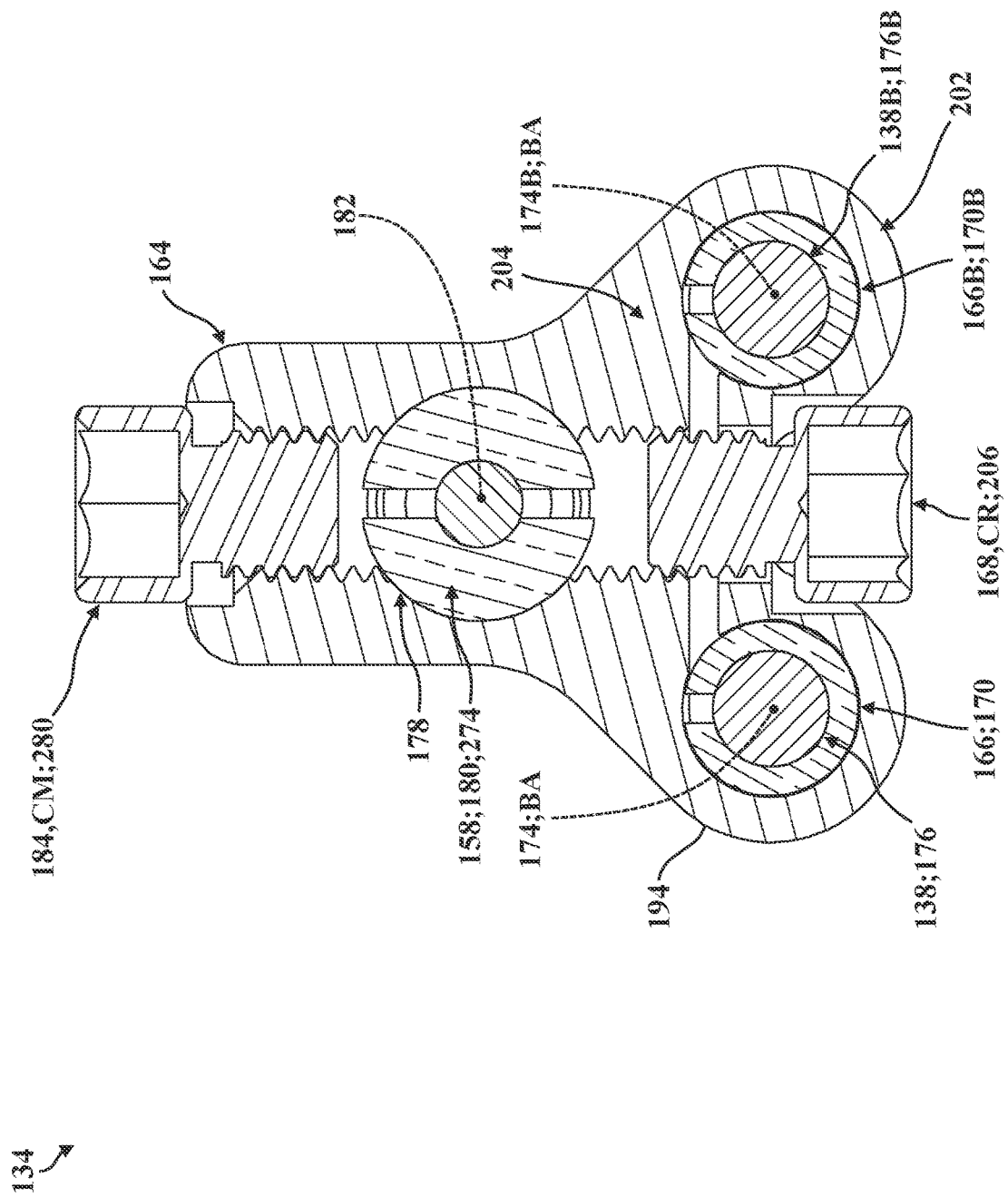
FIG. 17B is another section view of the mount assembly of FIG. 17A, shown with the guide lock arranged in a released configuration to simultaneously permit pivoting and translational movement of the anchors relative to the frame, and shown with the coupler lock arranged in a movable configuration to permit limited movement of the coupler relative to the frame.
Figure 18:
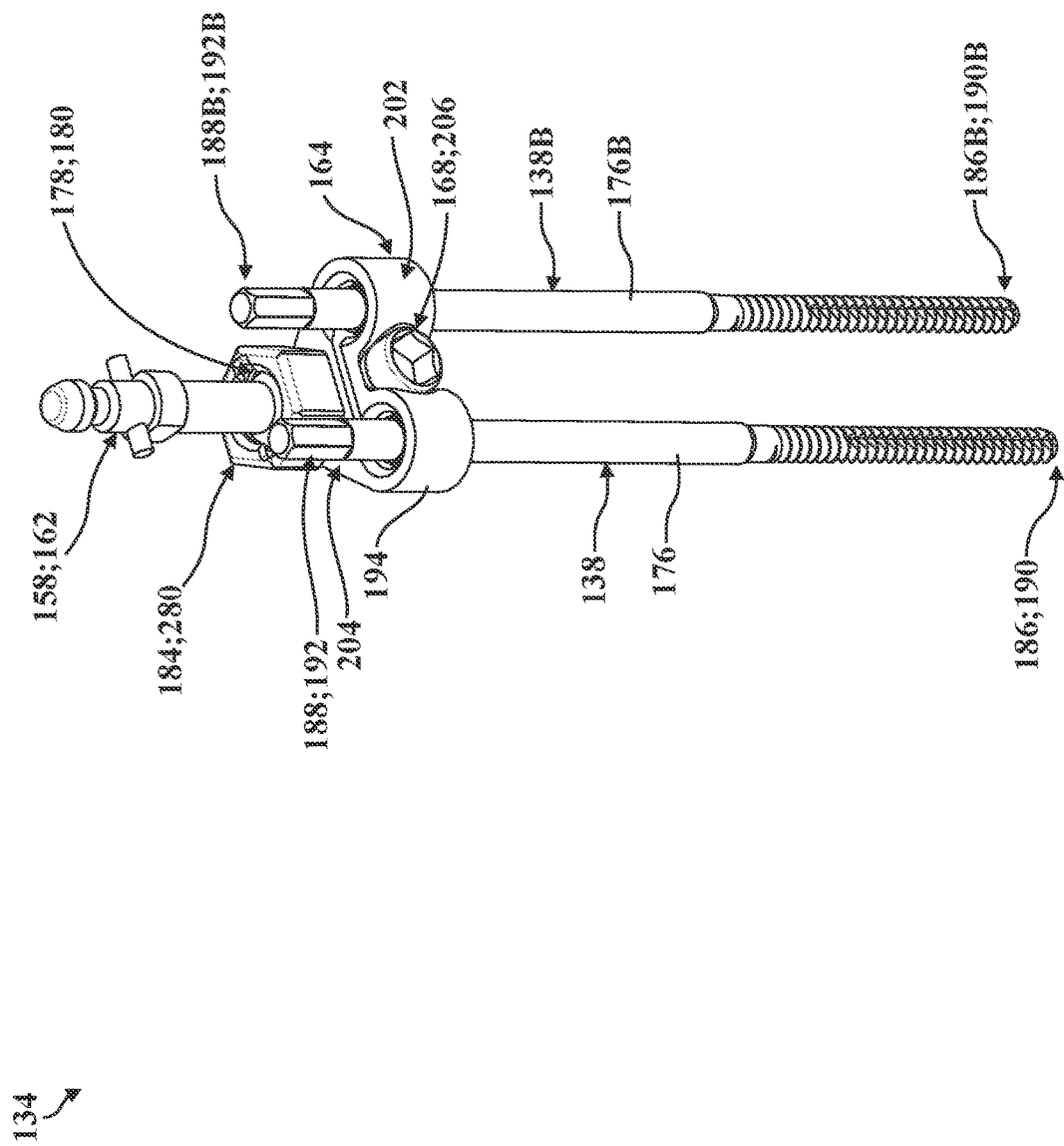
FIG. 18 is a perspective view of another version of a mount assembly according to the present disclosure, shown having a frame subassembly with a coupler for supporting a navigable tracker relative to a frame via a coupler lock, and anchors disposed in guides supported by the frame and locked in exemplary anchor arrangements relative to the frame via a guide lock.
Figure 19:
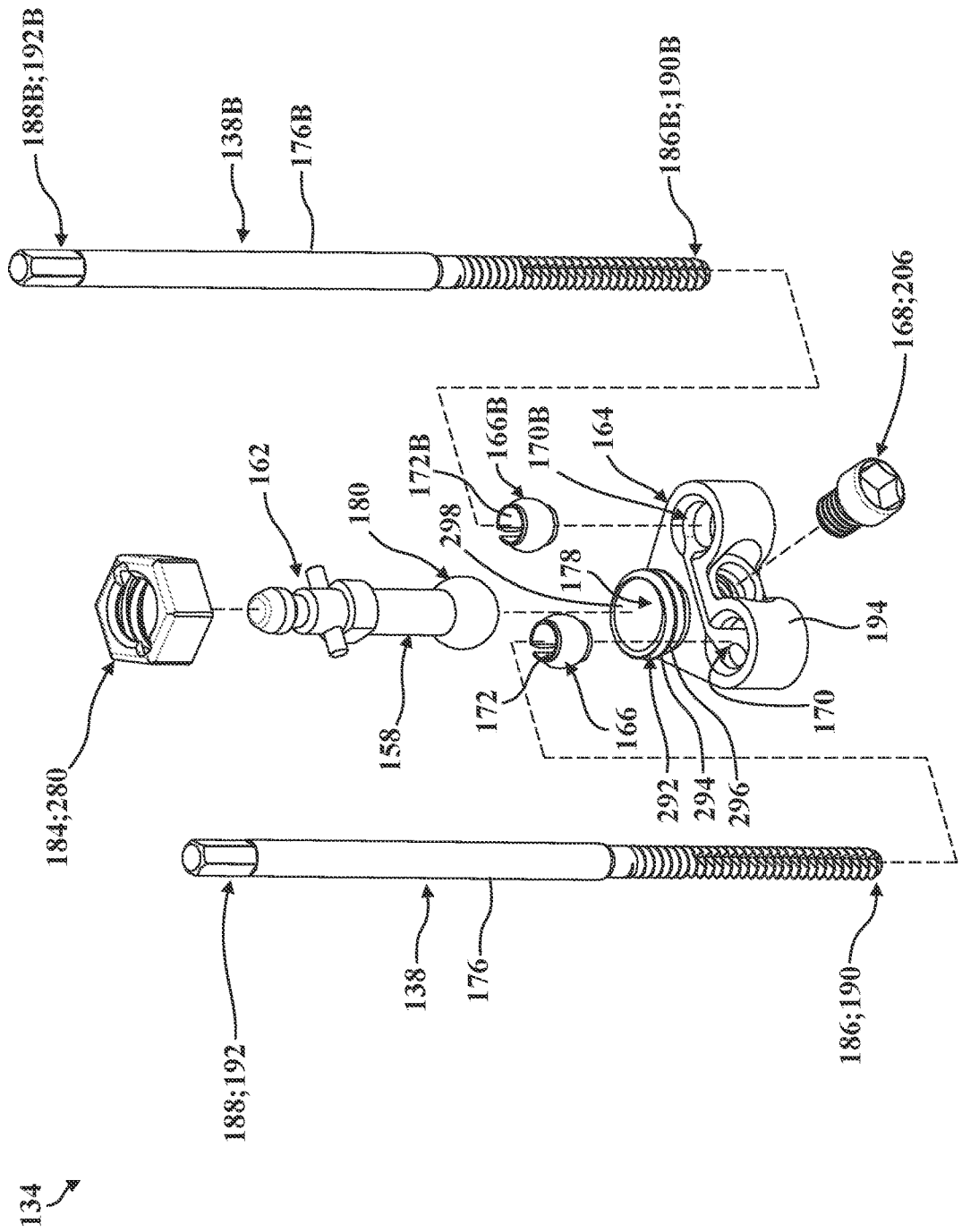
FIG. 19 is an exploded perspective view of the mount assembly of FIG. 18.
Figure 20:
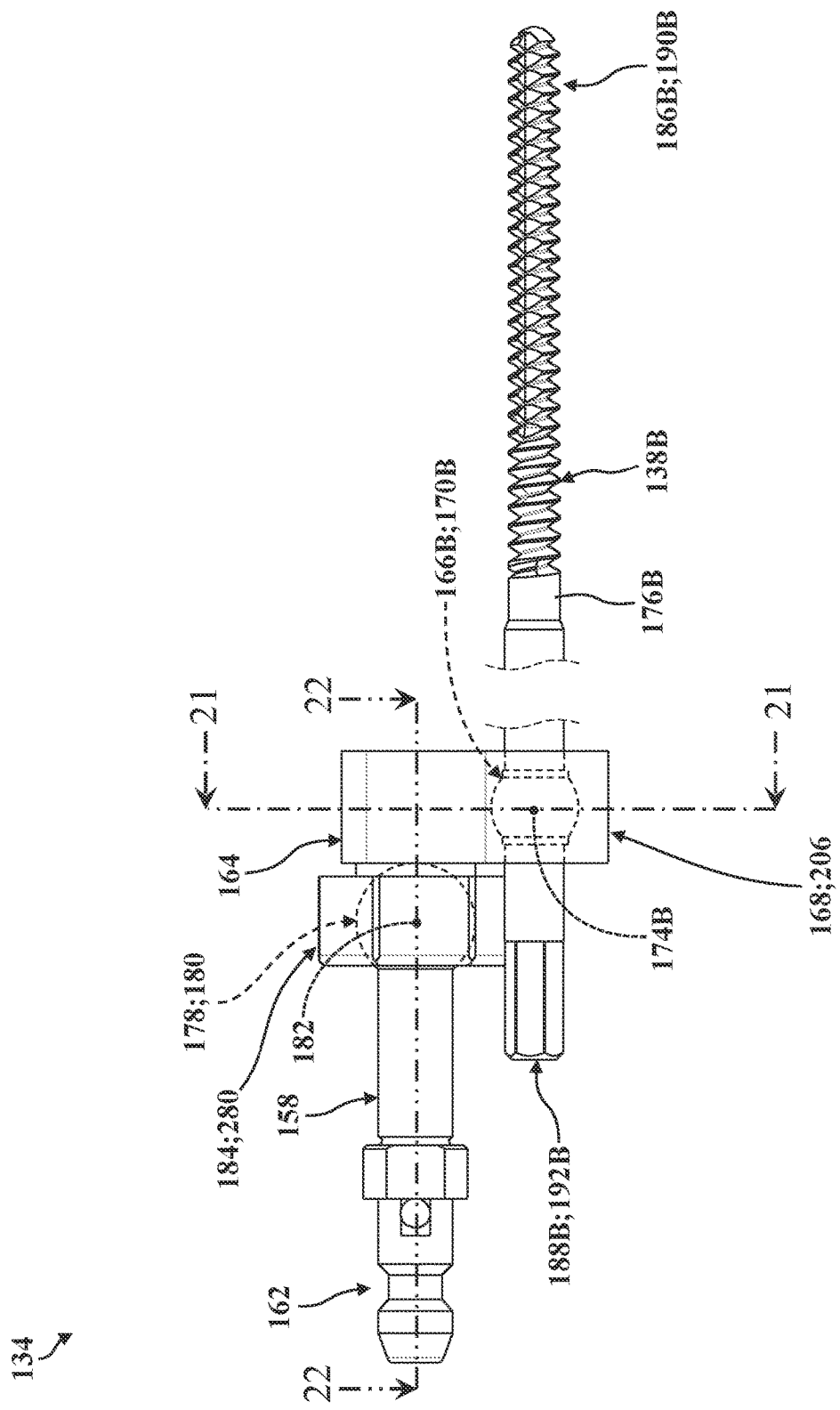
FIG. 20 is a broken, right-side plan view of the mount assembly of FIGS. 18-19.
Figure 22A:
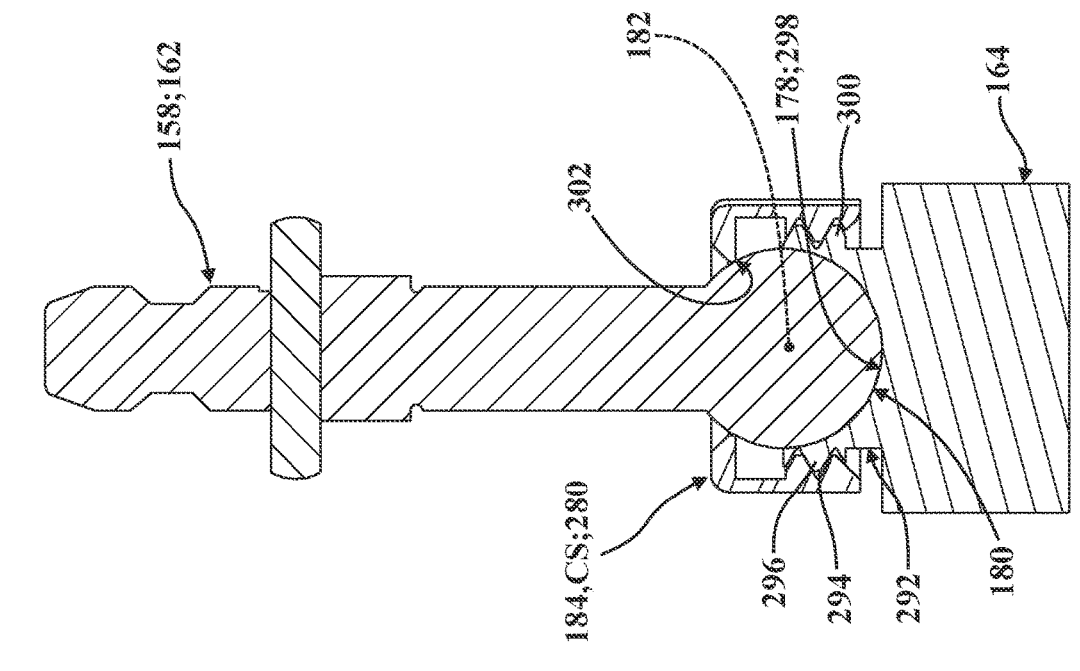
FIG. 22A is a section view of the mount assembly taken along line 22-22 in FIG. 20, shown with the coupler lock arranged in a secured configuration to restrict movement of the coupler relative to the frame.
Figure 21A:
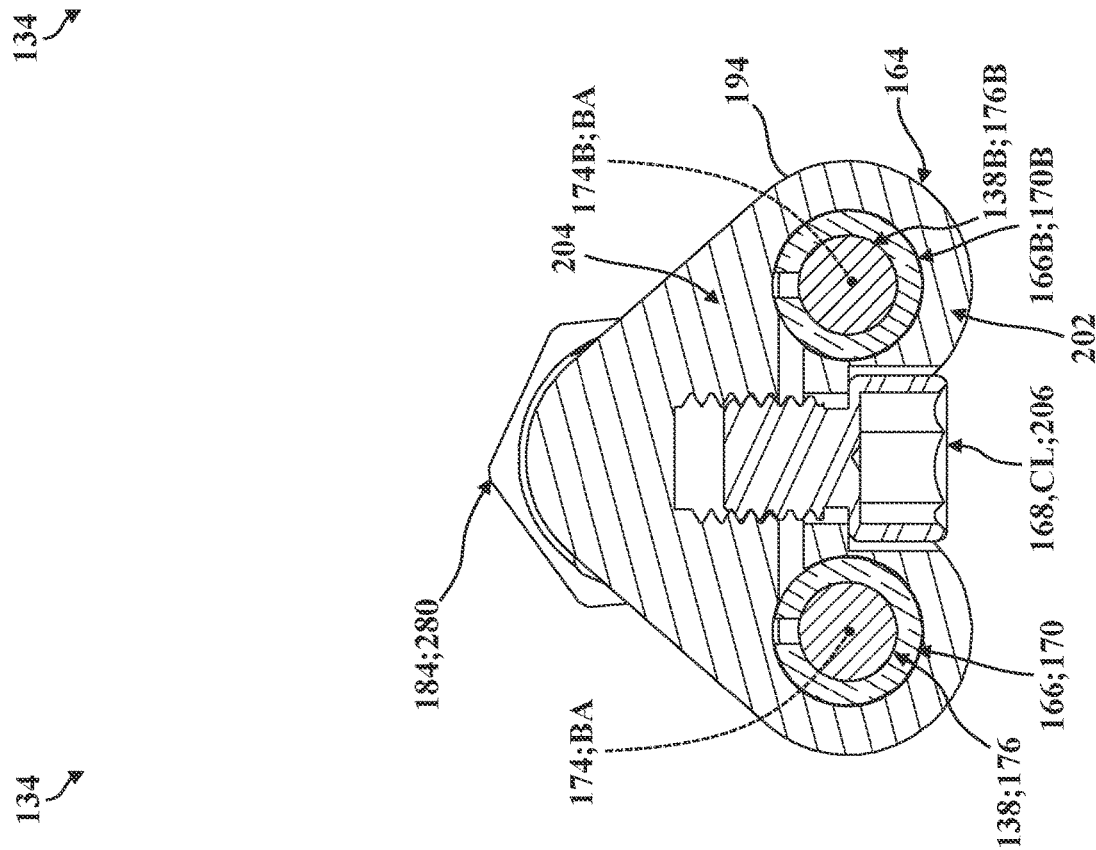
FIG. 21A is a section view of the mount assembly taken along line 21-21 in FIG. 20, shown with the guide lock arranged in a locked configuration to restrict movement of the guides and the anchors relative to the frame.
Figure 23:
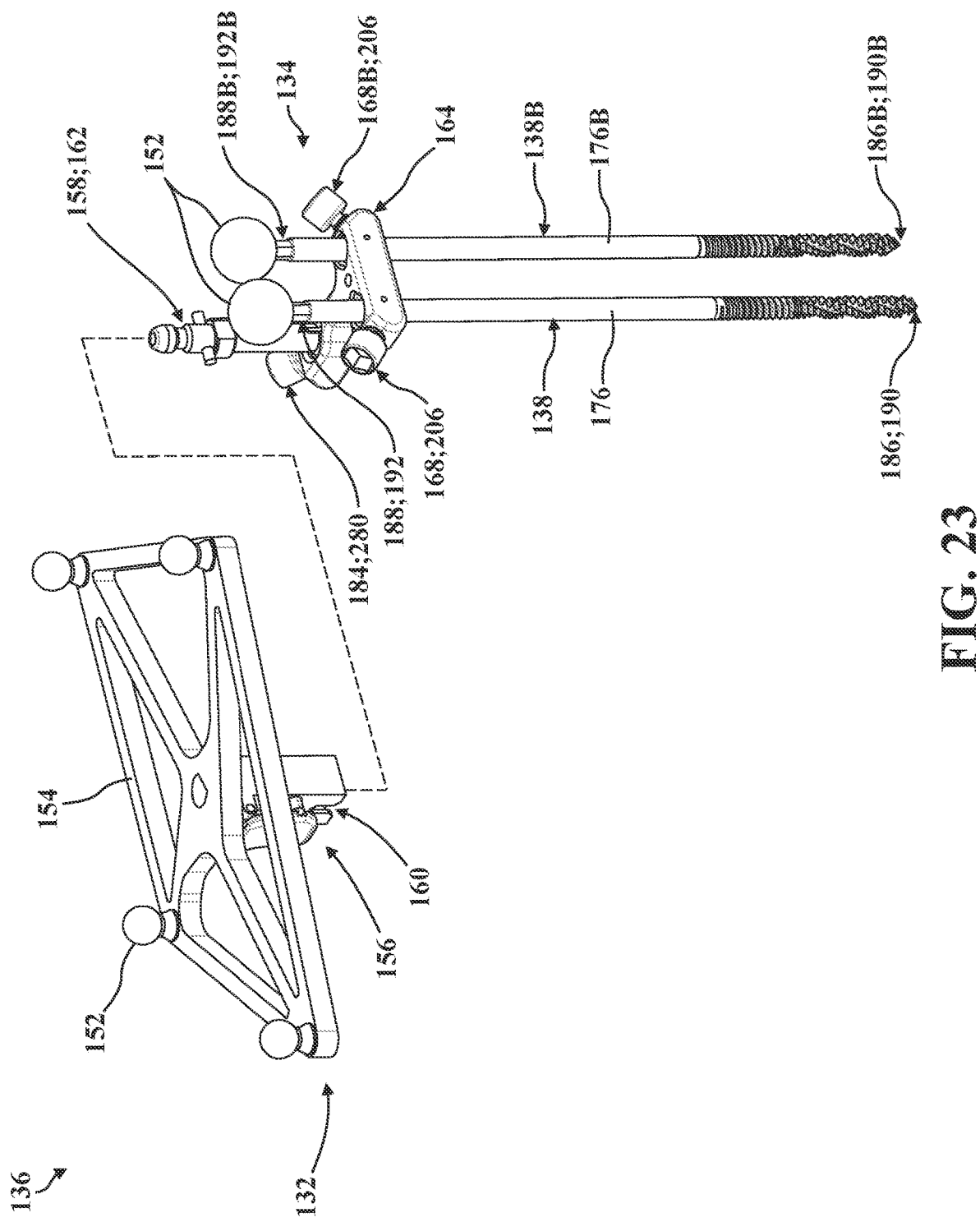
FIG. 23 is an exploded perspective view of another version of a mount assembly according to the present disclosure arranged spaced from the navigable tracker of FIGS. 2-3B, the mount assembly shown having a frame subassembly with a coupler for supporting the navigable tracker relative to a frame via a coupler lock, and anchors disposed in guides supported by the frame and locked in exemplary anchor arrangements relative to the frame via a guide lock.
Figure 24:
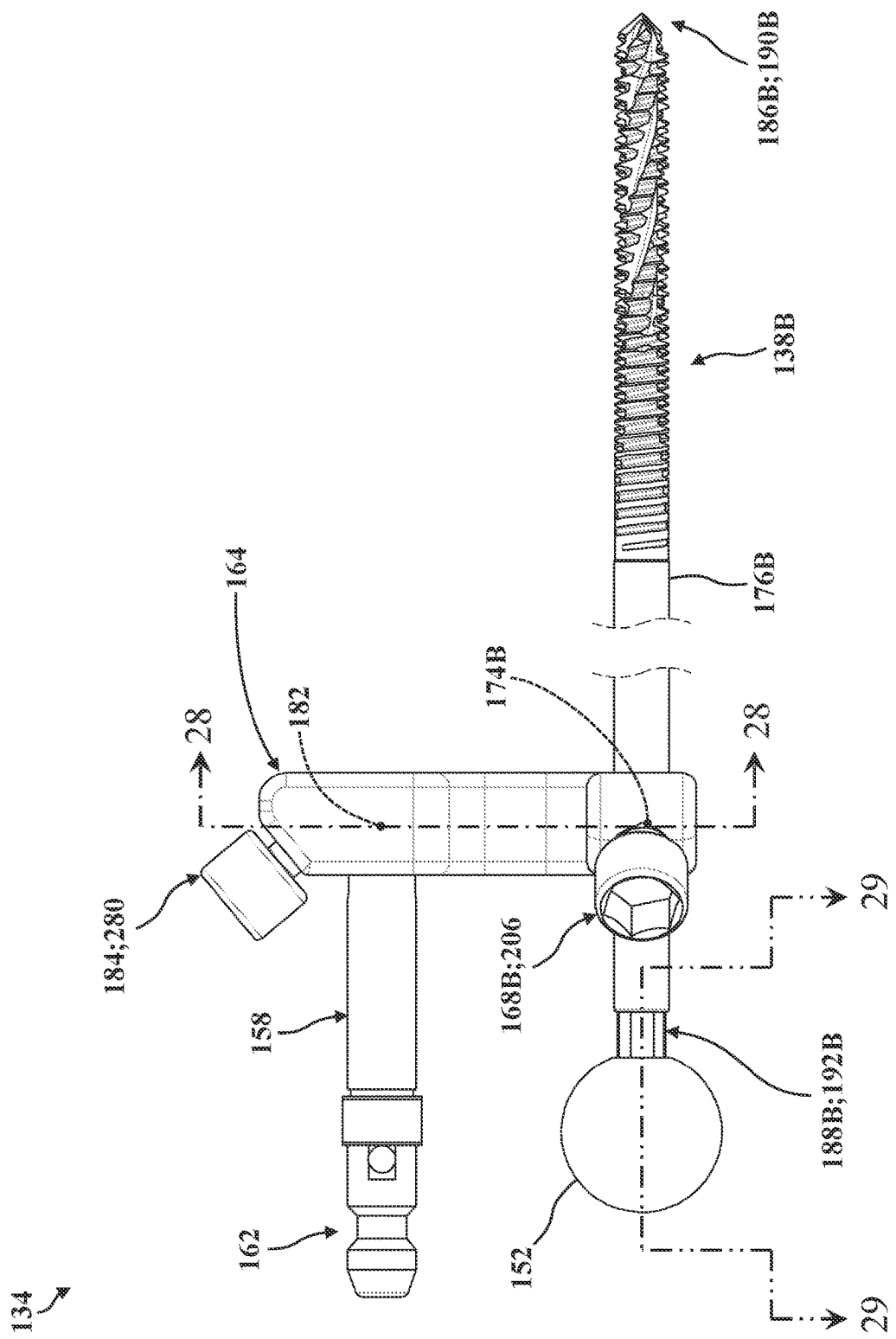
FIG. 24 is a broken, right-side plan view of the mount assembly of FIG. 23.
Figure 25:
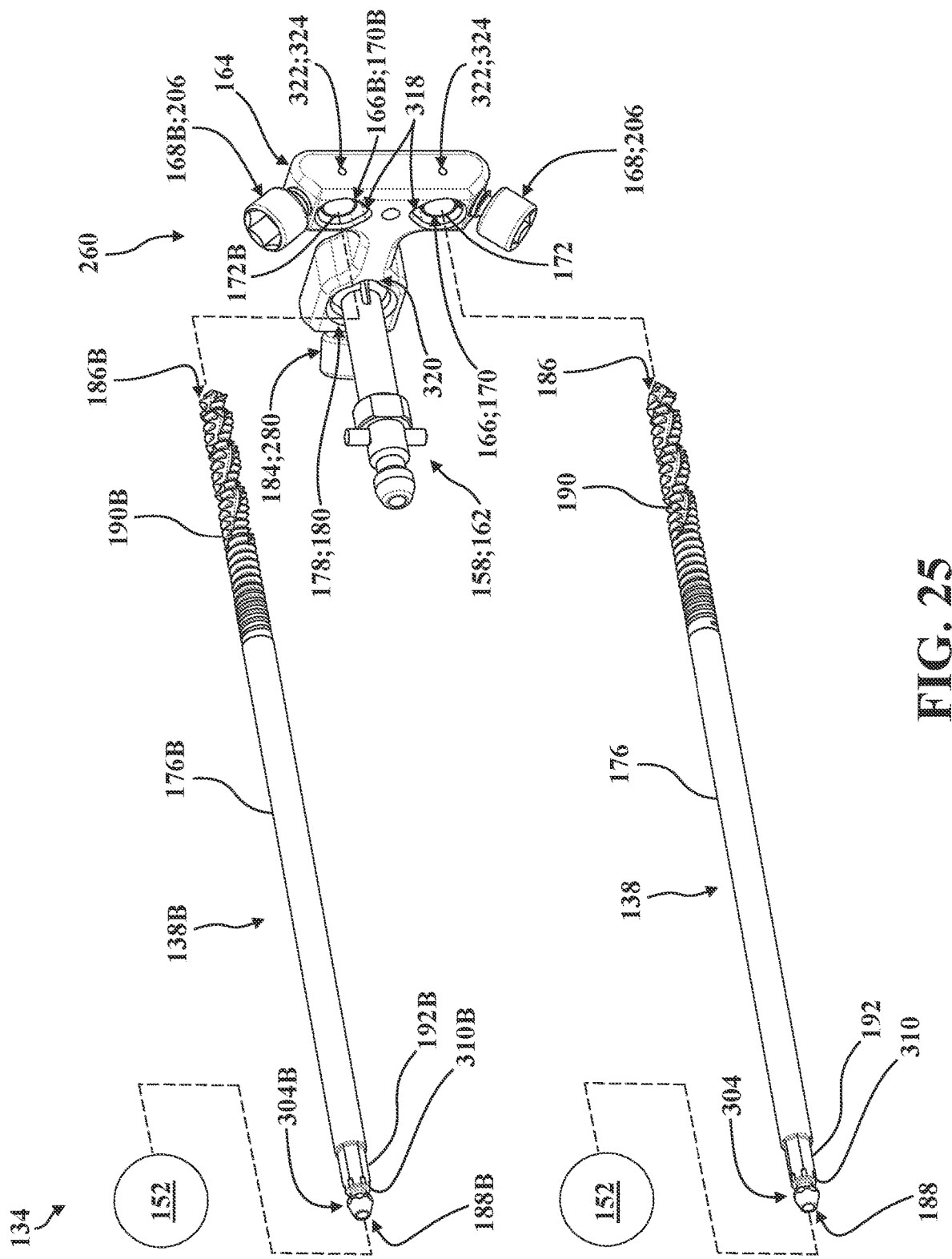
FIG. 25 is a partially-exploded perspective view of the mount assembly of FIGS. 23-24, shown with the anchors spaced from a frame subassembly.
Figure 26:
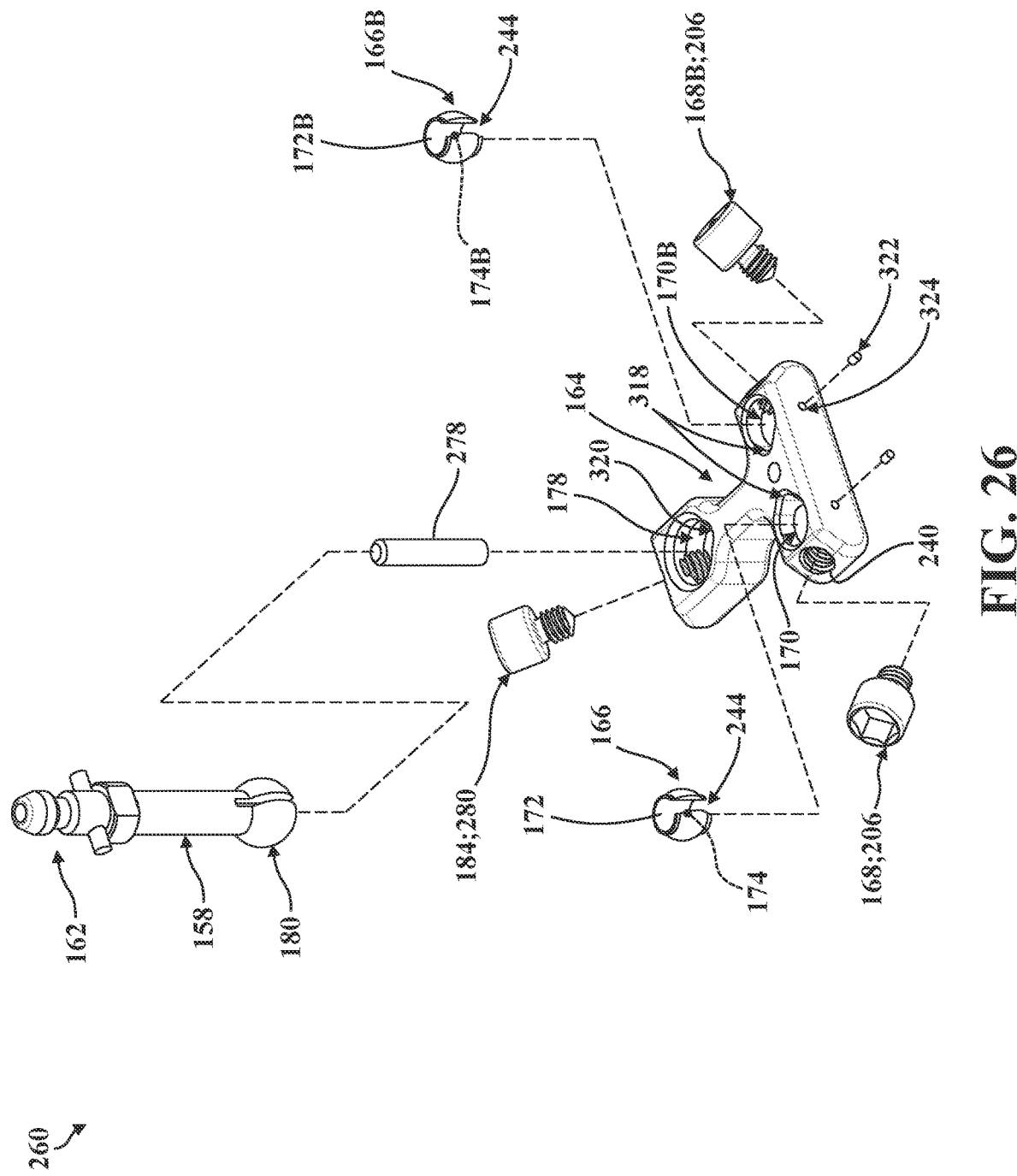
FIG. 26 is an exploded perspective view of the frame subassembly of the mount assembly of FIGS. 23-25.
Figure 27:
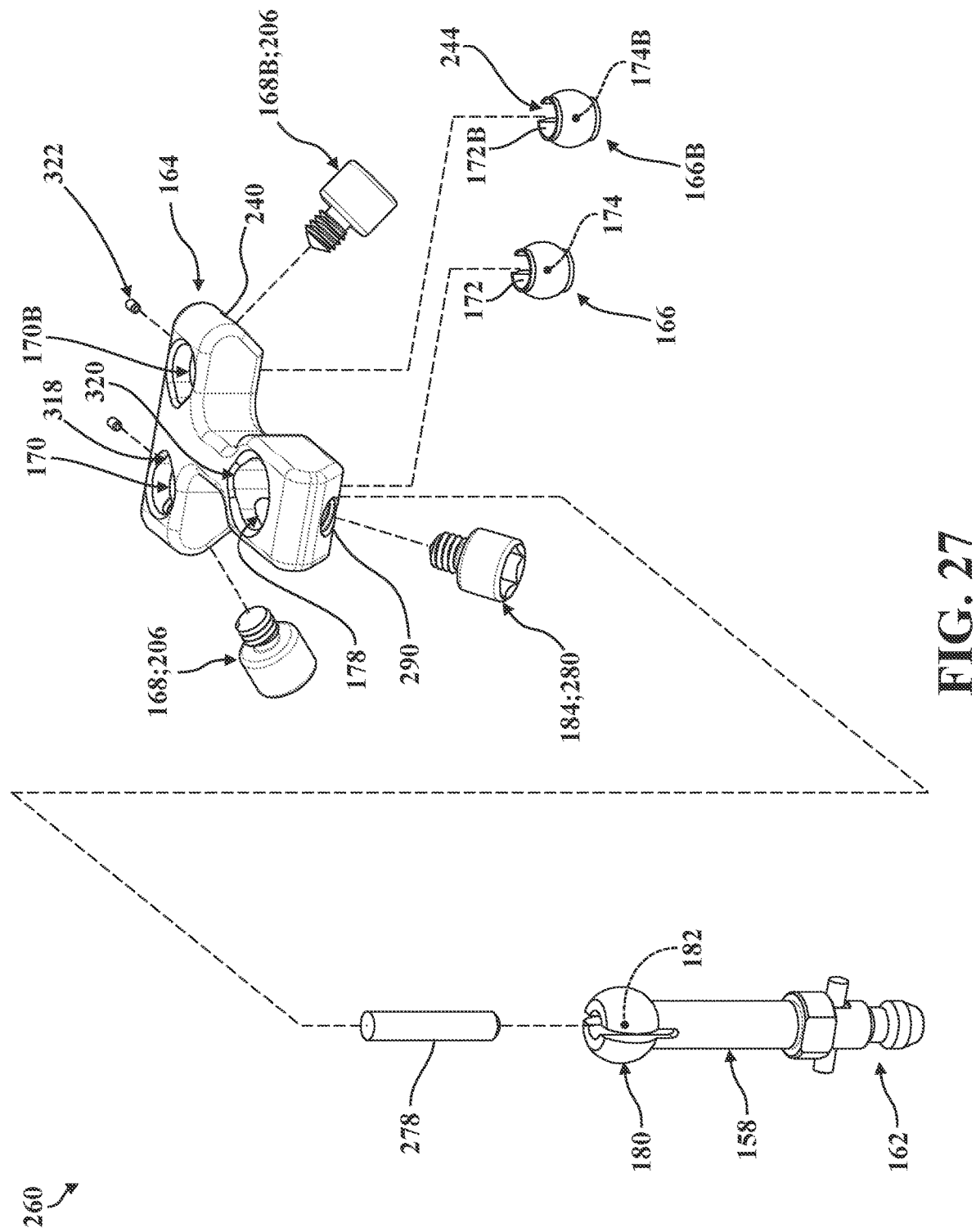
FIG. 27 is another exploded perspective view of the frame subassembly of the mount assembly of FIGS. 23-26.
Figure 28A:
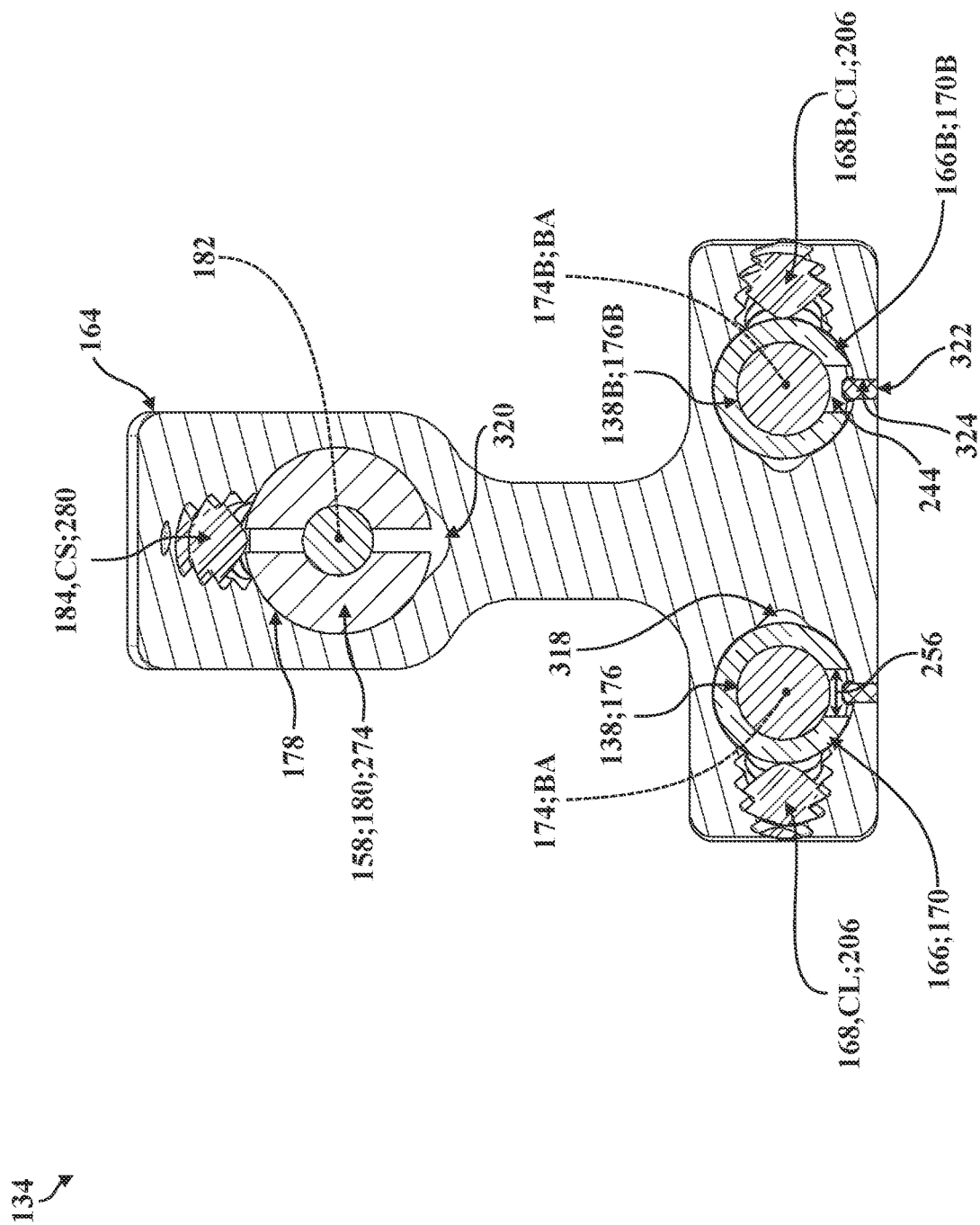
FIG. 28A is a section view of the mount assembly taken along line 28-28 in FIG. 24, shown with the guide locks arranged in locked configurations to restrict movement of the guides and the anchors relative to the frame, and shown with the coupler lock arranged in a secured configuration to restrict movement of the coupler relative to the frame.
Figure 28B:
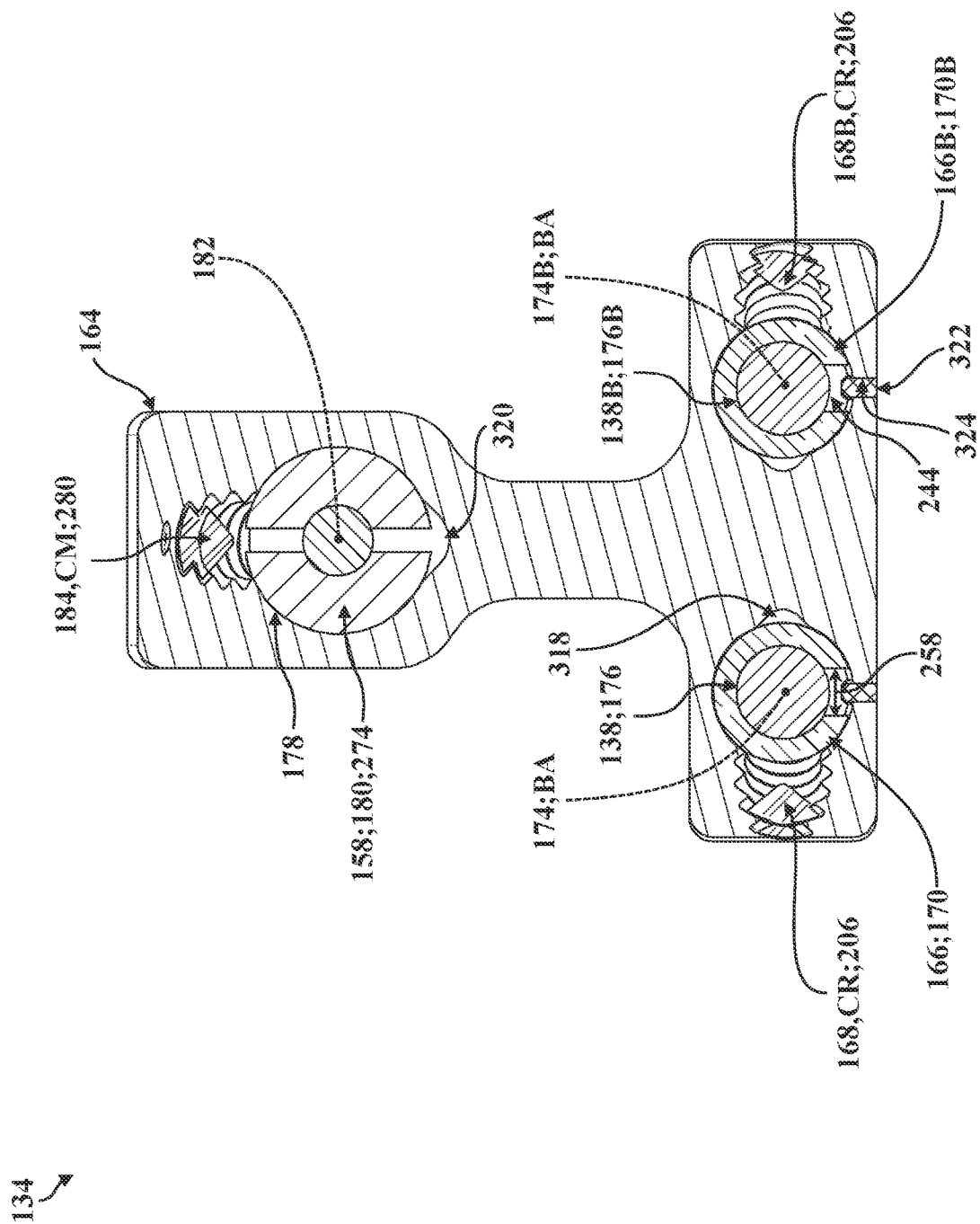
FIG. 28B is another section view of the mount assembly of FIG. 28A, shown with the guide locks arranged in a released configuration to simultaneously permit pivoting and translational movement of the anchors relative to the frame, and shown with the coupler lock arranged in a movable configuration to permit limited movement of the coupler relative to the frame.

The frame slot 200 defines first and second seat edges 214, 216 at the seat 170, which have profiles complimentary to the curved, transition, and tapered regions 212. In some versions, the frame slot 200 is formed through the outer frame surface 194 extending into the seat 170. At least a portion of the first and second seat edges 214, 216 (e.g., defined along one of the transition regions 210) are spaced from each other at a first seat edge distance 218 when the guide lock 168 operates in the locked configuration CL (see FIG. 10A), and at a second seat edge distance 220 larger than the first seat edge distance 218 when the guide lock 168 operates in the released configuration CR (see FIG. 10B, compare to FIG. 10A; distances 218, 220 not shown in detail). Here, the first and second flexure portions 202, 204 act to "pinch" the guide 166 to inhibit movement of the guide 166 (as well as the anchor 138 as noted above and as described in greater detail below) when the guide lock 168 operates in the locked configuration CL.

In some versions, a relief slot 222 is formed in the frame 164 at a location spaced from the frame slot 200. The relief slot 222 is similarly formed through the upper and lower frame surfaces 196, 198, and extends from a relief slot end 224 (see FIG. 9) into the seat 170 to define first and second relief slot edges 226, 228 which likewise have profiles complimentary to the curved, transition, and tapered regions 212 of the seat 170. At least a portion of the first and second relief slot edges 226, 228 (e.g., defined along one of the transition regions 210; see FIGS. 10A-10B) are spaced from each other at a first relief edge distance 230 when the guide lock 168 operates in the locked configuration CL (see FIG. 10A), and at a second relief edge distance 232 larger than the first relief edge distance 230 when the guide lock 168 operates in the released configuration CR (see FIG. 10B, compare to FIG. 10A; distances 230, 232 not shown in detail). The relief slot 222 is spaced radially about the seat 170 from the frame slot 200 so as to further delineate the first and second flexure portions 202, 204 from each other while, at the same time, affording the frame 164 with a compact profile.

In some versions, the relief slot 222 extends towards the coupler seat 178 at an angle that is transverse to the frame slot 200 viewed normal to the upper frame surface 196. However, other configurations are contemplated. It will be appreciated that the relief slot 222 helps distribute force about the seat 170 between the first and second flexure portions 202, 204 in order to minimize the amount of force which needs to be applied to the guide retainer 206 by the user in order to move the guide lock 168 between the locked and released configurations CL, CR.

In the illustrated versions, and as is best shown in FIG. 8, the guide retainer 206 includes a retention portion 234, a guide interface 236 arranged for engagement by the user to operate the guide lock 168 between the locked and released configurations CL, CR, and a guide retainer body 238 extending between the retention portion 234 and the guide interface 236. The frame 164 defines a guide retainer aperture 240 formed extending through the first and second flexure portions 202, 204 that is arranged to receive the guide retainer body 238. Here, the guide retainer 206 is realized as a threaded fastener with a socket head defining the guide interface 236, a shaft defining the guide retainer body 238, and threads defining the retention portion 234. The guide interface 236 is shaped to receive torque from a tool (e.g., an Allen key or similar fastener driver; not shown). At least a portion of the guide retainer aperture 240 (e.g., internal threads formed in part of one of the first and second flexure portions 202, 204) is disposed in threaded engagement with at least a portion of the retention portion 234 (e.g., external threads) such that rotational torque applied to the guide interface 236 in one direction urges the first and second flexure portions 202, 204 towards each other to operate the guide lock 168 in the locked configuration CL, and such that rotational torque applied to the guide interface 236 in an opposite direction permits movement of the first and second flexure portions 202, 204 away from each other to operate the guide lock 168 in the released configuration CR. It will be appreciated that the guide retainer 206 could be realized or otherwise configured in other ways (e.g., other than as a threaded fastener) to change operation of the guide lock 168 by facilitating relative movement between the first and second flexure portions 202, 204.

As is best shown in FIGS. 7-8, the illustrated version of the guide 166 has a pivot surface 242 that is shaped for sliding contact with the seat 170 of the frame 164 (e.g., against the curved region 208 of the seat 170) to facilitate selective pivoting movement about the pivot point 174 when the guide lock 168 operates in the released configuration CR. Here, like the curved region 208 of the seat 170, the pivot surface 242 has a generally spherical profile. The guide 166 also has guide retention regions 246 extending vertically along the bore 172 away from the pivot surface 242. Here, the guide retention regions 246 have generally cylindrical profiles and are arranged to limit the pivoting movement of the guide 166 within the seat 170 so as to promote access to the bore 172 from the tapered regions 212 of the seat 170.

The bore 172 extends along a bore axis BA between a guide inlet 248 and a guide outlet 250 defined by opposing guide retention regions 246. The bore axis BA intersects the pivot point 174. The guide slot 244 is formed extending through the guide pivot surface 242, as well as through the guide retention regions 246, into the bore 172 to define first and second bore edges 252, 254 (see FIGS. 10A-10B), which are arranged substantially parallel to the bore axis BA. At least a portion of the first and second bore edges 252, 254 (e.g., defined along one of the guide retention regions 246) are spaced from each other at a first bore edge distance 256 when the guide lock 168 operates in the locked configuration CL (see FIG. 10A), and at a second bore edge distance 258 larger than the first bore edge distance 256 when the guide lock 168 operates in the released configuration CR (see FIG. 10B, compare to FIG. 10A; distances 256, 258 not shown in detail). Here, similar to how the frame slot 200 allows the first and second flexure portions 202, 204 to "pinch" the guide 166, the guide slot 244 is shaped and arranged so as to allow the guide 166 to "pinch" the shank 176 of the anchor 138 when the guide lock 168 operates in the locked configuration CL.

As is best shown in FIG. 6, the coupler 158, the frame 164, the guide 166, and the guide lock 168 cooperate to define a frame subassembly 260 which, together with the anchor 138, defines the mount assembly 134 according to versions of the present disclosure. As noted above, the seat 170 is configured to retain the guide 166 relative to the frame 164 both when the guide lock 168 operates in the locked configuration CL, as well as in the released configuration CR. Because the frame 164 is formed as a unitary, one-piece component in the illustrated versions, installation of the guide 166 into the seat 170 may be achieved by inserting the guide 166 into the tapered regions 212 while the guide lock 168 operates in the locked configuration CL so as to urge the first and second flexure portions 202, 204 away from each other to permit the guide pivot surface 242 to come into engagement with the curved region 208 of the seat 170. Here, the resilience of the first and second flexure portions 202, 204 helps retain the guide 166 in the seat 170, while permitting limited rotation of the guide 166 in three degrees of freedom about the pivot point 174.

Referring now to FIG. 7-9, the coupler 158 is similarly disposed in sliding contact with the coupler seat 178 of the frame 164. Here, and as is best shown in FIG. 9, the coupler seat 178 has a curved coupler region 262, transition coupler regions 264 extending from the curved coupler region 262, and tapered coupler regions 266 extending from the transition coupler regions 264 to the upper and lower frame surfaces 196, 198. Here, the curved coupler region 262 has a generally spherical profile to facilitate pivoting movement of the perch 180 of the coupler 158 about the coupler point 182. The transition coupler regions 264 have a generally cylindrical profile that is sized and arranged to facilitate retention of the perch 180 within the coupler seat 178. The tapered coupler regions 266 have a generally frustoconical profile that are shaped and arranged to facilitate pivoting of the coupler 158 about the coupler point 182.

The perch 180 of the coupler 158 has a perch pivot surface 268 that is disposed in sliding contact with the curved coupler region 262 of the coupler seat 178 to facilitate selective pivoting movement of the coupler 158 about the coupler point 182 when the coupler lock 184 operates in the movable configuration CM. Here too, the perch pivot surface 268 has a generally spherical profile. In the illustrated version, the coupler 158 has a brace 270 extending between the tracker interface 162 and the perch 180. As is best shown in FIG. 8, a perch slot 272 is formed extending through the perch pivot surface 268 to define coupler flexure regions 274, and a keeper bore 276 is formed through each of the coupler flexure regions 274 and into the brace 270 to receive a keeper shaft 278. Here, the keeper shaft 278 is inserted into the keeper bore 276 after the perch 180 has been arranged into the coupler seat 178 in order to retain the coupler 158 to the frame 164 even while the coupler lock 184 operates in the movable configuration CM while permitting limited rotation of the perch 180 in three degrees of freedom about the coupler point 182. Put differently, without the keeper shaft 278, the coupler flexure regions 274 are able to resiliently move relative to each other to facilitate installation into the coupler seat 178.

Referring now to FIGS. 7-10B, the illustrated coupler lock 184 includes a coupler retainer 280 that is supported by the frame 164 and is arranged to abut the perch 180 of the coupler 158 when the coupler lock 184 operates in the secured configuration CS (see FIG. 10B). To this end, and as is best shown in FIG. 8, the coupler retainer 280 includes a coupler retention portion 282, a coupler interface 284 arranged for engagement by the user to operate the coupler lock 184 between the secured and movable configurations CS, CM, and a coupler retainer body 286 extending between the coupler retention portion 282 and the coupler interface 284 to a coupler end portion 288 arranged to abut the perch 180. The frame 164 defines a coupler retainer aperture 290 formed extending into communication with the coupler seat 178 (e.g., into the outer frame surface 194) that is arranged to receive the coupler retainer body 286. Here too, the coupler retainer 280 is realized as a threaded fastener with a socket head defining the coupler interface 284, a shaft defining the coupler retainer body 286 extending to the coupler end portion 288, and threads defining the coupler retention portion 282. The coupler interface 284 is similarly shaped to receive torque from a tool (e.g., an Allen key or similar fastener driver; not shown). At least a portion of the coupler retainer aperture 290 (e.g., internal threads) is disposed in threaded engagement with at least a portion of the coupler retention portion 282 (e.g., external threads) such that rotational torque applied to the coupler interface 284 in one direction urges the coupler end portion 288 into abutment with the perch 180 of the coupler 158 to operate the coupler lock 184 in the secured configuration CS (see FIG. 10A), and such that rotational torque applied to the coupler interface 284 in an opposite direction urges the coupler end portion 288 out of abutment with the perch 180 to operate the coupler lock 184 in the movable configuration CM (see FIG. 10B). Here too, it will be appreciated that the coupler retainer 280 could be realized or otherwise configured in other ways (e.g., other than as a threaded fastener) to change operation of the coupler lock 184 by facilitating abutment with the perch 180 or otherwise inhibiting movement of the perch 180 relative to the frame 164.

As noted above, another version of the mount assembly 134 is shown in FIGS. 14-17B. Because many of the components, structure, and features of this version are substantially similar to those of the version described above in connection with FIGS. 3A-13, the components, structure, and features that correspond between the versions are provided with the same reference numerals in the description that follows. Furthermore, for the purposes of clarity, consistency, and brevity, only certain specific differences between the versions will be described below, and only some of the components, structure, and features common between the versions will be discussed herein and depicted in the drawings. Thus, unless otherwise indicated below, the description of the version illustrated in FIGS. 3A-13 may be incorporated by reference with respect to the version illustrated in FIGS. 14-17B without limitation.

Referring now to FIGS. 14-17B, in this version, a single guide lock 168 is employed to facilitate simultaneously retaining two anchors 138, 138B (as well as two guides 166, 166B). To this end, the frame slot 200 extends laterally between the two seats 170, 170B, and the area defining the first flexure portion 202 (adjacent to the guide interface 236 of the guide retainer 206) is movable relative to the area defining the second flexure portion 204 (adjacent to the coupler 158) due to, in part, the relatively thin profile of the frame 164 extending around the seats 170, 170B. In this version, the frame slot 200 is spaced from (and does not extend through) the outer frame surface 194 of the frame 164. Furthermore, in this version, the guide retainer 206 and the coupler retainer 280 are arranged on opposing sides of the frame 164.

As noted above, another version of the mount assembly 134 is shown in FIGS. 19-22B. Because many of the components, structure, and features of this version are substantially similar to those of the versions described above in connection with FIGS. 3A-13 and 14-17B, the components, structure, and features that correspond between the versions are provided with the same reference numerals in the description that follows. Furthermore, for the purposes of clarity, consistency, and brevity, only certain specific differences between the versions will be described below, and only some of the components, structure, and features common between the versions will be discussed herein and depicted in the drawings. Thus, unless otherwise indicated below, the description of the versions illustrated in FIGS. 3A-13 and FIGS. 14-17B may be incorporated by reference with respect to the version illustrated in FIGS. 19-22B without limitation.

Referring now to FIGS. 18-22B, in this version, a single guide lock 168 is employed to facilitate simultaneously retaining two anchors 138, 138B (as well as two guides 166, 166B). Here, the guide lock 168 is substantially similar to the version described above in connection with FIGS. 14-18B. However, this version utilizes a differently configured coupler seat 178 and coupler lock 184 to support and secure the perch 180 of the coupler 158. In this version, the coupler seat 178 is defined by a socket 292 formed extending from the upper frame surface 196 of the frame. The socket 292 has an outer socket surface 294 with socket threads 296, and an inner socket surface 298 which defines the coupler seat 178. Here, the inner socket surface 298 has a substantially spherical profile, but is shaped differently (e.g., compared to the curved coupler region 262 described above). Here too, the perch 180 is configured differently (e.g., lacking the perch slot 272 described above). In this version, the coupler retainer 280 is also configured differently, Here, the coupler retainer 280 is realized as a threaded fastener (e.g., a "nut") with internal threads 300 that can be placed in threaded engagement with the socket threads 296. Here, an internal edge 302 of the coupler retainer 280 abuts the perch 180 of the coupler 158 to effect operation of the coupler lock 184 in the secured configuration CS (see FIG. 22A), and unthreading or loosening the coupler retainer 280 effects operation in the movable configuration CM (see FIG. 22B).

As noted above, another version of the mount assembly 134 is shown in FIGS. 23-32. Because many of the components, structure, and features of this version are substantially similar to those of the version described above in connection with FIGS. 3A-13, the components, structure, and features that correspond between the versions are provided with the same reference numerals in the description that follows. Furthermore, for the purposes of clarity, consistency, and brevity, only certain specific differences between the versions will be described below, and only some of the components, structure, and features common between the versions will be discussed herein and depicted in the drawings. Thus, unless otherwise indicated below, the description of the version illustrated in FIGS. 3A-13 may be incorporated by reference with respect to the version illustrated in FIGS. 23-32 without limitation.

Figure 29:
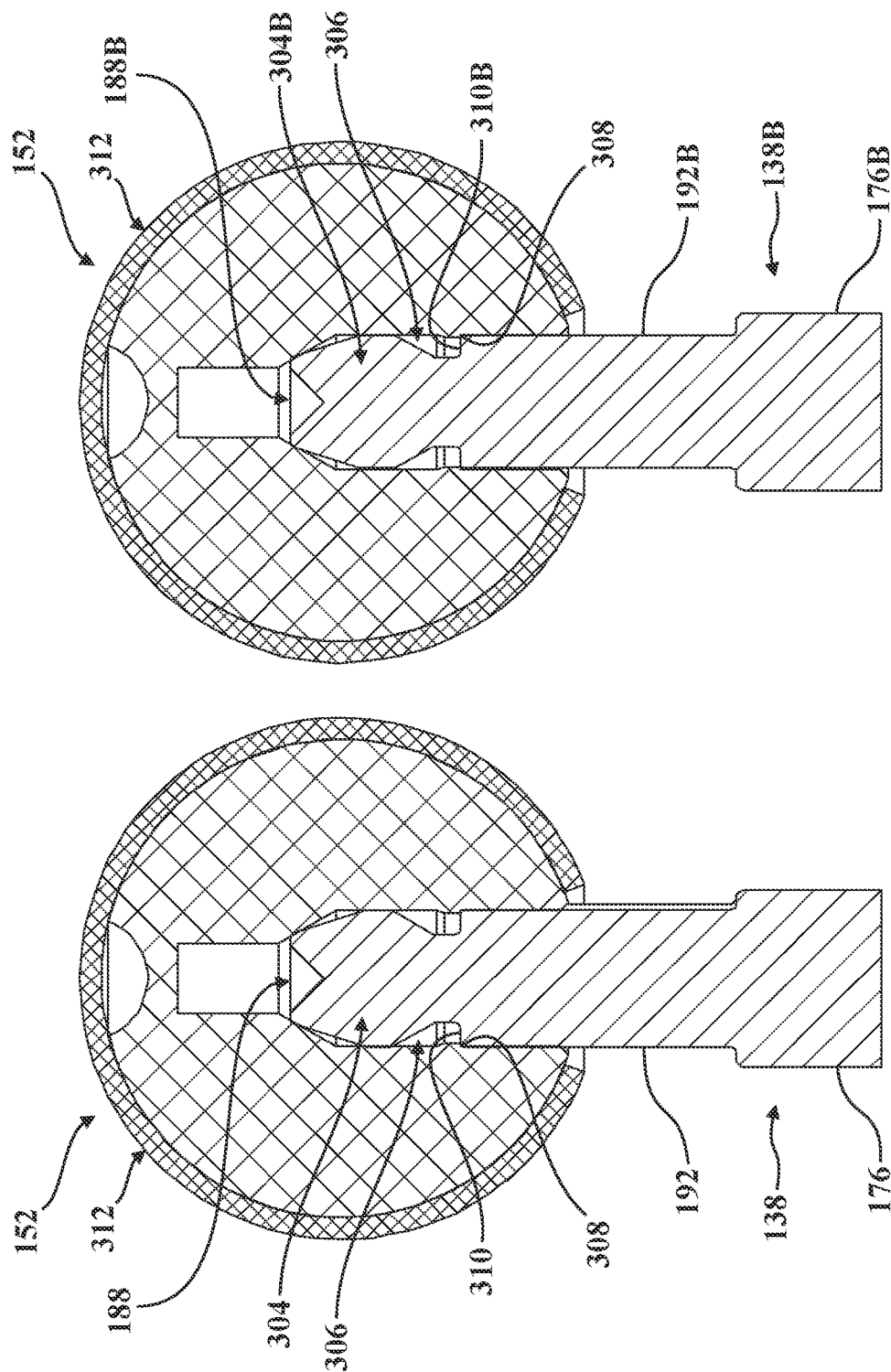
FIG. 29 is a partial section view of the anchors of the mount assembly taken along line 29-29 in FIG. 24.
Figure 30:
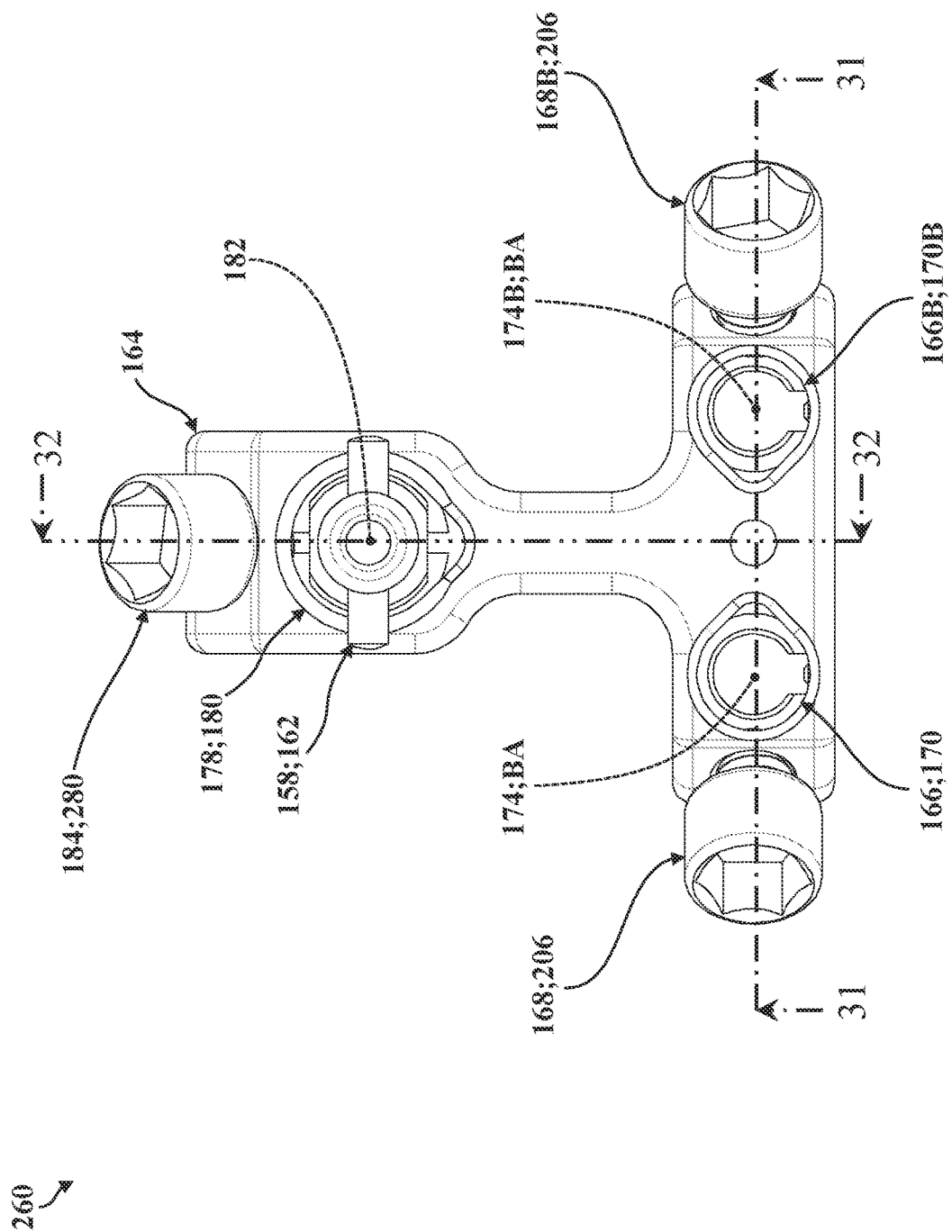
FIG. 30 is a top-side plan view of the frame subassembly of the mount assembly of FIGS. 23-28B.
Figure 31:
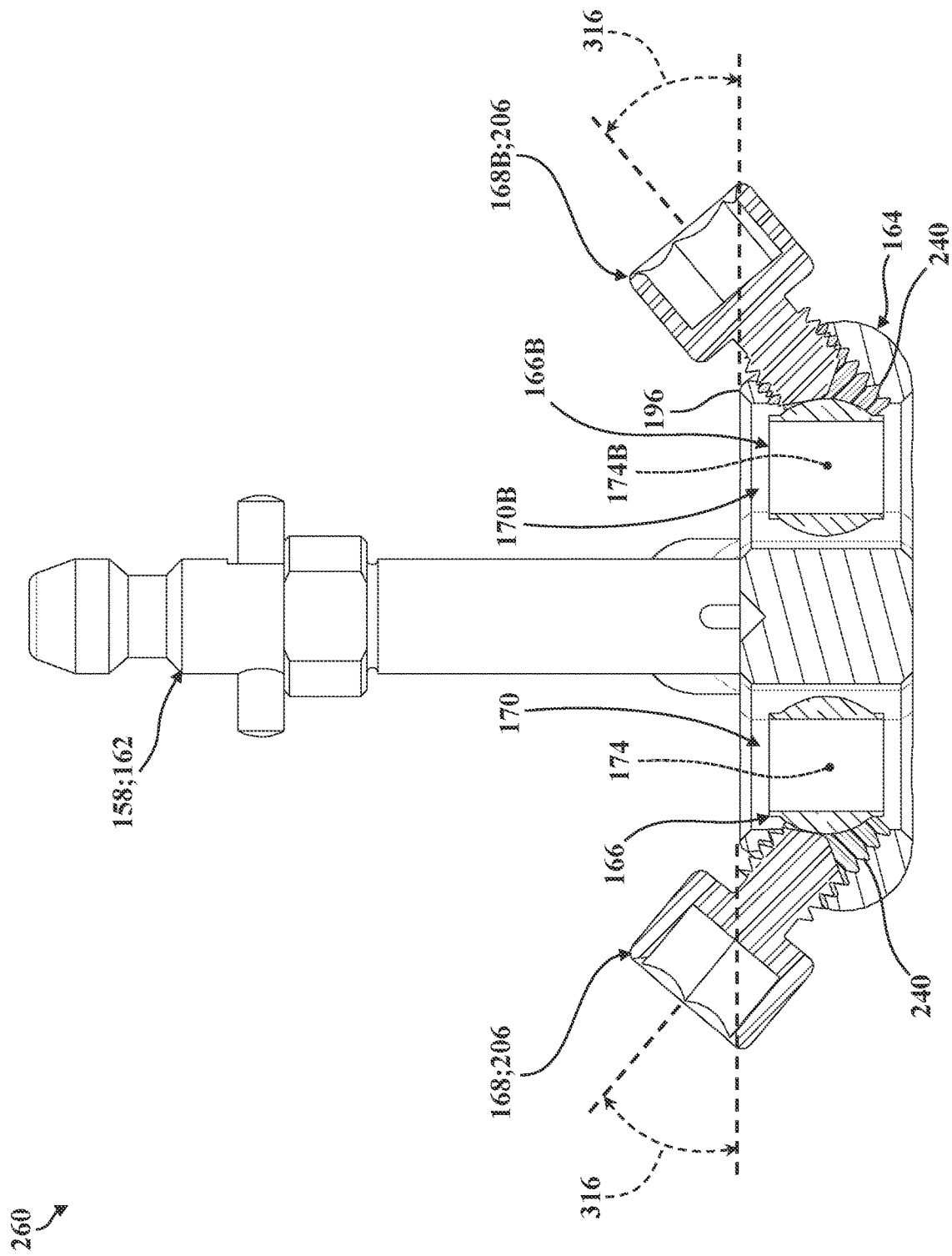
FIG. 31 is a section view of the frame subassembly taken along line 31-31 in FIG. 30.

Referring now to FIGS. 23-32, in this version, the anchors 138, 138B have distal ends 186, 186B configured with helical profiles, and have proximal ends 188, 188B configured with respective mounts 304, 304B disposed adjacent to the rotational interfaces 192, 192B. As is best shown in FIG. 29, the mounts 304, 304B are configured to releasably engage receivers 306 of markers 152. The receivers 306 of the markers 152 are realized with tapered and stepped profiles that define receiver braces 308 arranged to abut against mount shoulders 310, 310B of the mounts 304, 304B. The mounts 304, 304B and the receivers 306 are shaped so as to retain the markers 152 to the anchors 138, 138B. In some versions, the markers 152 configured for attachment to the array 154 and/or to the mounts 304, 304B of the anchors 138, 138B may be provided with a coating 312 formed from a radiopaque material such as barium, bismuth subcarbonate, barium sulfate, bismuth oxychloride, bismuth trioxide, tungsten and tantalum. This configuration can help promote visibility of the markers 152 in imaging data ID of the patient P in order to, among other things, facilitate registration, calibration, validation, and/or translation between reference frames and/or coordinate systems associated with different components of the surgical system 100. In some versions, the markers 152 or other portions of the trackers 132 may be similar to as is disclosed in International Patent Application No. PCT/US2021/027181, filed on Apr. 14, 2021 and entitled "Methods and Systems for Performing Image Registration In a Computer-Assisted Surgery System," the disclosure of which is hereby incorporated by reference in its entirety. Other configurations are contemplated.

It will be appreciated that utilizing markers 152 on the array 154 and on the mounts 304, 304B of one or more anchors 138, 138B can help facilitate improved operation of the navigation system 102, such as by facilitating the determination of inadvertent loosening of the tracker 132 (e.g., "bump detection") whereby changes in the pose of the array 154 (e.g., determined based on the markers 152 attached to the array 154) can be determined relative to one or more of the anchors 138, 138B. Put differently, the navigation system 102 can monitor for changes in how one or more markers 152 coupled to the anchors 138, 138B are arranged relative to the markers 152 coupled to the array 154, and may alert or otherwise notify users of the surgical system 100 to, among other things, check for loosening of the anchors 138, 138B and/or of guide locks 168, 168B or coupler locks 184 in the event a change in the arrangement of the markers 152 is determined.

It will be appreciated that anchors 138 with markers 152 coupled thereto could be used separately from the trackers 132 to facilitate monitoring for inadvertent loosening or movement of the trackers 132. By way of non-limiting example, rather than utilizing two trackers 132 with respective arrays 152 on each side of the ilium (e.g., as described above in connection with FIG. 2), a tracker 132 with an array 152 and mount assembly 134 according to the versions of the present disclosure could be attached to one side of the ilium via two anchors 138, 138B, and a single anchor 138 with a mount 304 to which a receiver 306 of a marker 152 is coupled could be attached to the other side of the ilium without a mount assembly (not shown). Here too, the navigation system 102 can monitor for changes in how the marker 152 coupled to the anchors 138 attached to one side of the ilium is arranged relative to the markers 152 coupled to the array 154 attached to the other side of the ilium, and may likewise alert or otherwise notify users of the surgical system 100 to, among other things, check for loosening of the anchors 138, 138B and/or of guide locks 168, 168B or coupler locks 184 in the event a change in the arrangement of the markers 152 is determined. It will be appreciated that the forgoing examples are illustrative and non-limiting, and other configurations are contemplated by the present disclosure.

Figure 32:
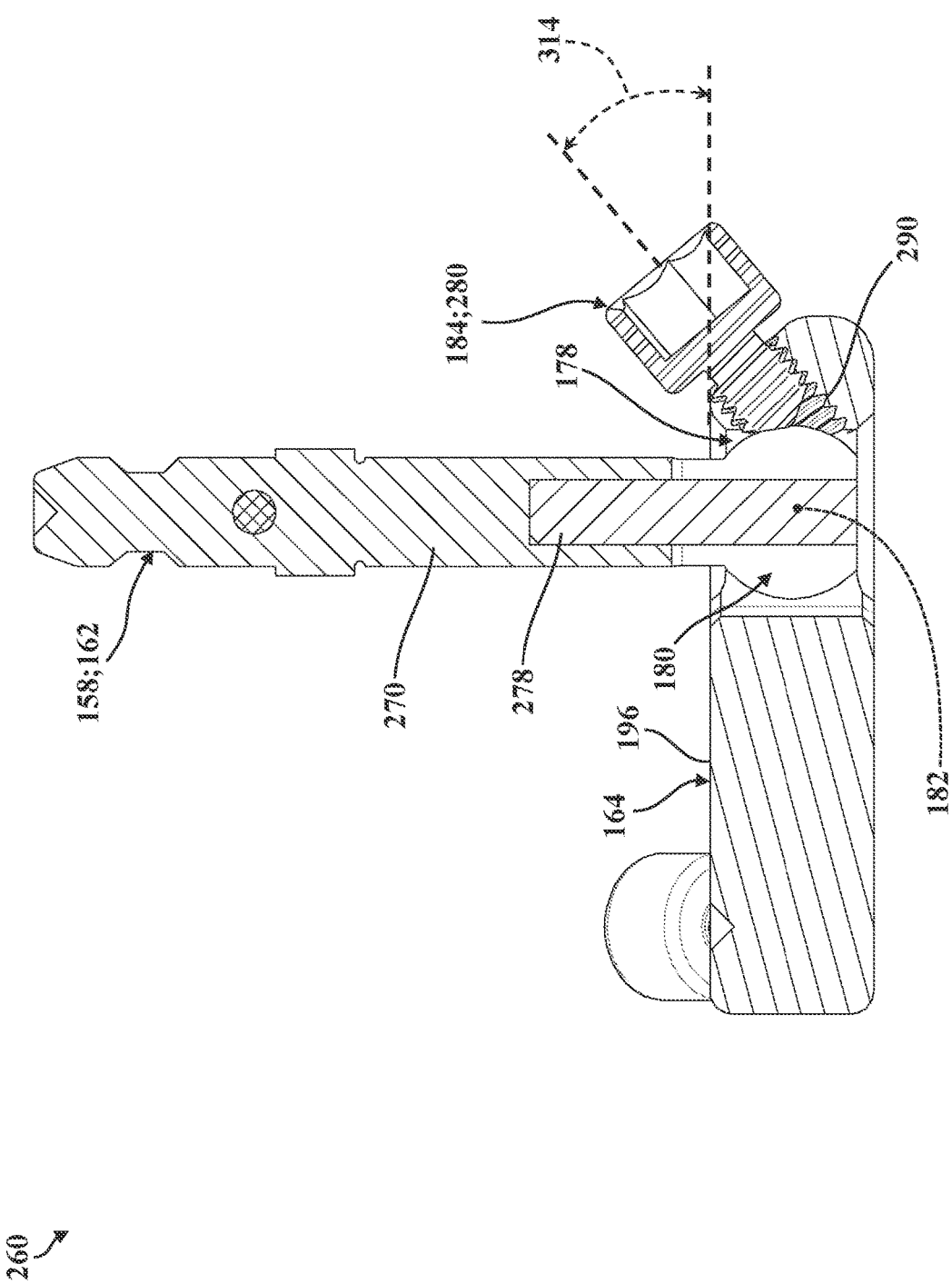
FIG. 32 is a section view of the frame subassembly taken along line 32-32 in FIG. 30.
Figure 33:
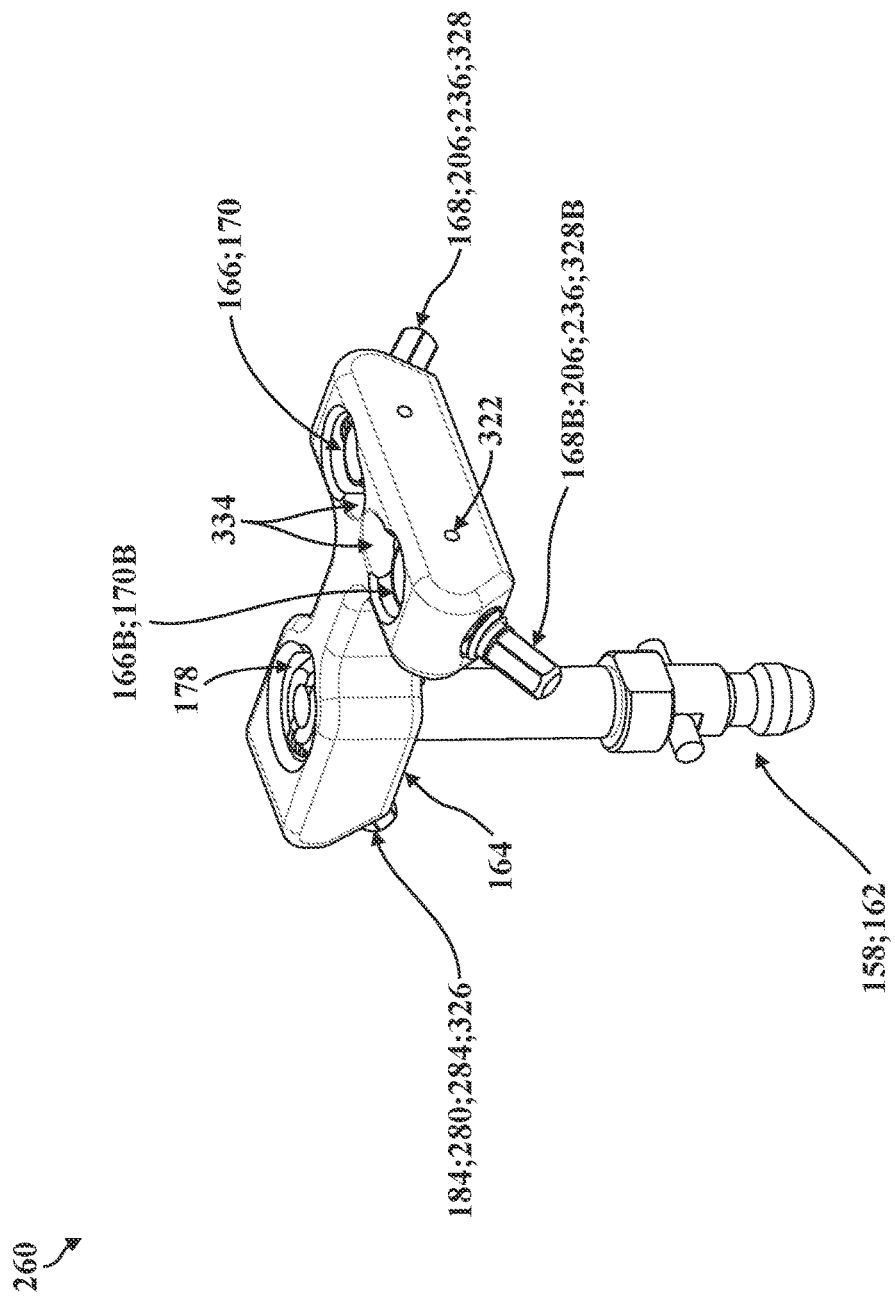
FIG. 33 is a perspective view of another version of a frame subassembly of the mount assembly of FIGS. 23-32, the frame subassembly shown having a coupler lock with a coupler interface realized as a coupler post, and with guide locks having guide interfaces realized as guide posts.
Figure 34:
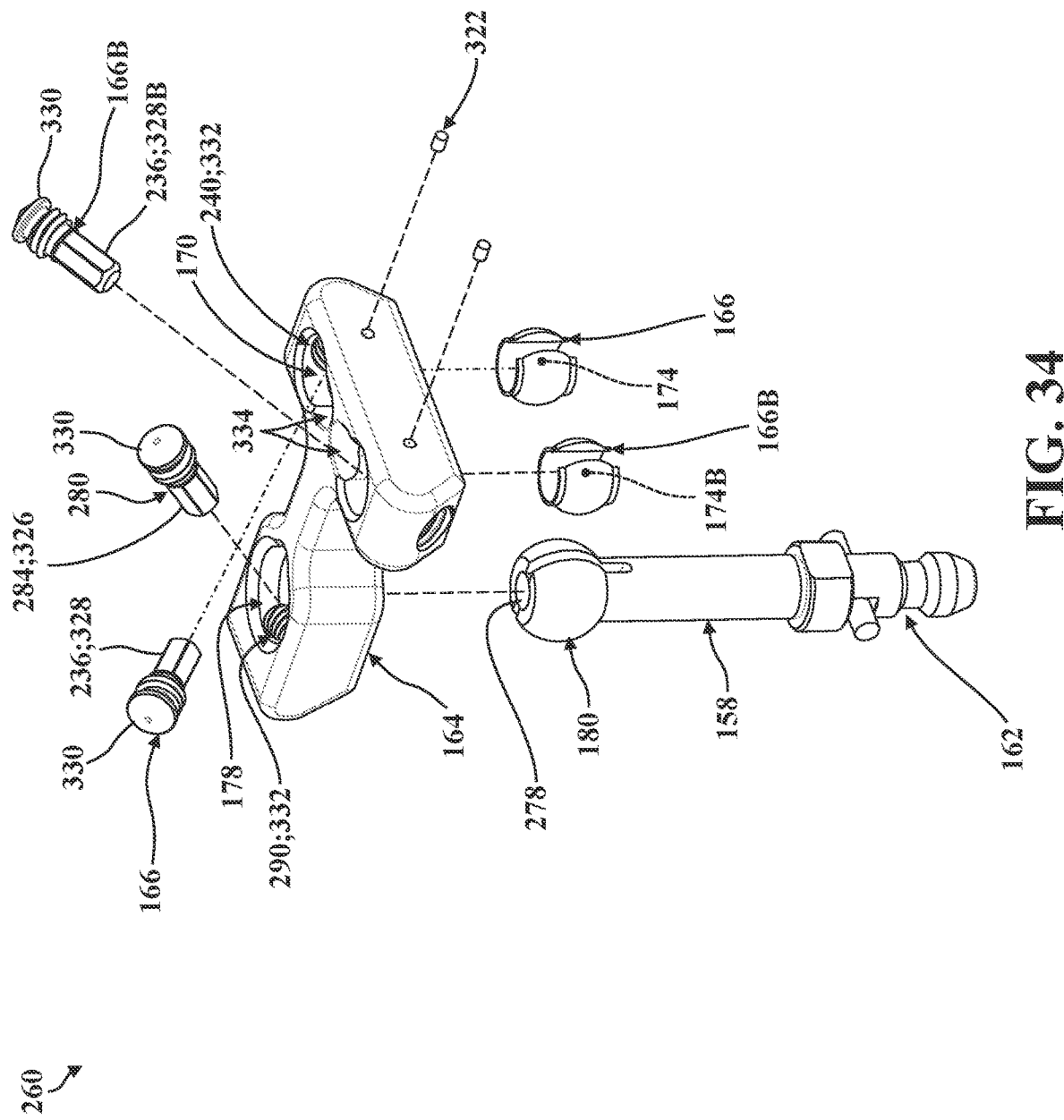
FIG. 34 is a partially exploded perspective view of the frame subassembly of FIG. 33.
Figure 35:
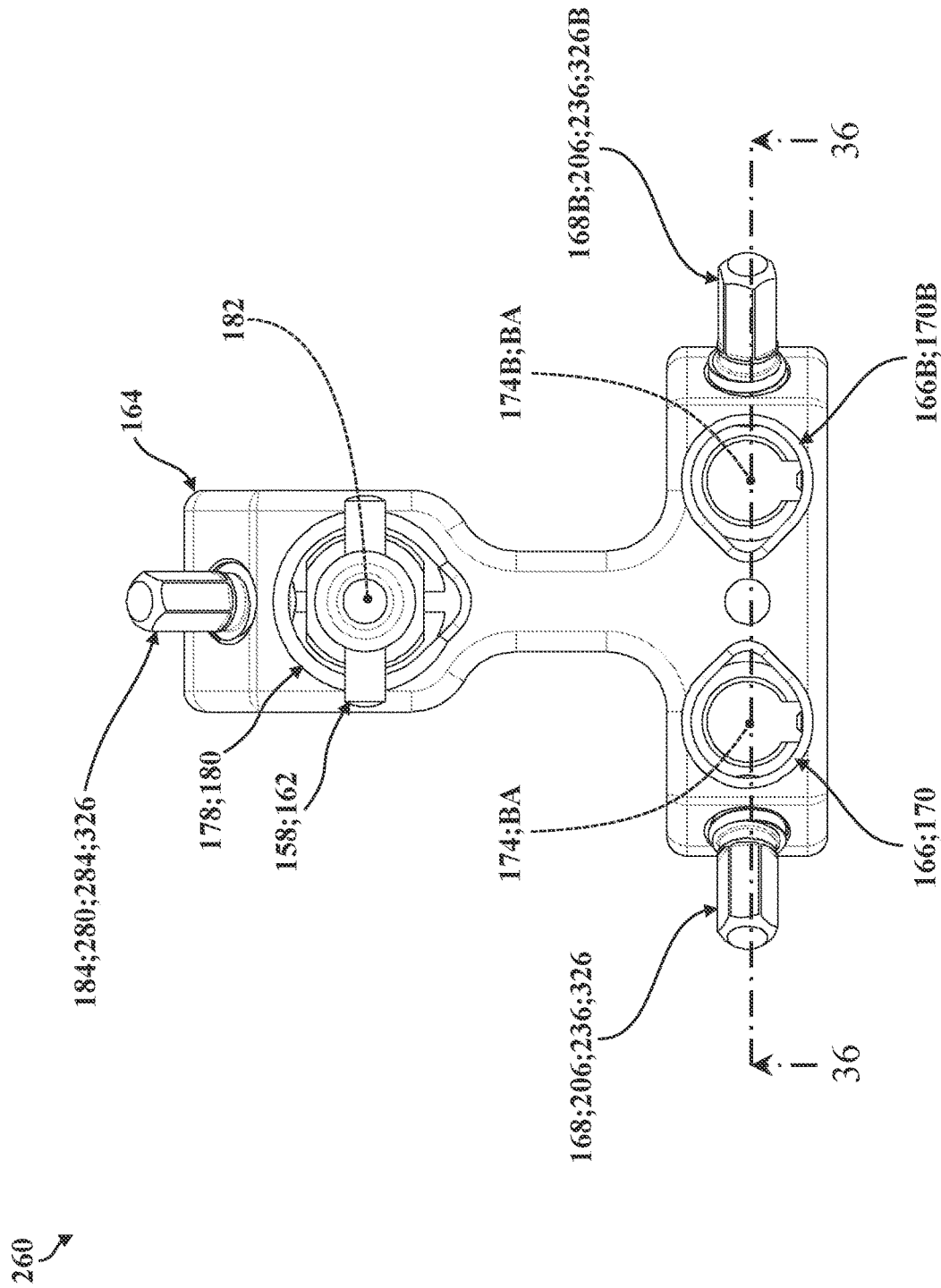
FIG. 35 is a top-side plan view of the frame subassembly of FIGS. 33-34.

With continued reference to FIGS. 23-32, in the illustrated version, the coupler retainer 280 of the coupler lock 184 (as well as the coupler retainer aperture 290) is arranged at an oblique coupler angle 314 relative to the upper frame surface 196 (see FIG. 32). This configuration helps promote access to the coupler retainer 280 from above during use. Similarly, the guide retainers 206 of the guide locks 168, 168B (as well as the respective guide retainer apertures 240) are arranged at respective oblique guide angles 316 relative to the upper frame surface 196 (see FIG. 31). This configuration likewise helps promote access to the guide retainers 206 during use. The oblique coupler angle 314 and the oblique guide angles 316 are each approximately 40-degrees in the illustrated version. However, it will be appreciated that other configurations are contemplated, and each of the oblique coupler angle 314 and/or either of the oblique guide angles 316 could be configured with different values in other versions. In the illustrated version, the coupler retainer 280 of the coupler lock 184 is disposed on a different side of the frame 164 than the guide locks 168, 168B and is angled away from the guide locks 168, 168B, and the guide locks 168, 168B are disposed on different sides of the frame 164 from each other and are angled away from each other.

In this version, the frame 164 is not provided with slots (e.g., the various slots and flexures described above) to facilitate operation between the locked configuration CL and the released configuration CR. Rather, in this version, the braces 170, 170B are have ovate profiles defining respective reduced regions 318 arranged opposite to the respective guide retainer apertures 240 (see FIG. 30). This configuration allows the guides 166, 166B to flex within the braces 170, 170B as the guide locks 168, 168B are moved to the locked configuration CL. Here too in this version, the coupler seat 178 likewise has an ovate profile defining a reduced coupler region 320, which similarly allows the perch 180 to flex within the coupler seat 178 as the coupler lock 174 is moved to the secured configuration CS. In order to facilitate retention and alignment of the guides 166, 166B within the braces 170, 170B, pins 322 are disposed in pin apertures 324 formed in the frame 164. During assembly, once the guides 166, 166B have been inserted into the braces 170, 170B, they are rotated such that the guide slots 244 face towards the pin apertures 324, and the pins 322 are subsequently seated into the pin apertures 324 such that they at least partially extend into the braces 170, 170B and are disposed within the guide slots 244.

As noted above, another version of the frame subassembly 260 of the mount assembly 134 is shown in FIGS. 33-36. Because many of the components, structure, and features of this version are substantially similar to those of the versions described above in connection with FIGS. 19-22B (as well as FIGS. 3A-13 and 14-17B), the components, structure, and features that correspond between the versions are provided with the same reference numerals in the description that follows. Furthermore, for the purposes of clarity, consistency, and brevity, only certain specific differences between the versions will be described below, and only some of the components, structure, and features common between the versions will be discussed herein and depicted in the drawings. Thus, unless otherwise indicated below, the description of the versions illustrated in FIGS. 19-22B (and also FIGS. 3A-13 and FIGS. 14-17B) may be incorporated by reference with respect to the version illustrated in FIGS. 33-36 without limitation.

Referring now to FIGS. 33-36, in this version, the coupler retainer 280 of the coupler lock 184 has a differently configured coupler interface 284 defined by a coupler post 326. Similarly, the guide retainers 206 of the guide locks 168, 168B have differently configured guide interfaces 236 defined by respective guide posts 328, 328B. Here in this version, the coupler post 326 and the guide posts 328, 328B are configured with profiles (e.g., hex-shaped profiles) that are narrow enough to pass into and through the coupler retainer aperture 290 and the guide retainer apertures 240 so as to be installed into the frame 164 from "beneath" (see FIG. 34) before the perch 180 and the guides 166, 166B are inserted into the coupler seat 178 and the seats 170, 170B, respectively. In this version, the coupler retainer 280 and the guide retainers 206 are each provided with respective flanges 330 that limit how far the coupler retainer 280 and the guide retainers 206 can travel along the coupler retainer aperture 290 and the guide retainer apertures 240, respectively. Here, the coupler retainer aperture 290 (not shown in detail) and the guide retainer apertures 240 are provided with respective undercuts 332 that are sized to accommodate the flanges 330 but also limit travel of the coupler retainer 280 and the guide retainers 206 once installed. Here too in this version, the frame 164 is provided with insertion reliefs 334 that facilitate insertion of the guide retainers 206 from "beneath" as noted above. Once the guide retainers 206 and the coupler retainer 280 are inserted from "beneath" and the perch 180 and the guides 166, 166B are inserted (and retained via the pins 322), the coupler retainer 280 and the guide retainers 206 can be adjusted via rotation, but cannot be removed out of the frame 164 without also removing the perch 180 and the guides 166, 166B due to the flanges 330. It will be appreciated that this configuration affords opportunities for improved handling and retention of the coupler retainer 280 and the guide retainers 206 in that they are prevented from inadvertently being removed from the frame 164 during adjustment, handling, and the like.

Those having ordinary skill in the art will appreciate that aspects of the versions described and illustrated herein can be interchanged or otherwise combined.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A mount assembly for use with a navigable tracker, the mount assembly comprising:
  a frame defining a seat;
  a coupler operatively attached to the frame for releasably securing to the navigable tracker;
  a guide defining a bore and arranged in the seat for selective pivoting movement about a pivot point disposed within the bore;
  an anchor having a shank arranged for selective sliding engagement with the bore; and
  a guide lock coupled to the frame and being selectively operable between:
    a locked configuration to restrict movement of both the anchor and the guide relative to the frame, and
    a released configuration to simultaneously permit pivoting movement of the anchor relative to the frame about the pivot point and translational movement of the anchor relative to the guide through the bore.

II. The mount assembly as set forth in clause I, wherein the guide defines a guide pivot surface disposed in sliding contact with the seat of the frame to facilitate selective pivoting movement about the pivot point when the guide lock operates in the released configuration.

III. The mount assembly as set forth in clause II, wherein the guide pivot surface has a generally spherical profile.

IV. The mount assembly as set forth in any one of clauses wherein the guide includes a guide slot formed extending through the guide pivot surface and into the bore to define first and second bore edges.

V. The mount assembly as set forth in clause IV, wherein the first and second bore edges are spaced from each other at a first bore edge distance when the guide lock operates in the locked configuration, and at a second bore edge distance when the guide lock operates in the released configuration, the second bore edge distance being larger than the first bore edge distance.

VI. The mount assembly as set forth in any one of clauses IV-V, wherein the bore of the guide extends along a bore axis between a guide inlet and a guide outlet, with the first and second bore edges defined along the bore between the guide inlet and the guide outlet.

VII. The mount assembly as set forth in clause VI, wherein the first and second bore edges are each arranged substantially parallel to the bore axis.

VIII. The mount assembly as set forth in any one of clauses IV-V, wherein the frame has an outer frame surface arranged adjacent to and facing away from the seat, with a frame slot formed extending through the outer frame surface and into the seat to define first and second seat edges.

IX. The mount assembly as set forth in clause VIII, wherein the first and second seat edges are spaced from each other at a first seat edge distance when the guide lock operates in the locked configuration, and at a second seat edge distance when the guide lock operates in the released configuration, the second seat edge distance being larger than the first seat edge distance.

X. The mount assembly as set forth in any one of clauses VIII-IX, wherein the frame defines an upper frame surface and a lower frame surface, with said frame slot formed extending through the upper frame surface and the lower frame surface.

XI. The mount assembly as set forth in clause X, wherein the pivot point is arranged between the upper frame surface and the lower frame surface.

XII. The mount assembly as set forth in any one of clauses X-XI, further including a relief slot, spaced from the frame slot, formed extending through the upper frame surface and the lower frame surface and into the seat to define first and second relief slot edges.

XIII. The mount assembly as set forth in clause XII, wherein the first and second relief slot edges are spaced from each other at a first relief edge distance when the guide lock operates in the locked configuration, and at a second relief edge distance when the guide lock operates in the released configuration, the second relief edge distance being larger than the first relief edge distance.

XIV. The mount assembly as set forth in any one of clauses XII-XIII, wherein the relief slot extends away from the seat to a relief slot end.

XV. The mount assembly as set forth in any one of clauses VIII-XIV, wherein the frame slot defines first and second flexure portions; and
  wherein the guide lock includes a guide retainer operatively attached to the frame to urge the first and second flexure portions towards each other in response to changing operation from the released configuration to the locked configuration.

XVI. The mount assembly as set forth in clause XV, wherein the first and second flexure portions of the frame are arranged to resiliently move away from each other in response to changing operation from the locked configuration to the released configuration.

XVII. The mount assembly as set forth in any one of clauses XV-XVI, wherein the guide retainer includes a retention portion, a guide interface arranged for engagement by a user to operate the guide lock between the locked configuration and the released configuration, and a guide retainer body extending between the retention portion and the guide interface.

XVIII. The mount assembly as set forth in clause XVII, wherein the frame further defines a guide retainer aperture formed extending through the first and second flexure portions and arranged to receive the guide retainer body.

XIX. The mount assembly as set forth in clause XVIII, wherein at least a portion of the guide retainer aperture is disposed in threaded engagement with at least a portion of the retention portion such that rotational torque applied to the guide interface in one direction urges the first and second flexure portions towards each other to operate the guide lock in the locked configuration, and such that rotational torque applied to the guide interface in an opposite direction permits movement of the first and second flexure portion away from each other to operate the guide lock in the released configuration.

XX. The mount assembly as set forth in any one of clauses I-XIX, wherein the anchor further includes a distal end and a proximal end with the shank extending therebetween, the proximal end being shaped to enter into and pass through the bore of the guide to bring the shank into sliding engagement with the bore when the guide lock operates in the released configuration.

XXI. The mount assembly as set forth in clause XX, wherein the distal end of the anchor includes threads and the proximal end defines a rotational interface for receiving rotational torque employed to facilitate advancing the threads into tissue of a patient.

XXII. The mount assembly as set forth in clause XXI, wherein the shank of the anchor has a generally cylindrical profile disposed in engagement with the bore of the guide such that rotational torque applied to the rotational interface effects rotation of the shank relative to the frame when the guide lock operates in the released configuration.

XXIII. The mount assembly as set forth in any one of clauses XXI-XXII, wherein the proximal end of the anchor further includes a mount disposed adjacent to the rotational interface for releasably engaging a marker.

XXIV. The mount assembly as set forth in clause XXIII, wherein the marker includes a receiver shaped to engage the mount of the anchor to retain the marker to the anchor.

XXV. The mount assembly as set forth in any one of clauses XXIII-XXIV, wherein the marker has a generally spherical profile.

XXVI. The mount assembly as set forth in any one of clauses XXIII-XXV, wherein the marker includes a coating formed from a radiopaque material.

XXVII. The mount assembly as set forth in any one of clauses I-XXVI, wherein the coupler includes a perch arranged for selective movement relative to the frame, and a tracker interface spaced from the perch for releasably securing the navigable tracker.

XXVIII. The mount assembly as set forth in clause XXVII, wherein the frame further defines a coupler seat supporting the perch for selective movement relative to the frame about a coupler point.

XXIX. The mount assembly as set forth in clause XXVIII, further comprising a coupler lock operatively attached to the frame and selectively operable between:
  a secured configuration to restrict movement of the coupler relative to the frame, and
  a movable configuration to permit limited movement of the coupler relative to the frame about the coupler point.

XXX. The mount assembly as set forth in clause XXIX, wherein the perch of the coupler defines a perch pivot surface disposed in sliding contact with the coupler seat of the frame to facilitate selective pivoting movement about the coupler point when the coupler lock operates in the movable configuration.

XXXI. The mount assembly as set forth in clause XXX, wherein the perch pivot surface has a generally spherical profile.

XXXII. The mount assembly as set forth in any one of clauses XXX-XXXI, wherein the coupler lock includes a coupler retainer supported by the frame and arranged to abut the perch of the coupler when the coupler lock operates in the secured configuration.

XXXIII. The mount assembly as set forth in clause XXXII, wherein the coupler retainer includes an coupler end portion arranged adjacent to the perch, a retainer interface arranged for engagement by a user to operate the coupler lock between the secured configuration and the movable configuration, and a coupler retainer body extending between the coupler end portion and the retainer interface.

XXXIV. The mount assembly as set forth in clause XXXIII, wherein the frame further defines a coupler retainer aperture extending in communication with the coupler seat and arranged to receive the coupler retainer body.

XXXV. The mount assembly as set forth in clause XXXIV, wherein at least a portion of the coupler retainer aperture is disposed in threaded engagement with at least a portion of the coupler retainer body such that rotational torque applied to the retainer interface in one direction urges the coupler end portion into abutment with the perch of the coupler to operate the coupler lock in the secured configuration, and such that rotational torque applied to the retainer interface in an opposite direction urges the coupler end portion out of abutment with the perch to operate the coupler lock in the movable configuration.

XXXVI. The mount assembly as set forth in any one of clauses I-XXXV, further comprising:
  a second guide defining a second bore and arranged in a second seat of the frame for selective pivoting movement about a second pivot point disposed within the second bore; and
  a second anchor having a second shank arranged for selective sliding engagement with the second bore.

XXXVII. The mount assembly as set forth in clause XXXVI, further comprising a second guide lock coupled to the frame and being selectively operable between:
  a second locked configuration to restrict movement of both the second anchor and the second guide relative to the frame, and
  a second released configuration to simultaneously permit pivoting movement of the second anchor relative to the frame about the second pivot point and translational movement of the second anchor relative to the second guide through the second bore.

XXXVIII. A mount assembly for use with a navigable tracker, the mount assembly comprising:
  a frame defining a seat and a coupler seat spaced from the seat;
  a coupler having a tracker interface for releasably securing to the navigable tracker, and a perch arranged in the coupler seat for selective movement relative to the frame about a coupler point;
  a coupler lock operatively attached to the frame and selectively operable between:
    a secured configuration to restrict movement of the coupler relative to the frame, and
    a movable configuration to permit limited movement of the coupler relative to the frame about the coupler point;
  a guide defining a bore and arranged in the seat for selective pivoting movement about a pivot point spaced from the coupler point;
  an anchor having a shank arranged for selective sliding engagement with the bore; and
  a guide lock coupled to the frame and being selectively operable between:
    a locked configuration to restrict movement of both the anchor and the guide relative to the frame, and
    a released configuration to simultaneously permit pivoting movement of the anchor relative to the frame about the pivot point and translational movement of the anchor relative to the guide through the bore.

XXXIX. A mount assembly for use with a navigable tracker, the mount assembly comprising:
  a frame defining first and second seats;
  a coupler operatively attached to the frame for releasably securing to the navigable tracker
  a first guide defining a first bore and arranged in the first seat for selective pivoting movement about a first pivot point, and a second guide defining a second bore and arranged in the second seat for selective pivoting movement about a second pivot point;
  a first anchor having a first shank arranged for selective sliding engagement with the first bore, and a second anchor having a second shank arranged for selective sliding engagement with the second bore;
  a first guide lock coupled to the frame and being selectively operable between:

a first locked configuration to restrict movement of both the first anchor and the first guide relative to the frame, and a first released configuration to simultaneously permit pivoting movement of the first anchor relative to the frame about the first pivot point and translational movement of the first anchor relative to the first guide through the first bore; and a second guide lock coupled to the frame and being selectively operable between:

a second locked configuration to restrict movement of both the second anchor and the second guide relative to the frame, and a second released configuration to simultaneously permit pivoting movement of the second anchor relative to the frame about the second pivot point and translational movement of the second anchor relative to the second guide through the second bore.

What is claimed is:

1. A mount assembly for use with a navigable tracker, the mount assembly comprising:
a frame defining a seat;
a coupler operatively attached to the frame for releasably securing to the navigable tracker;
a guide defining a bore and arranged in the seat for selective pivoting movement about a pivot point disposed within the bore;
an anchor having a shank arranged for selective sliding engagement with the bore; and
a guide lock coupled to the frame and being selectively operable between:
a locked configuration to restrict movement of both the anchor and the guide relative to the frame, and
a released configuration to simultaneously permit pivoting movement of the anchor relative to the frame in a plurality of rotational degrees of freedom about the pivot point and translational movement of the anchor relative to the guide through the bore.

2. The mount assembly as set forth in claim 1, wherein the guide defines a guide pivot surface disposed in sliding contact with the seat of the frame to facilitate selective pivoting movement about the pivot point when the guide lock operates in the released configuration.

3. The mount assembly as set forth in claim 2, wherein the guide includes a guide slot formed extending through the guide pivot surface and into the bore to define first and second bore edges.

4. The mount assembly as set forth in claim 3, wherein the first and second bore edges are spaced from each other at a first bore edge distance when the guide lock operates in the locked configuration, and at a second bore edge distance when the guide lock operates in the released configuration, the second bore edge distance being larger than the first bore edge distance.

5. The mount assembly as set forth in claim 1, wherein the frame has an outer frame surface arranged adjacent to and facing away from the seat, with a frame slot formed extending through the outer frame surface and into the seat to define first and second seat edges.

6. The mount assembly as set forth in claim 5, wherein the first and second seat edges are spaced from each other at a first seat edge distance when the guide lock operates in the locked configuration, and at a second seat edge distance when the guide lock operates in the released configuration, the second seat edge distance being larger than the first seat edge distance.

7. The mount assembly as set forth in claim 5, wherein the frame defines an upper frame surface and a lower frame surface, with said frame slot formed extending through the upper frame surface and the lower frame surface, and further including a relief slot, spaced from the frame slot, formed extending through the upper frame surface and the lower frame surface and into the seat to define first and second relief slot edges; and
wherein the first and second relief slot edges are spaced from each other at a first relief edge distance when the guide lock operates in the locked configuration, and at a second relief edge distance when the guide lock operates in the released configuration, the second relief edge distance being larger than the first relief edge distance.

8. The mount assembly as set forth in claim 5, wherein the frame slot defines first and second flexure portions; and
wherein the guide lock includes a guide retainer operatively attached to the frame to urge the first and second flexure portions towards each other in response to changing operation from the released configuration to the locked configuration.

9. The mount assembly as set forth in claim 8, wherein the guide retainer includes a retention portion, a guide interface arranged for engagement by a user to operate the guide lock between the locked configuration and the released configuration, and a guide retainer body extending between the retention portion and the guide interface; and
wherein the frame further defines a guide retainer aperture formed extending through the first and second flexure portions and arranged to receive the guide retainer body.

10. The mount assembly as set forth in claim 9, wherein at least a portion of the guide retainer aperture is disposed in threaded engagement with at least a portion of the retention portion such that rotational torque applied to the guide interface in one direction urges the first and second flexure portions towards each other to operate the guide lock in the locked configuration, and such that rotational torque applied to the guide interface in an opposite direction permits movement of the first and second flexure portion away from each other to operate the guide lock in the released configuration.

11. The mount assembly as set forth in claim 1, wherein the anchor further includes a distal end and a proximal end with the shank extending therebetween, the proximal end being shaped to enter into and pass through the bore of the guide to bring the shank into sliding engagement with the bore when the guide lock operates in the released configuration.

12. The mount assembly as set forth in claim 11, wherein the distal end of the anchor includes threads and the proximal end defines a rotational interface for receiving rotational torque employed to facilitate advancing the threads into tissue of a patient;
wherein the shank of the anchor has a generally cylindrical profile disposed in engagement with the bore of the guide such that rotational torque applied to the rotational interface effects rotation of the shank relative to the frame when the guide lock operates in the released configuration; and
wherein the proximal end of the anchor further includes a mount disposed adjacent to the rotational interface for releasably engaging a marker.

13. The mount assembly as set forth in claim 1, wherein the coupler includes a perch arranged for selective movement relative to the frame, and a tracker interface spaced from the perch for releasably securing the navigable tracker;
wherein the frame further defines a coupler seat supporting the perch for selective movement relative to the frame about a coupler point;
further comprising a coupler lock operatively attached to the frame and selectively operable between:
a secured configuration to restrict movement of the coupler relative to the frame, and
a movable configuration to permit limited movement of the coupler relative to the frame about the coupler point; and
wherein the perch of the coupler defines a perch pivot surface disposed in sliding contact with the coupler seat of the frame to facilitate selective pivoting movement about the coupler point when the coupler lock operates in the movable configuration.

14. The mount assembly as set forth in claim 13, wherein the coupler lock includes a coupler retainer supported by the frame and arranged to abut the perch of the coupler when the coupler lock operates in the secured configuration; and
wherein the coupler retainer includes an coupler end portion arranged adjacent to the perch, a retainer interface arranged for engagement by a user to operate the coupler lock between the secured configuration and the movable configuration, and a coupler retainer body extending between the coupler end portion and the retainer interface.

15. The mount assembly as set forth in claim 1, further comprising:
a second guide defining a second bore and arranged in a second seat of the frame for selective pivoting movement about a second pivot point disposed within the second bore;
a second anchor having a second shank arranged for selective sliding engagement with the second bore; and
a second guide lock coupled to the frame and being selectively operable between:
a second locked configuration to restrict movement of both the second anchor and the second guide relative to the frame, and
a second released configuration to simultaneously permit pivoting movement of the second anchor relative to the frame in a second plurality of rotational degrees of freedom about the second pivot point and translational movement of the second anchor relative to the second guide through the second bore.

16. A mount assembly for use with a navigable tracker, the mount assembly comprising:
a frame defining a seat and having an outer frame surface arranged adjacent to and facing away from the seat, with a frame slot formed extending through the outer frame surface and into the seat to define first and second seat edges;
a coupler operatively attached to the frame for releasably securing to the navigable tracker;
a guide defining a bore and arranged in the seat for selective pivoting movement about a pivot point disposed within the bore;
an anchor having a shank arranged for selective sliding engagement with the bore; and
a guide lock coupled to the frame and being selectively operable between:
a locked configuration to restrict movement of both the anchor and the guide relative to the frame, and
a released configuration to simultaneously permit pivoting movement of the anchor relative to the frame about the pivot point and translational movement of the anchor relative to the guide through the bore.

17. The mount assembly as set forth in claim 16, wherein the first and second seat edges are spaced from each other at a first seat edge distance when the guide lock operates in the locked configuration, and at a second seat edge distance when the guide lock operates in the released configuration, the second seat edge distance being larger than the first seat edge distance.

18. The mount assembly as set forth in claim 16, wherein the frame defines an upper frame surface and a lower frame surface, with said frame slot formed extending through the upper frame surface and the lower frame surface, and further including a relief slot, spaced from the frame slot, formed extending through the upper frame surface and the lower frame surface and into the seat to define first and second relief slot edges; and
wherein the first and second relief slot edges are spaced from each other at a first relief edge distance when the guide lock operates in the locked configuration, and at a second relief edge distance when the guide lock operates in the released configuration, the second relief edge distance being larger than the first relief edge distance.

19. The mount assembly as set forth in claim 16, wherein the frame slot defines first and second flexure portions; and
wherein the guide lock includes a guide retainer operatively attached to the frame to urge the first and second flexure portions towards each other in response to changing operation from the released configuration to the locked configuration.

20. The mount assembly as set forth in claim 19, wherein the guide retainer includes a retention portion, a guide interface arranged for engagement by a user to operate the guide lock between the locked configuration and the released configuration, and a guide retainer body extending between the retention portion and the guide interface;
wherein the frame further defines a guide retainer aperture formed extending through the first and second flexure portions and arranged to receive the guide retainer body; and
wherein at least a portion of the guide retainer aperture is disposed in threaded engagement with at least a portion of the retention portion such that rotational torque applied to the guide interface in one direction urges the first and second flexure portions towards each other to operate the guide lock in the locked configuration, and such that rotational torque applied to the guide interface in an opposite direction permits movement of the first and second flexure portion away from each other to operate the guide lock in the released configuration.

* * * * *